(12) United States Patent
Li et al.

(10) Patent No.: US 12,309,881 B2
(45) Date of Patent: May 20, 2025

(54) COMMUNICATION CONNECTION METHOD AND ELECTRONIC DEVICE

(71) Applicant: Huawei Technologies Co., Ltd., Shenzhen (CN)

(72) Inventors: Ying Li, Shanghai (CN); Bin Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 246 days.

(21) Appl. No.: 17/758,050

(22) PCT Filed: Nov. 20, 2020

(86) PCT No.: PCT/CN2020/130384
§ 371 (c)(1),
(2) Date: Jun. 27, 2022

(87) PCT Pub. No.: WO2021/129264
PCT Pub. Date: Jul. 1, 2021

(65) Prior Publication Data
US 2023/0054451 A1 Feb. 23, 2023

(30) Foreign Application Priority Data
Dec. 28, 2019 (CN) .......................... 201911384810.0

(51) Int. Cl.
H04W 8/18 (2009.01)
(52) U.S. Cl.
CPC .................................. H04W 8/183 (2013.01)

(58) Field of Classification Search
CPC ...... H04L 67/306; H04W 4/60; H04W 76/15; H04W 8/183
See application file for complete search history.

(56) References Cited

U.S. PATENT DOCUMENTS

| | | |
|---|---|---|
| 2015/0110035 A1 | 4/2015 | Lee |
| 2015/0373778 A1 | 12/2015 | Holtmanns et al. |
| 2016/0014579 A1 | 1/2016 | Kasilya Sudarsan et al. |
| 2016/0269891 A1 | 9/2016 | Chen et al. |
| 2017/0094628 A1 | 3/2017 | Miao et al. |
| 2017/0289788 A1 | 10/2017 | Lalwaney |
| 2018/0014184 A1 | 1/2018 | Schell et al. |

(Continued)

FOREIGN PATENT DOCUMENTS

| | | |
|---|---|---|
| CN | 103634791 A | 3/2014 |
| CN | 106304024 A | 1/2017 |
| CN | 107979835 A | 5/2018 |

(Continued)

*Primary Examiner* — Nader Bolourchi
(74) *Attorney, Agent, or Firm* — Slater Matsil, LLP

(57) ABSTRACT

A communication connection method and an electronic device are provided. The method includes establishing, by an electronic device, a first communication connection based on a first profile, where the eSIM comprises the first profile, in response to an operation of establishing a communication connection based on a second profile, establishing, by the electronic device, a second communication connection based on the second profile without terminating the first communication connection, where the first profile and the second profile are comprised in the same eSIM, and the first profile is different from the second profile.

18 Claims, 47 Drawing Sheets

(56) References Cited

U.S. PATENT DOCUMENTS

2019/0281442 A1 9/2019 Kim et al.
2020/0252791 A1* 8/2020 Hamblet ............... H04W 12/50

FOREIGN PATENT DOCUMENTS

| CN | 108260119 A | 7/2018 |
| CN | 108260120 A | 7/2018 |
| CN | 109155910 A | 1/2019 |
| CN | 109257740 A | 1/2019 |
| CN | 110248358 A | 9/2019 |
| CN | 110621013 A | 12/2019 |
| WO | 2018176675 A1 | 10/2018 |
| WO | 2019119544 A1 | 6/2019 |

* cited by examiner

COMMUNICATION CONNECTION METHOD AND ELECTRONIC DEVICE

CROSS-REFERENCE TO RELATED APPLICATIONS

This application is a National Stage of International Application No. PCT/CN2020/130384, filed on Nov. 20, 2020, which claims priority to Chinese Patent Application No. 201911384810.0, filed on Dec. 28, 2019. Both of the aforementioned applications are hereby incorporated by reference in their entireties.

TECHNICAL FIELD

This application relates to the field of electronic technologies, and in particular, to a communication connection method and an electronic device.

BACKGROUND

With the continuous development of the communication industry, consumers' demands for multi-SIM multi-standby are increasing day by day. Some users need to use different mobile phone numbers to separate life from work, or separate different company services or different life scenarios. In addition, to use various packages and services provided by different operators, consumers are willing to use a plurality of different mobile phone numbers at the same time.

Currently, all electronic devices implement multi-SIM multi-standby by separately inserting SIM cards into a plurality of subscriber identification module (subscriber identification module, SIM) card slot components.

Even if a technical solution in which a plurality of profiles can be downloaded in one embedded-SIM (Embedded-SIM, eSIM) emerges with the development of technologies, the electronic device supports activation of only one of the plurality of profiles in the one eSIM for use. To implement multi-SIM multi-standby, a plurality of SIM card slot components or eSIMs still need to be installed in the electronic device. Consequently, not only costs are relatively high, but also large layout space of the electronic device is occupied.

SUMMARY

Embodiments of this application provide a communication connection method and an electronic device. The electronic device may support simultaneous establishment of a plurality of communication connections based on a plurality of profiles in one eSIM, so that only one eSIM needs to be installed to implement multi-SIM multi-standby. This reduces costs and occupation on space of the electronic device.

According to a first aspect, this application provides a communication connection method, applied to an electronic device having an eSIM. The method includes: The electronic device establishes a first communication connection based on a first profile, where the eSIM includes the first profile; and in response to an operation of establishing a communication connection based on a second profile, the electronic device establishes a second communication connection based on the second profile without terminating the first communication connection, where the eSIM further includes the second profile, and the first profile is different from the second profile.

During implementation of the method according to the first aspect, without terminating the first communication connection that is established based on the first profile in the eSIM, the electronic device may respond to a user operation and establish the second communication connection based on the second profile that is different from the first profile in the eSIM. When no data needs to be received or sent on the two communication connections, the two communication connections are in a standby state. When data needs to be sent on the two communication connections, the data is received or sent on a corresponding communication connection. Only one eSIM needs to be used to establish communication connections based on a plurality of profiles in the eSIM and implement standby use, and multi-SIM multi-standby can be implement without the need of a plurality of SIM card slots or eSIMs. This reduces costs and occupation on space of the electronic device.

With reference to the first aspect, in some embodiments, after the electronic device establishes the second communication connection based on the second profile, the method further includes: The electronic device updates status information in an eSIM option corresponding to the second profile to display the status information as enabled.

Specifically, an eSIM option is a display form of a profile on a display of the electronic device. The eSIM option may include current status information of the profile. The status information may be one of two states: enabled and disabled. An activation status of the profile corresponds to enabled, and a deactivation status of the profile corresponds to disabled. When the status information is displayed, it is not limited to only a text "enabled" or "disabled" to be displayed, and another text, graphics, or a combination of graphics and text that indicates the same meaning may alternatively be displayed.

In this embodiment of this application, the operation of establishing the communication connection based on the second profile is performed, and the electronic device establishes the second communication connection in response to the operation. Therefore, to feed back a working status of the electronic device to a user, the electronic device may update the status information in the eSIM option corresponding to the second profile to display the status information as enabled. In addition, the eSIM option may further display information such as an operator to which the profile belongs and a mobile phone number corresponding to the profile.

With reference to the first aspect, in some embodiments, the method further includes: The electronic device displays first indication information, where the first indication information is used to indicate signal strength of the first communication connection; and the electronic device displays second indication information, where the second indication information is used to indicate signal strength of the second communication connection.

Specifically, after the communication connections are established, the electronic device may monitor signal strength of the communication connections, and display the signal strength on the display in a form of indication information. This is convenient for the user to view current signal strength of the established communication connections, to help select a communication connection to be used for service processing, and is also convenient for the user to clearly know a quantity of communication connections that have been simultaneously established by the electronic device.

For example, the indication information may be a signal strength indicator. The signal strength indicator is updated and displayed with different strength of the monitored signal strength of the communication connection.

With reference to the first aspect, in some embodiments, that the electronic device establishes a second communication connection based on the second profile includes: The electronic device activates the second profile; the electronic device allocates an IMEI to the second profile, and establishes a correspondence between a unique identifier of the second profile and the allocated second IMEI; and the electronic device establishes the second communication connection based on at least the second IMEI.

Specifically, that the electronic device activates the second profile may be writing an activation status field in the second profile as 1.

Specifically, after the electronic device allocates the IMEI to the second profile, the correspondence between the unique identifier of the second profile and the allocated second IMEI is added to a correspondence (for example, a profile-IMEI data table) that is between a profile and an IMEI and that is stored in the electronic device. In this correspondence, a corresponding profile is identified by using a unique identifier of the profile, instead of using a correspondence between a hardware component SIM card slot or an eSIM and an IMEI. In this way, when there are a plurality of activated profiles in one eSIM, the electronic device may still find the unique identifier of the second profile by using the stored correspondence between the profile and the IMEI, to obtain, from the eSIM based on the unique identifier of the second profile, a second IMSI stored in the second profile of the eSIM, and send the second IMEI and the second IMSI to a second base station, to establish the second communication connection.

The following describes the correspondence that is between the profile and the IMEI and that is stored in the electronic device.

A representation form of the stored correspondence between the profile and the IMEI is not limited, and may be a profile-IMEI data table, a profile-IMEI array, a profile-IMEI function, or the like. The correspondence between the profile and the IMEI stores a correspondence between the unique identifier of the profile and an IMEI allocated to the corresponding profile.

When activating a profile, the electronic device allocates an IMEI to the profile, and then adds a correspondence between a unique identifier of the profile and the IMEI to the stored correspondence between the profile and the IMEI for subsequent use.

Optionally, the correspondence between the profile and the IMEI may include not only the correspondence between the unique identifier of the profile and the IMEI allocated to the profile, but also a correspondence between the unique identifier of the profile and an IMSI in the profile. To be specific, after reading the IMSI in the profile from an eSIM, the electronic device may further add a correspondence between the IMSI and the profile to the correspondence between the profile and the IMEI, to form a correspondence among the profile, the IMSI, and the IMEI.

Optionally, the electronic device may further store a correspondence between a profile and a hardware component (a SIM card slot or an eSIM). A unique identifier of the profile is used to identify the profile, and a SIM card slot number or an eSIM number is used to identify the hardware component. Therefore, the electronic device is easier to determine, based on the unique identifier of the profile in the correspondence between the profile and the IMEI, a hardware component from which data in the profile needs to be obtained.

Optionally, in an implementation, in the correspondence that is between the profile and the IMEI and that is stored in the electronic device, the unique identifier of the profile may be an ICCID number or an ISP-D number.

In this embodiment of this application, the electronic device stores the correspondence between the profile and the IMEI. Therefore, after IMEIs are separately allocated to a plurality of activated profiles in the eSIM and are recorded in the correspondence, when a communication connection needs to be established, the electronic device may obtain, based on the correspondence between the profile and the IMEI, a unique identifier of a profile for which a communication connection needs to be established, to obtain, from the eSIM, the IMSI in the profile for subsequent communication connection establishment.

Unlike the conventional technology, because only a correspondence between a hardware component SIM card slot or an eSIM and an IMEI is stored, only one profile can be activated in one eSIM. In this way, when a communication connection needs to be established, the eSIM can be found to obtain an IMSI in the currently activated profile. Otherwise, in the conventional technology, if a plurality of profiles in one eSIM are activated, when the electronic device obtains an IMSI from the eSIM, because there is no accurate information identifier, the electronic device knows only an eSIM from which the IMSI is obtained, but cannot obtain a correct IMSI for subsequent communication connection establishment.

With reference to the first aspect, in this embodiment of this application, that the electronic device establishes a first communication connection based on a first profile may be triggered in different cases.

(1) It is possible that the first profile has been enabled and activated before the electronic device is powered on this time.

In some embodiments, in a process of loading a profile status when the electronic device is powered on, that the electronic device establishes a first communication connection based on a first profile includes: The electronic device determines that the first profile is activated; the electronic device determines a first IMEI corresponding to the first profile; and the electronic device sends the first IMEI and a first IMSI in the first profile to a first base station, to establish the first communication connection.

Specifically, the electronic device may determine, by reading an activation status field of each profile in the eSIM, that the first profile is activated. Then, the electronic device searches for the correspondence (for example, the profile-IMEI data table) that is between the profile and the IMEI and that is stored in the electronic device, to determine the first IMEI corresponding to the first profile in the correspondence. The first IMEI is an IMEI allocated by the electronic device to the first profile when the first profile is activated, and after the allocation, a correspondence between the first profile and the first IMEI is added to the stored correspondence between the profile and the IMEI. The electronic device may further obtain, from the eSIM, the first IMSI stored in the first profile, send the first IMEI and the first IMSI to the first base station, and establish the first communication connection after a network access authentication process succeeds.

In this embodiment of this application, because the electronic device stores the correspondence between the profile and the IMEI, in the process of loading the profile status when the electronic device is powered on, an IMEI allocated to an activated profile can be accurately determined. Simultaneously, because there is the correspondence between the profile and the IMEI, a unique identifier of the activated profile corresponding to the IMEI can be accurately determined, so that an IMSI in the determined profile can be accurately obtained from the eSIM. This provides a feasible solution for simultaneously activating a plurality of profiles on one eSIM and separately establishing communication connections based on some of the profiles.

(2) It is possible that the first profile is enabled only after the electronic device is powered on this time.

In some embodiments, that the electronic device establishes a first communication connection based on a first profile includes: The electronic device activates the first profile; the electronic device allocates an IMEI to the first profile, and establishes a correspondence between a unique identifier of the first profile and the allocated first IMEI; and the electronic device sends the first IMEI and a first IMSI in the first profile to a first base station, to establish the first communication connection.

Specifically, after activating the first profile, the electronic device allocates the IMEI to the first profile, and adds the correspondence between the unique identifier of the first profile and the allocated first IMEI to the correspondence that is between the profile and the IMEI and that is stored in the electronic device. Then, the electronic device may obtain, from the first profile, the first IMSI stored in the first profile, send the first IMEI and the first IMSI to the first base station, and establish the first communication connection after a network access authentication process succeeds.

With reference to the first aspect, in some embodiments, that the electronic device activates the second profile includes: The electronic device determines whether a quantity of enabled profiles is less than a preset threshold, where the preset threshold is a maximum quantity of profiles that can be simultaneously enabled and standby in the electronic device, and the preset threshold is a positive integer not less than 2; and the electronic device activates the second profile when it is determined that the quantity of enabled profiles is less than the preset threshold.

In this embodiment of this application, whether the quantity of enabled profiles is less than the preset threshold is determined before activation, and an activation operation is performed only when it is determined that the quantity of enabled profiles is less than the preset threshold. This prevents the electronic device from activating excessive profiles when a capability of the electronic device for maintaining communication connections is exceeded, and maintains stable running of the electronic device.

According to a second aspect, an embodiment of this application provides an electronic device. The electronic device includes an eSIM, one or more processors, a memory, and a display. The memory is coupled to the one or more processors, the memory is configured to store computer program code, the computer program code includes computer instructions, and the one or more processors invoke the computer instructions to enable the electronic device to perform the following operations: establishing a first communication connection based on a first profile, where the eSIM includes the first profile; and in response to an operation of establishing a communication connection based on a second profile, establishing a second communication connection based on the second profile without terminating the first communication connection. The eSIM further includes the second profile, and the first profile is different from the second profile.

Without terminating the first communication connection that is established based on the first profile in the eSIM, the electronic device according to the second aspect may respond to a user operation and establish the second communication connection based on the second profile that is different from the first profile in the eSIM. When no data needs to be received or sent on the two communication connections, the two communication connections are in a standby state. When data needs to be sent on the two communication connections, the data is received or sent on a corresponding communication connection. Only one eSIM needs to be used to establish communication connections based on a plurality of profiles in the eSIM and implement standby use, and multi-SIM multi-standby can be implement without the need of a plurality of SIM card slots or eSIMs. This reduces costs and occupation on space of the electronic device.

With reference to the second aspect, in some embodiments, the one or more processors are further configured to invoke the computer instruction to enable the electronic device to perform the following operation: updating status information in an eSIM option corresponding to the second profile to display, on the display, the status information as enabled.

With reference to the second aspect, in some embodiments, the one or more processors are further configured to invoke the computer instructions to enable the electronic device to perform the following operations: displaying first indication information on the display, where the first indication information is used to indicate signal strength of the first communication connection; and displaying second indication information on the display, where the second indication information is used to indicate signal strength of the second communication connection.

With reference to the second aspect, in some embodiments, the one or more processors are specifically configured to invoke the computer instructions to enable the electronic device to perform the following operations: activating the second profile; allocating an IMEI to the second profile, and establishing a correspondence between a unique identifier of the second profile and the allocated second IMEI; and establishing the second communication connection based on at least the second IMEI.

With reference to the second aspect, in some embodiments, the one or more processors are specifically configured to invoke the computer instructions to enable the electronic device to perform the following operations: determining that the first profile is activated; determining a first IMEI corresponding to the first profile; and sending the first IMEI and a first IMSI in the first profile to a first base station, to establish the first communication connection.

With reference to the second aspect, in some embodiments, the one or more processors are specifically configured to invoke the computer instructions to enable the electronic device to perform the following operations: activating the first profile; allocating an IMEI to the first profile, and establishing a correspondence between a unique identifier of the first profile and the allocated first IMEI; and sending the first IMEI and a first IMSI in the first profile to a first base station, to establish the first communication connection.

With reference to the second aspect, in some embodiments, the one or more processors are specifically configured to invoke the computer instructions to enable the electronic device to perform the following operations: determining whether a quantity of enabled profiles is less than a preset threshold, where the preset threshold is a maximum quantity of profiles that can be simultaneously enabled and standby in the electronic device, and the preset threshold is a positive integer not less than 2; and activating the second profile when it is determined that the quantity of enabled profiles is less than the preset threshold.

With reference to the second aspect, in some embodiments, a unique identifier of a profile is an ICCID number or an ISP-D number.

According to a third aspect, an embodiment of this application provides a chip. The chip is applied to an electronic device. The chip includes one or more processors. The processor is configured to invoke computer instructions to enable the electronic device to perform the method according to any one of the first aspect and the possible implementations of the first aspect.

According to a fourth aspect, an embodiment of this application provides a computer program product including instructions. When the computer program product is run on an electronic device, the electronic device is enabled to perform the method according to any one of the first aspect and the possible implementations of the first aspect.

According to a fifth aspect, an embodiment of this application provides a computer-readable storage medium, including instructions. When the instructions are run on an electronic device, the electronic device is enabled to perform the method according to any one of the first aspect and the possible implementations of the first aspect.

It may be understood that the electronic device according to the second aspect, the chip according to the third aspect, the computer program product according to the fourth aspect, and the computer storage medium according to the fifth aspect are all configured to perform the method provided in the embodiments of this application. Therefore, for beneficial effects that can be achieved, refer to beneficial effects in a corresponding method. Details are not described herein again.

BRIEF DESCRIPTION OF THE DRAWINGS

FIG. 20a to FIG. 2od are schematic diagrams of another group of interfaces according to an embodiment of this application.

DETAILED DESCRIPTION OF ILLUSTRATIVE EMBODIMENTS

Figure 1:
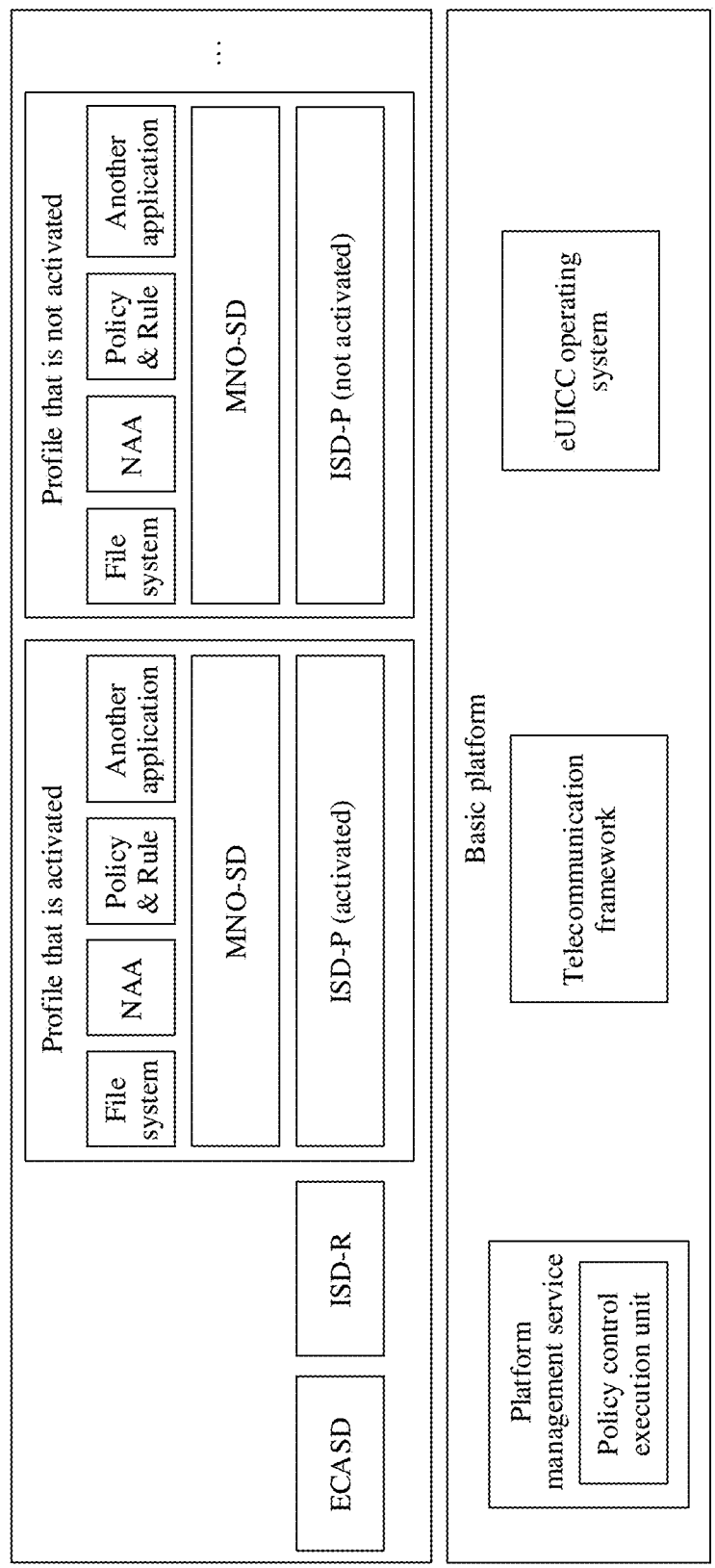
FIG. 1 is a schematic diagram of a software architecture of an eSIM according to an embodiment of this application.

Terms used in the following embodiments of this application are only intended to describe particular embodiments, and are not intended to limit this application. The terms "one", "a", "the", "the foregoing", "this", and "the one" of singular forms used in this specification and the appended claims of this application are also intended to include plural forms, unless otherwise specified in the context clearly. It should also be understood that, the term "and/or" used in this application indicates and includes any one or all of possible combinations of one or more listed items.

The following terms "first" and "second" are merely intended for a purpose of description, and shall not be understood as an implication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

Because embodiments of this application relate to application of multi-SIM multi-standby and an eSIM, for ease of understanding, the following first describes related terms and related concepts such as the multi-SIM multi-standby in embodiments of this application.

(1) SIM Card

The SIM card includes a microprocessor (CPU), a program memory (ROM), a working memory (RAM), a data memory (EEPROM), and a serial communication unit. In a process of using the SIM card, actually an electronic device sends a command to the SIM card, and the SIM card executes the command according to a standard specification and feeds back a result.

Data stored in the SIM card may be classified into four types:
1. fixed data, which is written by a SIM card center before being sold, including an international mobile subscriber identity (International Mobile Subscriber Identity, IMSI), an authentication key (Ki), and the like;
2. temporary data, which is network-related temporary data, such as a location area identity (Local Area Identity, LAI), a temporary mobile subscriber identity (Temporary Mobile Subscriber Identity, TMSI), and an access prohibited public telephone network code;
3. service code, such as a personal identification number (PIN), a PIN unlock key (PUK), and a charging rate; and
4. user record, such as a phone book and an SMS message.

For ease of unified description and understanding, in subsequent descriptions of the embodiments of this application, data stored in one SIM card is collectively referred to as a profile.

(2) IMSI

The IMSI is an identity used to distinguish different users in a cellular network and is unique in all cellular networks.

(3) International Mobile Equipment Identity (International Mobile Equipment Identity, IMEI)

The IMEI is a sequence number or serial number of a mobile phone, is used to identify each independent mobile communications device such as a mobile phone on a mobile phone network, and is equivalent to an ID card of the mobile phone. The IMEI is allocated by a device vendor according to a specification, and is stored in a memory of an electronic device when the electronic device is delivered from a factory.

(4) Network Access Authentication Process in which a SIM Card is Used
1. An electronic device reads an IMSI from the SIM card when the electronic device is powered on.
2. The electronic device sends the IMSI and an IMEI in a memory to a mobile network.
3. The mobile network generates a random number (RADN) and sends the random number to the electronic device.
4. The electronic device sends the RADN to the SIM card.
5. The SIM card calculates a result 1 (SENS-1) based on the RADN and a Ki, and sends the result 1 (SENS-1) to the electronic device.
6. The electronic device sends the SENS-1 to the mobile network.
7. At the same time, the mobile network finds a Ki corresponding to the IMSI in a database, uses the same RAND and a same algorithm to calculate a result 2 (SENS-2), and compares whether the SENS-1 is the same as the SENS-2.
8. If the SENS-1 is the same as the SENS-2, the mobile network determines that this card is a valid card sent by the mobile network, authentication succeeds, and the mobile network allows the card to log in; or if the SENS-1 is different from the SENS-2, authentication fails.

(5) Communication Encryption Process in which a SIM Card is Used

In step 3 of the foregoing authentication process, when the mobile network sends the RANDs to the electronic device, the electronic device also uses the SIM card to calculate another key (Kc) based on the RANDs and the Ki, for use in full-process communication encryption.

Because a calculation amount of communication encryption is relatively large, and a calculation speed of a SIM card is usually not fast enough, all encryption in a communication process is completed by the electronic device.

(6) eSIM

The eSIM is also referred to as an embedded-universal integrated circuit card (Embedded-Universal Integrated Circuit Card, eUICC). The eSIM is directly fixed in an electronic device, is programmable, and supports remote configuration by using over the air (OTA) to download, install, activate, deactivate, and delete operator profiles. A plurality of profiles can be downloaded for one eSIM, so that to a plurality of operators and different card numbers can be flexibly selected. In addition to the foregoing remote downloading manner, the eSIM may also include a profile that is preset before delivery of the electronic device.

The profile includes user identification information, namely, service subscription information and information such as a user identity, an authentication parameter, and an operator customized parameter, which is similar to data included in a conventional SIM card.

FIG. 1 is a diagram of a logical function architecture of an example eSIM according to an embodiment of this application, where
an eUICC operating system on a basic platform provides basic functions of a common embedded-SIM card operating system;
a platform management service is used to provide a platform management function, retrieve ISD-P universal information, and maintain a policy execution mechanism through policy control;
a telecommunication framework is used to provide a standard network authentication algorithm for a profile, and the algorithm is invoked by a network access application (NAA) of a profile stored in an ISD-P during network access authentication;
an ECASD on the basic platform is a control security domain of the eUICC;
the ISD-P is a profile security domain, and represents off-chip entity remote management platform data preparation (SM-DP) in a chip, and one eSIM may include a plurality of ISD-Ps;
an ISD-R is a root security domain, and represents off-chip entity remote management platform data routing (SM-SR) in the chip; and
an MNO-SD is an operator security domain.

(7) Remote Management Platform

Figure 2:
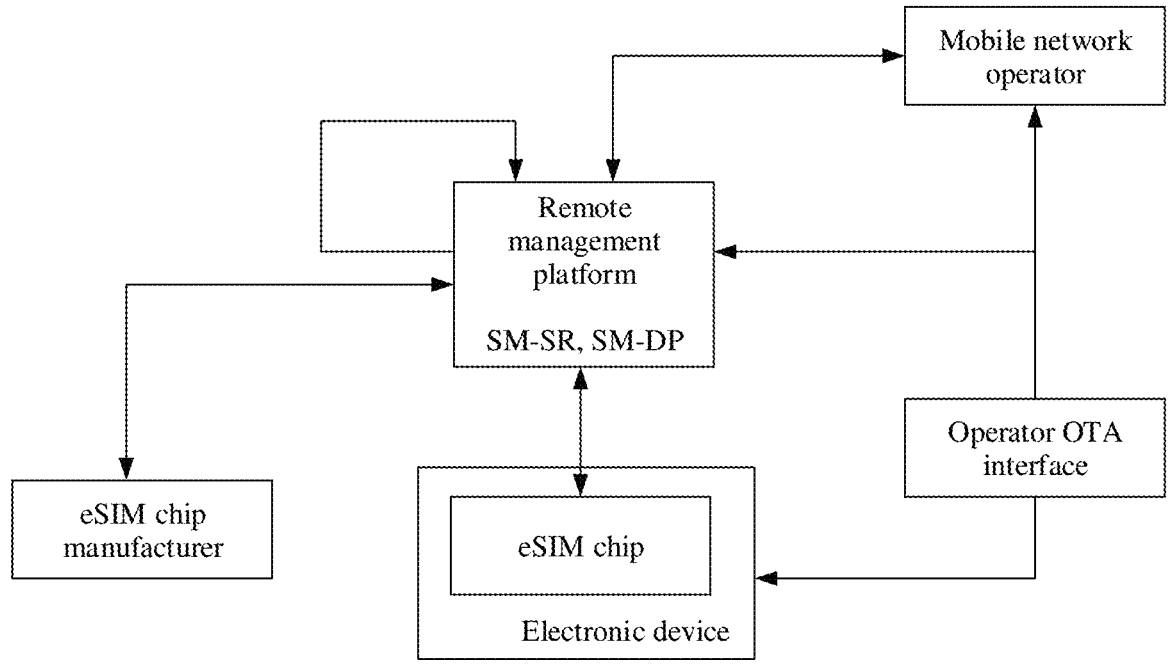
FIG. 2 is a schematic diagram of a relationship between a remote management platform and another communication role according to an embodiment of this application.

FIG. 2 is a schematic diagram of an example relationship between a remote management platform and another communication role according to an embodiment of this application.

The remote management platform is configured to obtain data from a mobile network operator system and establish a secure transmission channel between the remote management platform and an eSIM. The remote management platform may be interconnected to a plurality of operators, and may alternatively be interconnected to a plurality of remote management platforms. For data related to operators and eSIM manufacturers, a complete operator data file profile is generated by the remote management platform and then is downloaded to the eSIM in an OTA manner through an operator OTA interface.

The remote management platform includes two important modules:
data preparation (SM-DP), which is responsible for generating, storing, and downloading a profile that is obtained through remote configuration by the eSIM; and data routing (SM-SR), which is responsible for secure transmission and management of eSIM remote configuration data.

(8) Remote Service Provider (Remote Service Provider, RSP) Server

The RSP server is a specific communication server for an electronic device and a remote management platform.

It may be understood that a user may use profiles that belong to different operators, and the different operators may also use remote management platforms of different subjects. Therefore, when using different profiles, the electronic device may communicate with different RSP servers. A specific RSP server that communicates with the electronic device to manage a profile depends on a protocol among an eSIM manufacturer, the remote management platform, and an operator, and needs to be determined based on an actual situation. This is not limited in this embodiment of this application.

(9) Local Profile Assistant (Local Profile Assistant, LPA)

The LPA is configured to manage an eSIM on an electronic device, and mainly includes the following functions:
  obtaining, from a remote management platform, an event record that is about a profile in a local eSIM and that is registered by an SM-DP;
  obtaining the profile from the SM-DP and transferring the profile to the eSIM; and
  providing a user with a profile management function, including functions of activating, deactivating, deleting profiles, and the like.

(10) Multi-SIM Multi-Standby

Although two SIM cards can be inserted into an early multi-SIM mobile phone at the same time, only one SIM card is available at a time actually, and switching between the two cards is implemented by a hardware circuit. Due to impact of a protocol stack, the two SIM cards cannot be dynamically switched in a working state. When card switching is selected to be performed in a power-on state, a mobile phone system needs to be restarted (mainly a mobile phone protocol stack/upper-layer software is started, and the like). This mobile phone utilizes a dual-SIM single-standby system. The dual-SIM single-standby system has only one hardware transceiver module (including a baseband chip, a radio frequency chip, and an antenna) and one protocol stack. In the dual-SIM single-standby system, only one SIM card is available at a time, and another SIM card that is not started is in a power-off state and cannot receive information such as a call.

When only one hardware transceiver module is used, a protocol stack is scheduled (a plurality of protocol stacks are used to closely cooperate with each other, or one protocol stack is used to implement a more complex switching function), a time division multiplexing technology is used to divide time into small enough resources, and the resources are allocated to a plurality of profiles for performing services based on service requirements, to maximize antenna resource utilization. In this way, the plurality of profiles on an electronic device can be in a standby state at the same time, and separately receive information such as a call or process a data service.

Figure 3:
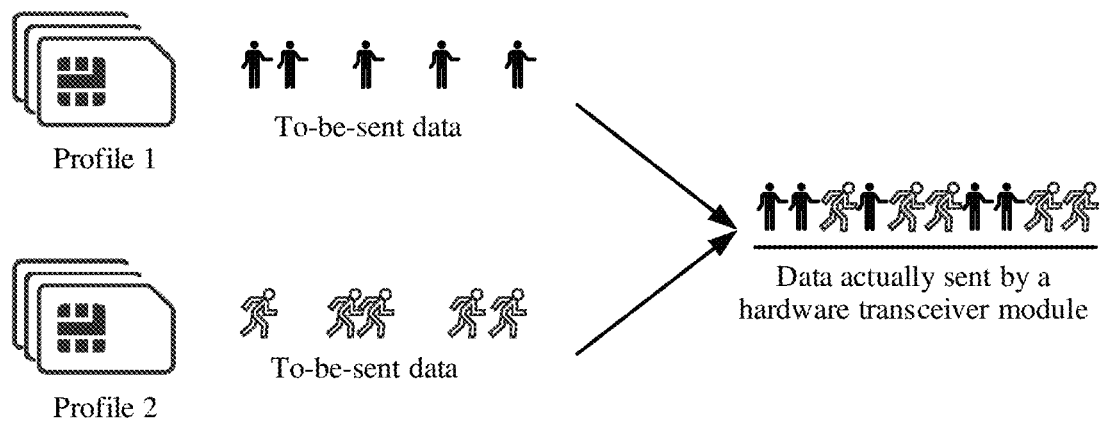
FIG. 3 is a schematic diagram of dual-SIM dual-standby data sending according to an embodiment of this application.

FIG. 3 is a schematic diagram of dual-SIM dual-standby data sending according to an embodiment of this application. Although there is only one hardware transceiver module, by using a time division multiplexing technology, data that needs to be sent on communication connections established based on a profile 1 and a profile 2 may be sent by using the hardware transceiver module. Because time that is divided is small enough, in a relatively long time dimension, it may be considered that data is simultaneously sent on the communication connections established based on the two profiles. The profile 1 and the profile 2 may be stored in a same eSIM, or may be stored in different eSIMs.

According to a use degree of the time division multiplexing technology, one hardware transceiver module may maintain communication connections established based on more profiles, and receive and send data. This is not limited herein.

Figure 4:
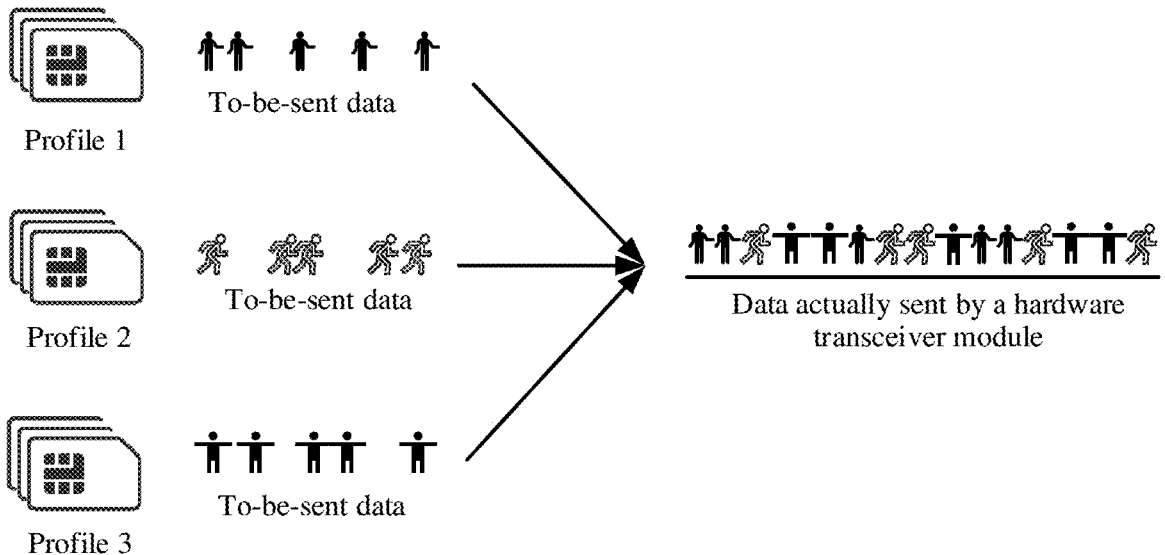
FIG. 4 is a schematic diagram of three-SIM three-standby data sending according to an embodiment of this application.

FIG. 4 is a schematic diagram of three-SIM three-standby data sending according to an embodiment of this application. By using a time division multiplexing technology on one hardware transceiver module, data that needs to be sent on communication connections established based on a profile 1, a profile 2, and a profile 3 may be sent by using this hardware transceiver module. The profile 1, the profile 2, and the profile 3 can be stored in a same eSIM or different eSIMs.

Figure 5:
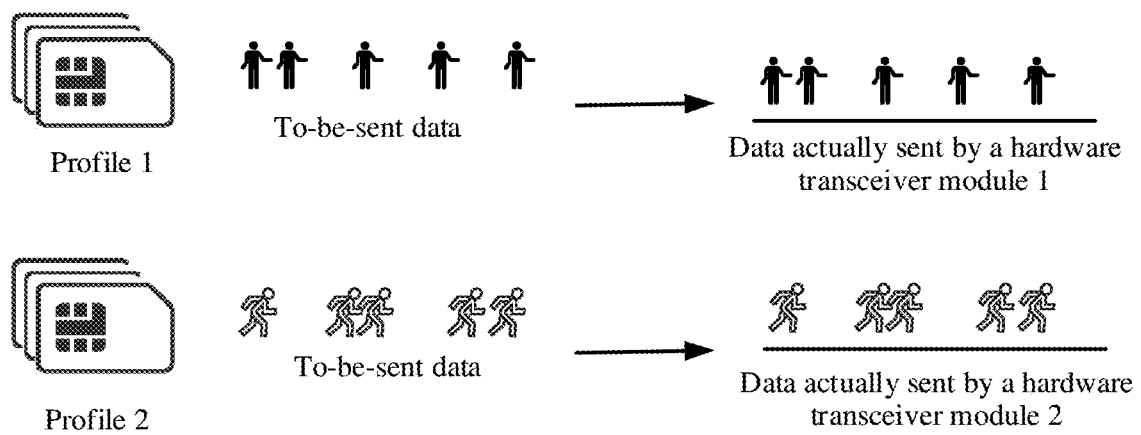
FIG. 5 is another schematic diagram of dual-SIM dual-standby data sending according to an embodiment of this application.

When there are a plurality of hardware transceiver modules, a plurality of profiles enabled at the same time may separately use the plurality of hardware transceiver modules to perform communication connections, and receive and send data. FIG. 5 is another schematic diagram of dual-SIM dual-standby data sending according to an embodiment of this application. In this case, an electronic device has two hardware transceiver modules. According to a preconfigured rule for using the hardware transceiver modules, a hardware transceiver module 1 is responsible for maintaining a communication connection established based on a profile 1, and receiving and sending data; and a hardware transceiver module 2 is responsible for maintaining a communication connection established based on a profile 2, and receiving and sending data.

Figure 6:
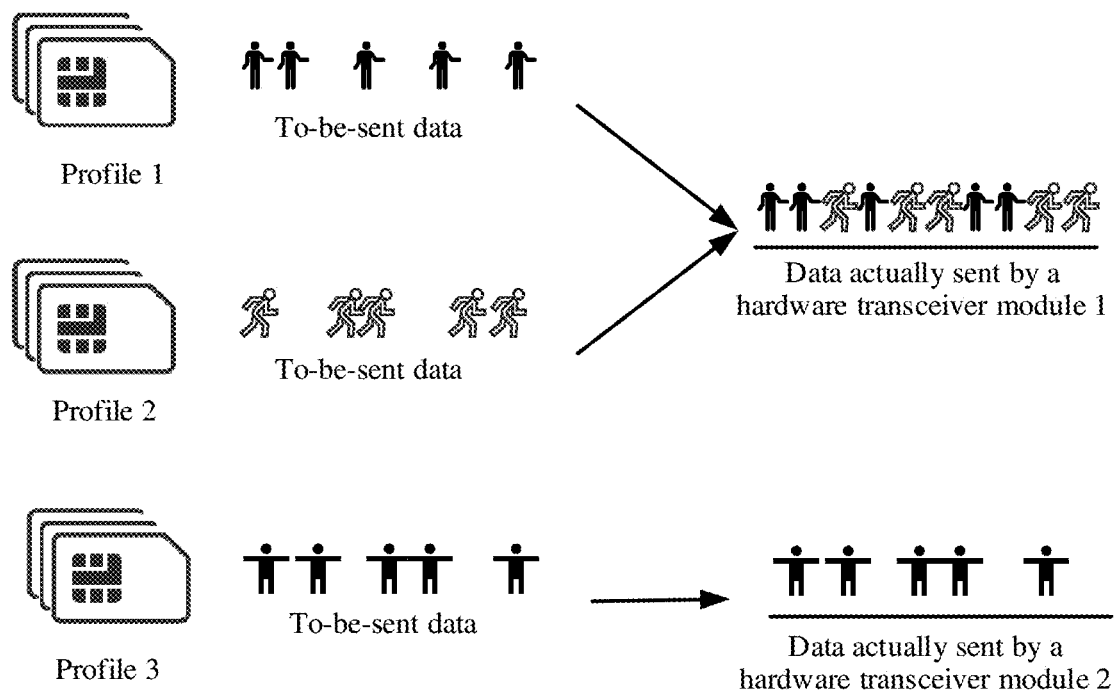
FIG. 6 is another schematic diagram of three-SIM three-standby data sending according to an embodiment of this application.

When there are a plurality of hardware transceiver modules, but a quantity of enabled profiles is greater than a quantity of the hardware transceiver modules, a time division multiplexing technology may be used, by using a correspondence of a preset threshold, on the hardware transceiver modules that need to maintain a plurality of communication connections at the same time, to implement simultaneous standby and data receiving and sending for the plurality of communication connections. FIG. 6 is another schematic diagram of three-SIM three-standby data sending according to an embodiment of this application. In this case, an electronic device has two hardware transceiver modules, three profiles are enabled at the same time, three communication connections established based on the three profiles need to be maintained at the same time, and data needs to be sent at the same time. According to a preconfigured rule for using the hardware transceiver modules, a hardware transceiver module 1 is responsible for maintaining communication connections established based on a profile 1 and a profile 2, and receiving and sending data; and a hardware transceiver module 2 is responsible for maintaining a communication connection established based on a profile 3, and receiving and sending data. Therefore, the hardware transceiver module 1 sends, by using a time division multiplexing technology, data that needs to be sent on the communication connections corresponding to the profile 1 and the profile 2, and the hardware transceiver module 2 sends data that needs to be sent on the communication connection corresponding to the profile 3.

It should be noted that, in the conventional technology, because a plurality of profiles cannot be simultaneously enabled in a same eSIM, the plurality of profiles that are simultaneously enabled in the conventional technology all come from a plurality of different hardware components. For example, enabling two profiles at the same time may be respectively enabling a profile of a SIM card in a SIM card slot and a profile in an eSIM. Enabling three profiles at the same time are enabling a profile of a SIM card in a SIM card slot and respective profiles of two eSIMs.

However, in this embodiment of this application, a plurality of profiles in a same eSIM chip may be simultaneously enabled. Therefore, the plurality of profiles that are simultaneously enabled may come from a same hardware component. For example, enabling two profiles at the same time may be enabling two different profiles in a same eSIM, and enabling three profiles at the same time may also be enabling three different profiles in a same eSIM.

(11) Maximum Quantity of Profiles that can be Simultaneously Enabled and Standby in an Electronic Device Based on the foregoing description of the multi-SIM multi-standby technology, it may be understood that a maximum quantity of profiles that can be simultaneously enabled and standby in the electronic device is a fixed value when the electronic device is delivered from a factory. This is related to both a quantity of hardware transceiver modules of the electronic device and a degree (depending on content and a quantity of protocol stacks) of using a time division multiplexing technology on one hardware transceiver module of the electronic device.

For example, if one electronic device has only one hardware transceiver module, but this hardware transceiver module can simultaneously maintain a maximum of three communication connections based on allocation of a related protocol stack, it is considered that a maximum quantity of profiles that can be simultaneously enabled and standby in the electronic device is 3. For another example, if one electronic device has two hardware transceiver modules, but based on allocation of a related protocol stack, one hardware transceiver module can maintain only one communication connection at a time, and the other hardware transceiver module can maintain only two communication connections at a time, it is considered that a maximum quantity of profiles that can be simultaneously enabled and standby in the electronic device is also only 3.

A manufacturer of an electronic device presets a corresponding quantity of IMEIs in the electronic device based on a maximum quantity of profiles that can be simultaneously enabled and standby in the electronic device.

For ease of description and understanding, in some of embodiments of this application, the maximum quantity of profiles that can be simultaneously enabled and standby in the electronic device is referred to as a preset threshold. During actual application, there may be another different name. This is not limited herein.

The following first describes an example electronic device 100 according to an embodiment of this application.

Figure 7:
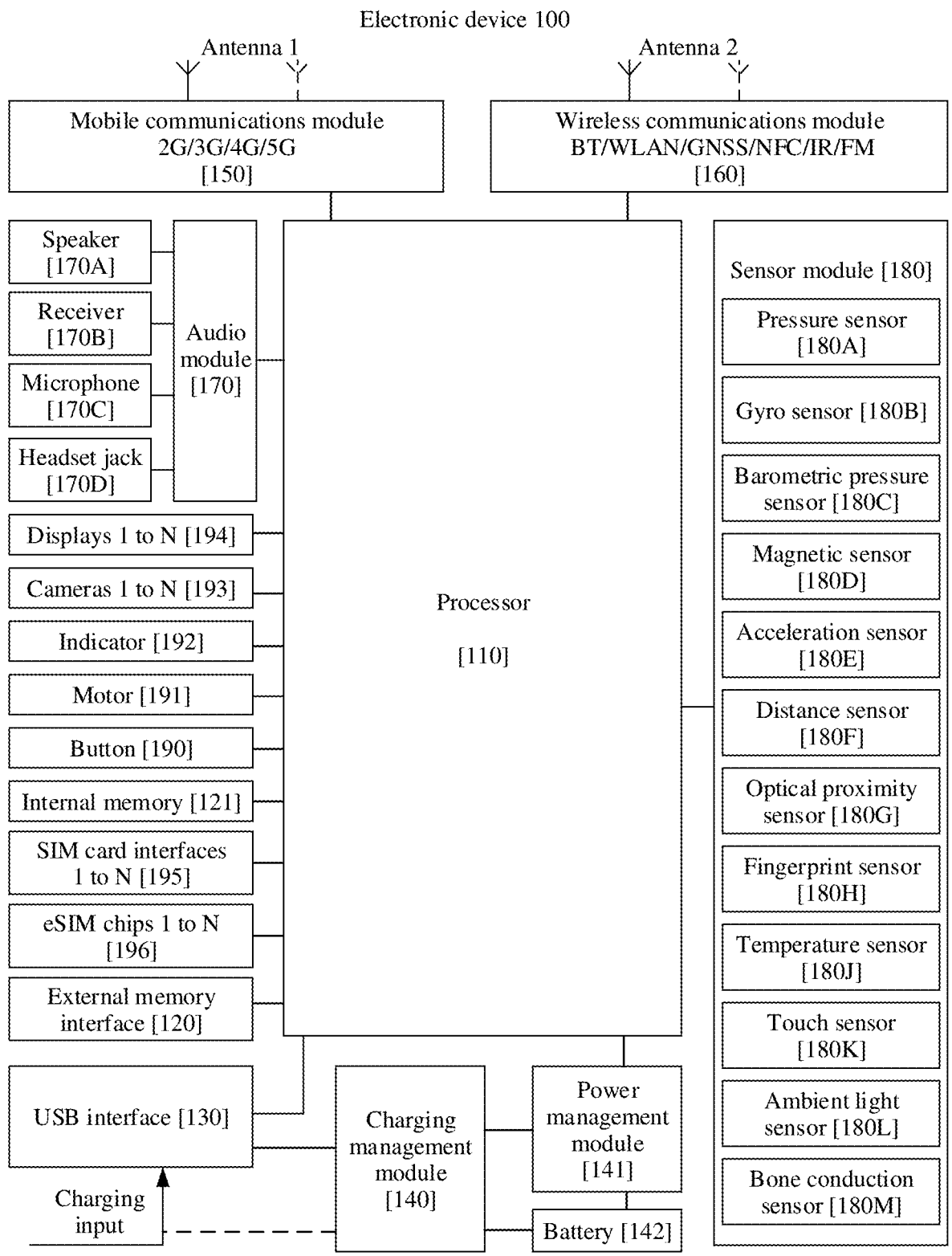
FIG. 7 is a schematic diagram of a structure of an electronic device according to an embodiment of this application.

FIG. 7 is a schematic diagram of a structure of the electronic device 100 according to this embodiment of this application.

The electronic device 100 is used as an example below to describe embodiments in detail. It should be understood that the electronic device 100 may have more or fewer components than those shown in the figure, or may combine two or more components, or may have different component configurations. Various components shown in the figure may be implemented by using hardware including one or more signal processing and/or application-specific integrated circuits, software, or a combination of hardware and software.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, an eSIM 196, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, or combine some components, or split some components, or have different component arrangements. The components shown in the figure may be implemented in hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on an instruction operation code and a time sequence signal, to control instruction fetching and instruction execution.

A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access and reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, an embedded-universal integrated circuit card (Embedded-Universal Integrated Circuit Card, eUICC) interface, a universal serial bus (universal serial bus, USB) interface, and/or the like.

The I2C interface is a wo-way synchronous serial bus, including a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through an I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and encode an analog signal. In some embodiments, the audio module 170 may be coupled to the wireless communications module 160 through the PCM bus interface. In some embodiments, the audio module 170 may alternatively transmit an audio signal to the wireless communications module 160 through the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), or the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as an I2C interface, an I2S interface, a UART interface, an MIPI interface, or the like.

The SIM interface may be configured to communicate with the SIM card interface 195, to implement a function of transmitting data to an SIM card or reading data in an SIM card.

The eUICC interface may be configured to communicate with the eSIM 196, to implement a function of sending data to the eSIM or reading data in the eSIM.

The USB interface 130 is an interface that complies with a USB standard specification, and may be specifically a mini USB interface, a micro USB interface, a USB Type-C interface, or the like. The USB interface 130 may be configured to connect to the charger to charge the electronic device 100, or may be configured to transmit data between the electronic device 100 and a peripheral device, or may be configured to connect to a headset to play audio through the headset. This interface may be further configured to connect to another electronic device such as an AR device.

It may be understood that an interface connection relationship between the modules that is shown in this embodiment of the present invention is merely an example for description, and constitutes no limitation on the structure of the electronic device 100. In other embodiments of this application, the electronic device 100 may alternatively use an interface connection mode different from that in the foregoing embodiment, or use a combination of a plurality of interface connection modes.

The charging management module 140 is configured to receive charging input from a charger. The charger may be a wireless charger or a wired charger.

The power management module 141 is configured to connect the battery 142 and the charging management module 140 to the processor 110. The power management module 141 receives input of the battery 142 and/or the charging management module 140, and supplies power to the processor 110, the internal memory 121, an external memory, the display 194, the camera 193, the wireless communications module 160, and the like.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communications frequency bands. Different antennas may further be multiplexed to improve antenna utilization. For example, the antenna 1 may be multiplexed as a diversity antenna of a wireless local area network. In some other embodiments, the antenna may be used in combination with a tuning switch.

The mobile communications module 150 may provide a solution, applied to the electronic device 100, to wireless communication including 2G, 3G, 4G, 5G, and the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some functional modules of the mobile communications module 150 may be disposed in the same device as at least some modules of the processor 110.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor, and then transferred to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in the same device as the mobile communications module 150 or another functional module.

The wireless communications module 160 may provide a wireless communication solution that is applied to the electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, or the like. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 of the electronic device 100 are coupled, and the antenna 2 and the wireless communications module 160 are coupled, so that the electronic device 100 may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (Beidou navigation satellite system, BDS), a quasi-zenith satellite system (quasi-zenith satellite system, QZSS), and/or a satellite based augmentation system (satellite based augmentation system, SBAS).

The electronic device 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, or the like. The display 194 includes a display panel. The display panel may use a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini LED, a micro LED, a micro OLED, a quantum dot light-emitting diode (quantum dot light-emitting diode, QLED), or the like. In some embodiments, the electronic device 100 may include one or N displays 194, where N is a positive integer greater than 1.

The internal memory 121 may be configured to store computer-executable program code. The executable program code includes instructions. The processor 110 runs the instructions stored in the internal memory 121 to perform various function applications of the electronic device 100 and data processing. The internal memory 121 may include a program storage area and a data storage area. The program storage area may store an operating system, an application required by at least one function (for example, a facial recognition function, a fingerprint recognition function, and a mobile payment function), and the like. The data storage area may store data (such as facial information template data and a fingerprint information template) created during use of the electronic device 100. In addition, the internal memory 121 may include a high-speed random access memory, and may further include a nonvolatile memory, for example, at least one magnetic disk storage device, a flash storage device, or a universal flash storage (universal flash storage, UFS).

The electronic device 100 may implement audio functions by using the audio module 170, the speaker 170A, the receiver 170B, the microphone 170C, the headset jack 170D, the application processor, and the like.

The pressure sensor 180A is configured to sense a pressure signal, and can convert the pressure signal into an electrical signal.

The fingerprint sensor 180H is configured to collect a fingerprint. The electronic device 100 may implement fingerprint-based unlocking, application access locking, fingerprint-based photographing, fingerprint-based call answering, and the like by using a feature of the collected fingerprint.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor to determine a type of the touch event. The display 194 may provide a visual output related to the touch operation. In some other embodiments, the touch sensor 180K may alternatively be disposed on a surface of the electronic device 100 at a location different from that of the display 194.

The button 190 includes a power button, a volume button, and the like. The button 190 may be a mechanical button, or may be a touch button. The electronic device 100 may receive a key input, and generate a key signal input related to a user setting and function control of the electronic device 100.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into the same SIM card interface 195 at the same time. The plurality of cards may be of a same type or of different types. The SIM card interface 195 is compatible to different types of SIM cards. The SIM card interface 195 is also compatible with an external memory card. The electronic device 100 interacts with a network through the SIM card, to implement functions such as calling and data communication.

The eSIM 196 is used for storing a profile. The electronic device 100 may support one or N eSIMs, where N is a positive integer greater than 1. A same eSIM 196 can store a plurality of profiles at the same time. The plurality of stored profiles may belong to a same operator, or may belong to different operators. The electronic device 100 interacts with a network through the profile stored in the eSIM, to implement functions such as calling and data communication. The eSIM may be embedded in the electronic device 100, and cannot be separated from the electronic device 100.

Figure 8:
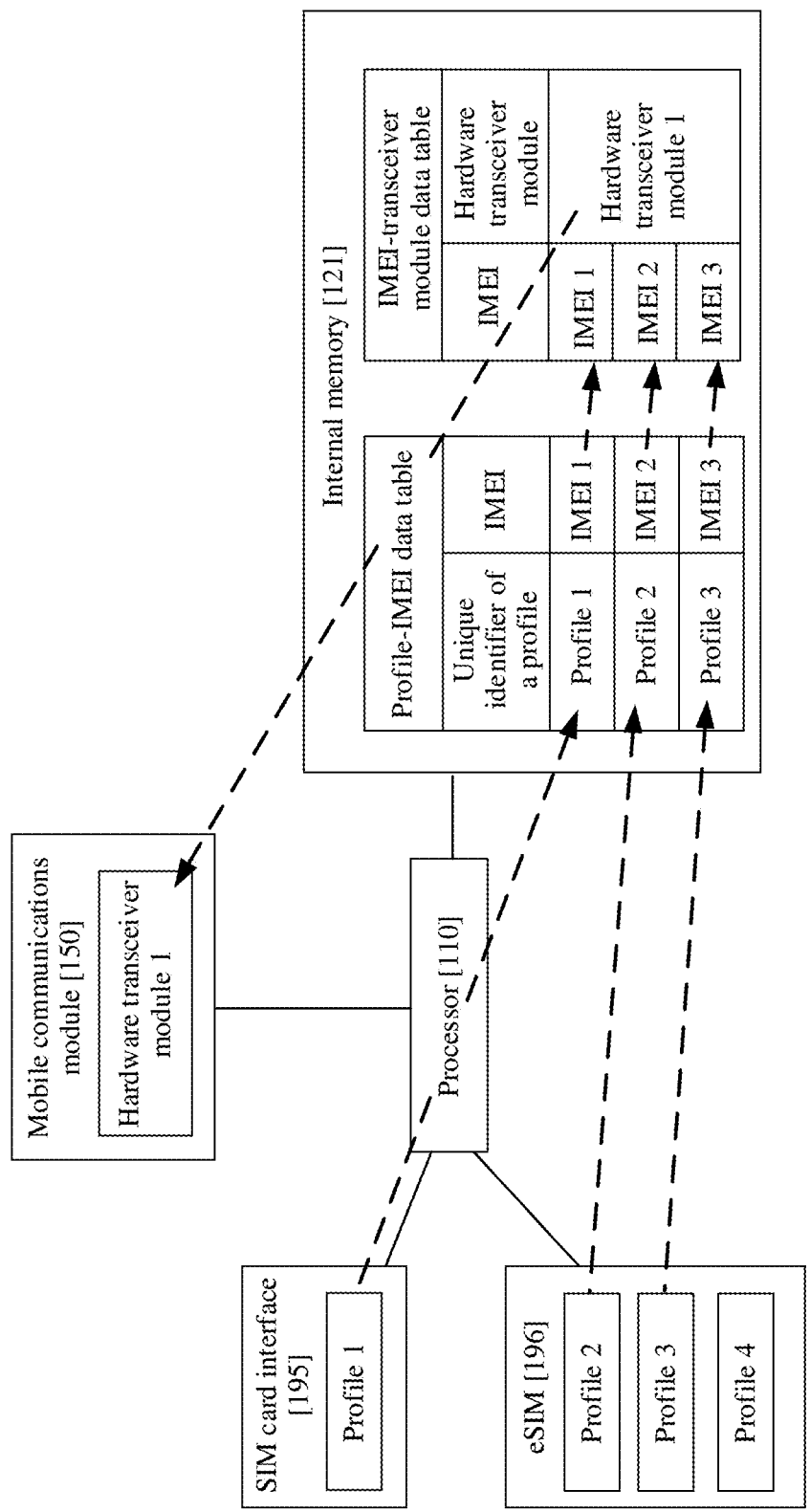
FIG. 8 is a schematic diagram of allocating a hardware transceiver module according to an embodiment of this application.
Figure 9:
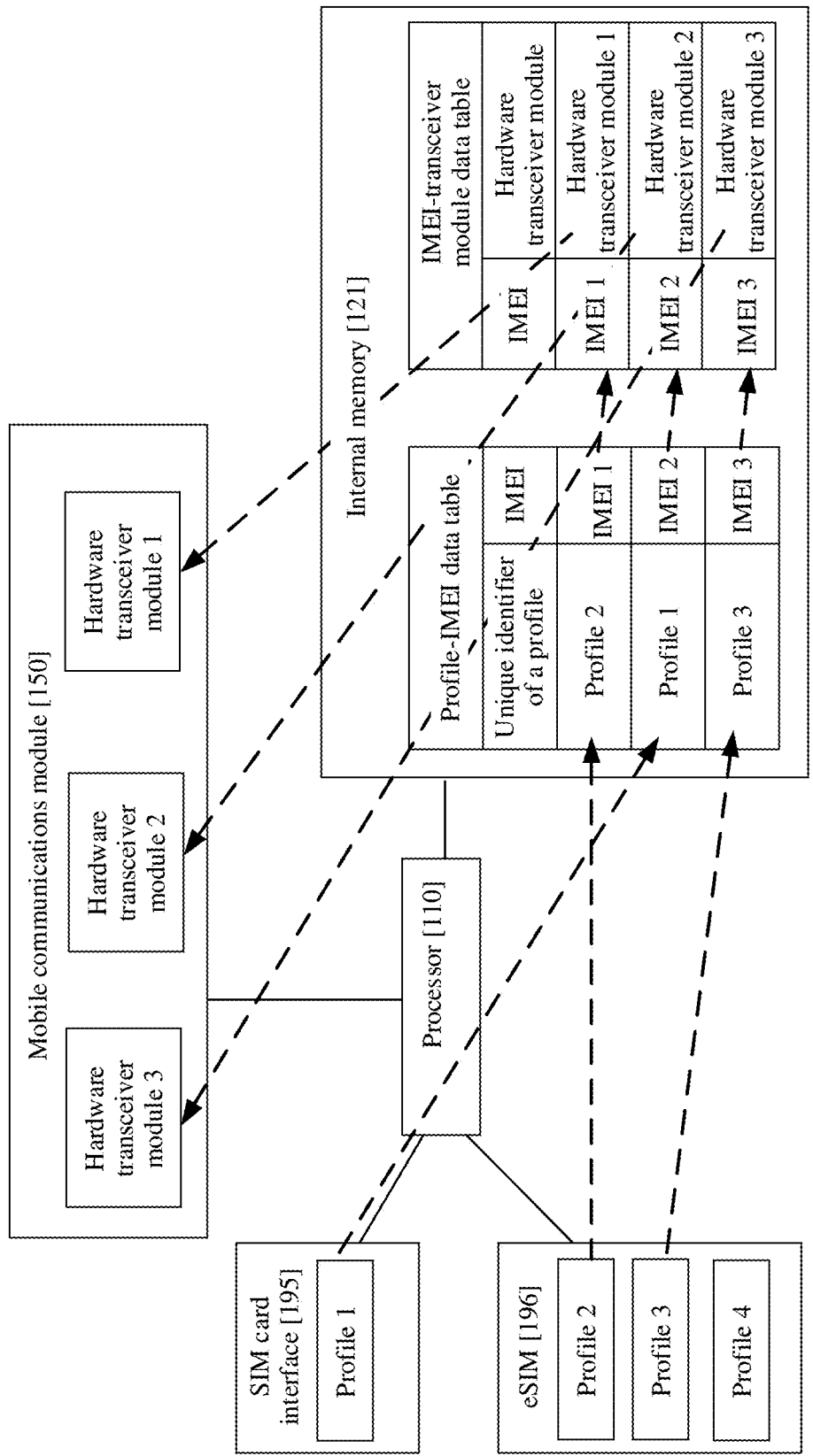
FIG. 9 is another schematic diagram of allocating a hardware transceiver module according to an embodiment of this application.
Figure 10:
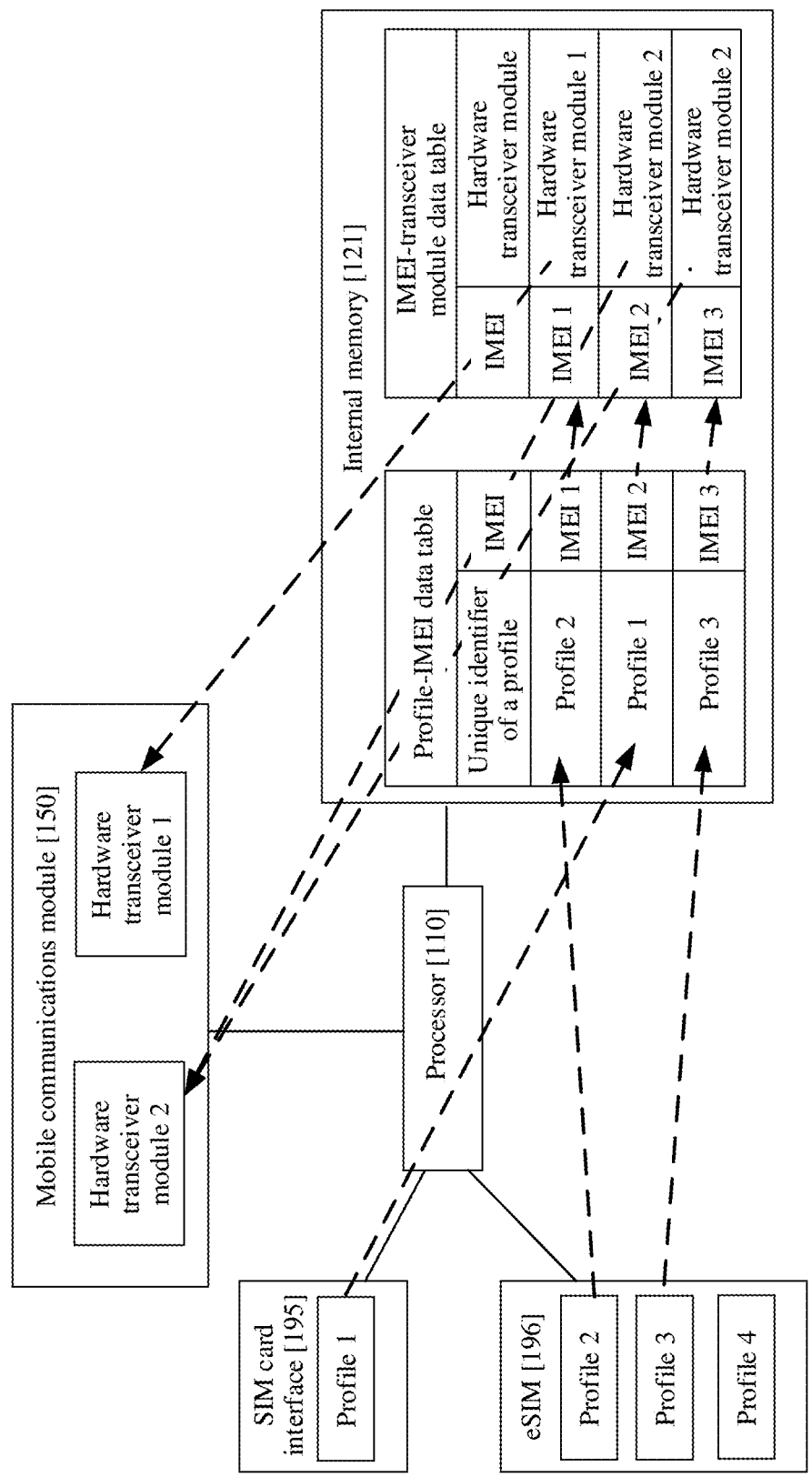
FIG. 10 is another schematic diagram of allocating a hardware transceiver module according to an embodiment of this application.

With reference to the hardware structure of the electronic device 100 in this embodiment of this application, as shown in FIG. 8 to FIG. 10, the following describes a process in which when the mobile communications module 150 in the electronic device 100 in this embodiment of this application includes different quantities of hardware transceiver modules, a plurality of profiles are enabled, and a plurality of communication connections need to be established based on the plurality of profiles, the electronic device 100 allocates IMEIs to the profiles, and allocates hardware transceiver modules to the communication connections that need to be established. The hardware transceiver module in this application may be a radio frequency receiving circuit and a sending circuit.

It may be understood that the internal memory 121 stores to-be-allocated IMEIs whose quantity corresponds to a maximum quantity of profiles that can be simultaneously enabled and standby in the electronic device. In addition, the internal memory 121 further stores two correspondences. One correspondence is an IMEI correspondence allocated to a profile when the profile is activated, and is referred to as a profile-IMEI correspondence below for ease of description. The other correspondence is a configuration for allocating a hardware transceiver module, namely, a correspondence between an IMEI and the hardware transceiver module, and is referred to as an IMEI-transceiver module correspondence below for ease of description. The two correspondences may be represented in a plurality of forms in the internal memory 121, such as a data table, an array, and a function. This is not limited herein. In addition, these correspondences may be represented in one place, or may be separately stored in a plurality of places for representation. This is not limited herein.

As an implementation, a correspondence between a profile and an IMEI may not be fixed, and may be changed. For example, when a profile 1 is activated, the profile 1 is allocated to correspond to an IMEI 2. Then, a user deactivates the profile 1 to change the profile 1 from activated to deactivated. After a profile 2 is activated, the profile 2 may be allocated to correspond to the IMEI 2. After the correspondence between the profile and the IMEI changes, the correspondence that is between the profile and the IMEI and that is stored in the memory is updated.

The correspondence between the IMEI and a hardware transceiver module may not be fixed, and may be changed. After the correspondence between the IMEI and the hardware transceiver module changes, the correspondence that is between the IMEI and the hardware transceiver module and that is stored in the memory is updated.

The following provides description by using an example in which the two sets of correspondences are separately stored in the internal memory 121 in a form of a data table.

The following first describes the profile-IMEI correspondence with reference to a specific allocation scenario as an example. In some implementations, a data table that stores the profile-IMEI correspondence is referred to as a profile-IMEI data table.

It is assumed that a maximum quantity of profiles that can be simultaneously enabled and standby in the electronic device is 3, and three IMEIs are set in the internal memory 121 and separately are an IMEI 1, an IMEI 2, and an IMEI 3. There is a SIM card interface 195 in the electronic device 100. A SIM is inserted into the SIM card interface 195, and includes a profile 1. There is an eSIM 196 in the electronic device 100, and three profiles are downloaded and installed in the eSIM 196 and separately are a profile 2, a profile 3, and a profile 4. The profile 2 is activated. In this case, Table 1 shows an example profile-IMEI data table in the internal memory 121. A correspondence between a unique identifier of the profile 2 and the IMEI 2 allocated to the profile 2 is stored.

TABLE 1

| IMEI | Unique identifier of a profile |
| --- | --- |
| IMEI 2 | Unique identifier of the profile 2 |

When the profile 3 is activated and an IMEI needs to be allocated to the profile 3, at least the following manners may be used.

1. Random Allocation

An IMEI (for example, the IMEI 3) is randomly selected from the IMEI 1 and the IMEI 3 that have not been allocated, is allocated to the profile 3, and is recorded in the profile-IMEI data table. In this case, Table 2 shows an example profile-IMEI data table in the internal memory 121.

TABLE 2

| IMEI | Unique identifier of a profile |
| --- | --- |
| IMEI 2 | Unique identifier of the profile 2 |
| IMEI 3 | Unique identifier of the profile 3 |

2. Allocation in a Value Sequence

The IMEI 1 with a smaller value is selected, in a value sequence, from the IMEI 1 and the IMEI 3 that have not been allocated, is allocated to the profile 3, and is recorded in the profile-IMEI data table. In this case, Table 3 is an example profile-IMEI data table in the internal memory 121.

TABLE 3

| IMEI | Unique identifier of a profile |
|---|---|
| IMEI 2 | Unique identifier of the profile 2 |
| IMEI 1 | Unique identifier of the profile 3 |

3. First-In First-Out Allocation

In this allocation manner, all IMEIs to be allocated are stored in a stack and comply with a last-in first-out principle. If the IMEI 3 is a newly released IMEI after an activated profile is deactivated, the IMEI 3 is stored at the top of the stack. If the profile 3 is activated, the IMEI 3 is first out of the stack, is allocated to the profile 3, and is recorded in the profile-IMEI data table. An example thereof may be shown in Table 2.

4. Preferential Allocation Based on a Recent Allocation Historical Record

In this allocation manner, the internal memory 121 further has a recent allocation historical record table, which records an IMEI most recently allocated to the profile. A representation form of the table may be shown in Table 4.

TABLE 4

| Unique identifier of a profile | Most recently allocated IMEI |
|---|---|
| Unique identifier of the profile 1 | IMEI 1 |
| Unique identifier of the profile 2 | IMEI 2 |
| Unique identifier of the profile 3 | IMEI 3 |
| Unique identifier of the profile 4 | IMEI 1 |

When the profile 3 is activated, the electronic device searches the recent allocation historical record table, and learns that an IMEI allocated when the profile 3 is activated most recently is the IMEI 3. In this case, the electronic device determines that the IMEI 3 is currently not allocated, allocates the IMEI 3 to the activated profile 3, and records the IMEI 3 in the profile-IMEI data table. An example of a representation form thereof may be shown in Table 2.

In a possible case, it is possible that the IMEI that is most recently allocated to the profile 3 and that is recorded in the recent allocation historical record table has been allocated currently. For example, it is assumed that the recent allocation historical record table is shown in Table 5.

TABLE 5

| Unique identifier of a profile | Most recently allocated IMEI |
|---|---|
| Unique identifier of the profile 1 | IMEI 1 |
| Unique identifier of the profile 2 | IMEI 2 |
| Unique identifier of the profile 3 | IMEI 2 |
| Unique identifier of the profile 4 | IMEI 3 |

An IMEI most recently allocated to the profile 2 is the IMEI 2, and the IMEI 2 has been currently allocated to the activated profile 2. In this case, the electronic device may allocate an unallocated IMEI to the profile 2 in another allocation manner (for example, one of the foregoing allocation manners), and update the recent allocation historical record table.

For example, when determining that the IMEI 2 most recently allocated to the profile 3 has been allocated, the electronic device allocates the IMIE 3 to the activated profile 3 in a random allocation manner, and records it in the profile-IMEI data table. An example thereof may be shown in Table 2. The recent allocation historical record table is updated as shown in Table 6.

TABLE 6

| Unique identifier of a profile | Most recently allocated IMEI |
|---|---|
| Unique identifier of the profile 1 | IMEI 1 |
| Unique identifier of the profile 2 | IMEI 2 |
| Unique identifier of the profile 3 | IMEI 3 |
| Unique identifier of the profile 4 | IMEI 3 |

5. Preferential Allocation According to a Sequence of Idle IMEIs in the Profile-IMEI Data Table In this allocation manner, after a profile is deactivated, the electronic device does not delete an IMEI record in the profile-IMEI data table, but only deletes a unique identifier record of the profile. For example, Table 7 is an example profile-IMEI data table in the internal memory 121 in this case.

TABLE 7

| IMEI | Unique identifier of a profile |
|---|---|
| IMEI 1 | |
| IMEI 2 | Unique identifier of the profile 2 |
| IMEI 3 | |

Before this, the profile 1, the profile 2, and the profile 3 are enabled at the same time, and the IMEI 1, the IMEI 2, and the IMEI 3 are respectively allocated to the profile 1, the profile 2, and the profile 3. After the profile 1 and the profile 3 are deactivated, the unique identifiers of the profile 1 and the profile 3 are deleted from the profile-IMEI data table, but the IMEI 1 and the IMEI 3 are not deleted. When a new profile 3 is activated, it is determined that there is a null value in the profile-IMEI data table. In this case, a unique identifier of the profile 3 is directly recorded at a location corresponding to the IMEI 1 in sequence, to obtain an example of the profile-IMEI data table shown in Table 8.

TABLE 8

| IMEI | Unique identifier of a profile |
|---|---|
| IMEI 1 | Unique identifier of the profile 3 |
| IMEI 2 | Unique identifier of the profile 2 |
| IMEI 3 | |

If it is determined that there is no null value in the profile-IMEI data table when the new profile 3 is activated, an unallocated IMEI is allocated to the profile 3 in another allocation manner (for example, one of the foregoing allocation manners).

In addition to the foregoing allocation manners, the electronic device may further use another allocation manner based on a presetting, for example, a manner of preferential allocation based on a largest quantity of historical matching times, or a manner of allocation in a first-in last-out sequence. This is not limited herein.

In an optional implementation, the profile-IMEI data table is not limited to recording the correspondence between the IMEI and the unique identifier of the profile, and may further record correspondences between more data for direct invoking in a subsequent process. For example, the profile-IMEI data table may alternatively be a correspondence among an IMEI, a unique identifier of a profile, and an IMSI. Table 9 is an example profile-IMEI data table in this case. A correspondence among a unique identifier of the profile 2, an IMSI 2 in the profile 2, and the IMEI 2 allocated to the IMSI 2 is stored.

TABLE 9

| IMEI | Unique identifier of a profile | IMSI |
|---|---|---|
| IMEI 2 | Unique identifier of the profile 2 | IMSI 2 |

It may be understood that, in this optional implementation of the profile-IMEI data table, the foregoing different IMEI allocation manners may also be used based on requirements. This is not limited herein.

With reference to a specific scenario in which the mobile communications module 150 includes different quantities of hardware transceiver modules as an example, the following describes a process of allocating a hardware transceiver module based on an IMEI-transceiver module correspondence. In some implementations, a data table storing the IMEI-transceiver module correspondence is referred to as an IMEI-transceiver module data table.

Case 1: There is Only One Hardware Transceiver Module.

FIG. 8 is a schematic diagram of allocating a hardware transceiver module according to an embodiment of this application. In this case, a profile 1 in a SIM inserted into the SIM card interface 195, and a profile 2 and a profile 3 in the eSIM 196 are all enabled. When communication connections are established based on the profile 1, the profile 2, and the profile 3, the processor 110 separately allocates an IMEI based on a correspondence in a profile-IMEI data table stored in the internal memory 121. In addition, according to a default configuration (the default configuration may be represented as an IMEI-transceiver module data table shown in FIG. 8) stored in the internal memory 121, the processor 110 allocates, within a capability range of only one hardware transceiver module 1 in the mobile communications module 150, the hardware transceiver module 1 to establish and maintain a communication connection, and send and receive data, and the profile 1, the profile 2, and the profile 3 perform a time-sharing communication connection.

Case 2: There are N Hardware Transceiver Modules, and a Maximum Quantity of Profiles that can be Simultaneously Enabled and Standby in the Electronic Device is N.

It may be understood that, in this case, an independent hardware transceiver module is allocated to each enabled profile. The IMEI-transceiver module data table stored in the internal memory 121 has correspondences between N IMEIs and N hardware transceiver modules. After a profile is enabled and activated, the processor 110 allocates an IMEI to the profile. According to the IMEI allocated to the profile, the processor 110 allocates, based on a correspondence that is between the IMEI and a hardware transceiver module and that is stored in the internal memory 121, a corresponding hardware transceiver module to establish and maintain a communication connection, and send and receive data for the profile.

FIG. 9 is another schematic diagram of allocating a hardware transceiver module according to an embodiment of this application. For example, the electronic device has three hardware transceiver modules, and a maximum quantity of profiles that can be simultaneously enabled and standby in the electronic device is 3. In this case, correspondences between three IMEIs (an IMEI 1, an IMEI 2, and an IMEI 3) and three hardware transceiver modules (a hardware transceiver module 1, a hardware transceiver module 2, and a hardware transceiver module 3) are separately set in the internal memory 121. After the profile 1 in the SIM card inserted into the SIM card interface 195 is activated, because an IMEI allocated to the profile 1 is the IMEI 2, a hardware transceiver module that corresponds to the IMEI 2 and that is stored in the internal memory 121 is the hardware transceiver module 2. Therefore, the hardware transceiver module 2 is allocated and used to establish and maintain a communication connection and send and receive data for the profile 1. After the profile 2 in the eSIM 196 is activated, because an IMEI allocated to the profile 2 is the IMEI 1, and a hardware transceiver module that corresponds to the IMEI 1 and that is stored in the internal memory 121 is the hardware transceiver module 1, the hardware transceiver module 1 is allocated and used to establish and maintain a communication connection, and send and receive data for the profile 2. After the profile 3 in the eSIM 196 is activated, because an IMEI allocated to the profile 3 is the IMEI 3, and a hardware transceiver module that corresponds to the IMEI 1 and that is stored in the internal memory 121 is the hardware transceiver module 3, the hardware transceiver module 3 is allocated and used to establish and maintain a communication connection, and send and receive data for the profile 3.

Case 3: There are N Hardware Transceiver Modules, and a Maximum Quantity of Profiles that can be Simultaneously Enabled and Standby in the Electronic Device is Greater than N.

In this case, each hardware transceiver module has an upper limit of a maximum quantity of communication connections that can be maintained simultaneously. When a profile is enabled and a communication connection needs to be established, the electronic device 100 may enable, based on a capability of each hardware transceiver module and a current status of each hardware transceiver module, a hardware transceiver module that is currently capable of maintaining more communication connections to establish the communication connection. There may be a plurality of manners of allocating, according to a preconfigured hardware transceiver module usage rule, the hardware transceiver module for establishing the communication connection, for example, a manner of allocating according to an idle sequence, a manner of random allocation, or a manner of allocating based on a historical record. For various allocation manners, refer to various manners of allocating an IMEI to a profile. Details are not described herein. A specific allocation manner is not limited herein.

The following describes, by using an example in which the electronic device 100 has two hardware transceiver modules and a maximum quantity of profiles that can be simultaneously enabled and that can be in a standby state in the electronic device is 3, a hardware transceiver module that is allocated and used to establish a communication connection. As shown in FIG. 10, a hardware transceiver module 1 supports establishment and maintenance of one communication connection, and a hardware transceiver module 2 supports establishment and maintenance of two communication connections. When a communication connection is established based on a profile 1 in a SIM card inserted into the SIM card interface 195, a profile-IMEI data table in the internal memory 121 is queried to determine that an IMEI allocated to the profile 1 is an IMEI 1, and an IMEI-transceiver module data table in the internal memory 121 is queried to determine that a hardware transceiver module allocated to the IMEI 1 is the hardware transceiver module 1. Therefore, the hardware transceiver module 1 is used to establish and maintain the communication connection and send and receive data for the profile 1. When a communication connection is established based on a profile 2 in the eSIM 196, a profile-IMEI data table in the internal memory 121 is queried to determine that an IMEI allocated to the profile 2 is an IMEI 2, and an IMEI-transceiver module data table in the internal memory 121 is queried to determine that a hardware transceiver module allocated to the IMEI 2 is the hardware transceiver module 2. Therefore, the hardware transceiver module 2 is used to establish and maintain the communication connection and send and receive data for the profile 2. When a communication connection is established based on a profile 3 in the eSIM 196, a profile-IMEI data table in the internal memory 121 is queried to determine that an IMEI allocated to the profile 3 is an IMEI 3, and an IMEI-transceiver module data table in the internal memory 121 is queried to determine that a hardware transceiver module allocated to the IMEI 3 is also the hardware transceiver module 2. Therefore, the hardware transceiver module 2 is used to establish and maintain the communication connection and send and receive data for the profile 3.

A software system of the electronic device 100 may use a layered architecture, an event-driven architecture, a microkernel architecture, a micro service architecture, or a cloud architecture. In an embodiment of the present invention, an Android system with a layered architecture is used as an example to describe a software structure of the electronic device 100.

Figure 11:
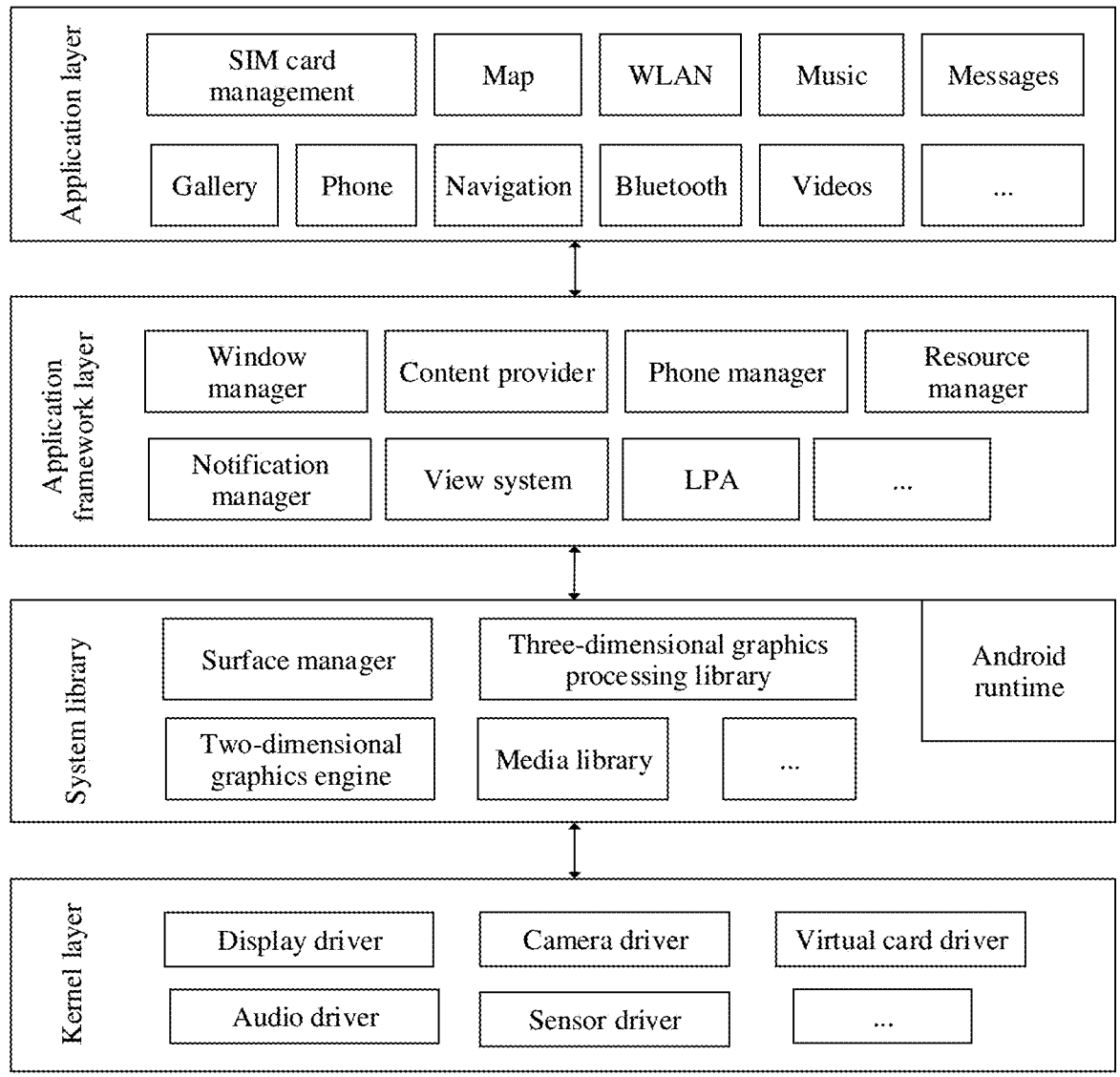
FIG. 11 is a schematic diagram of a software architecture according to an embodiment of this application.

FIG. 11 is a block diagram of the software structure of the electronic device 100 according to this embodiment of the present invention.

In the layered architecture, software is divided into several layers, and each layer has a clear role and task. The layers communicate with each other through a software interface. In some embodiments, the Android system is divided into four layers, namely, an application layer, an application framework layer, an Android runtime (Android runtime) and system library, and a kernel layer from top to bottom.

The application layer may include a series of application packages.

As shown in FIG. 11, the application packages may include applications (or referred to as an application program) such as "SIM card management" and/or "eSIM management, "camera", "gallery", "calendar", "phone", "maps", "navigation", "WLAN", "Bluetooth", "music", "videos", and "messages".

The application framework layer provides an application programming interface (application programming interface, API) and a programming framework for an application at the application layer. The application framework layer includes some predefined functions.

As shown in FIG. 11, the application framework layer may include a window manager, a content provider, a view system, a phone manager, a resource manager, a notification manager, a local profile assistant (Local Profile Assistant, LPA), and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history, a bookmark, an address book, and the like.

The view system includes visual controls, such as a control for displaying a text and a control for displaying an image. The view system may be configured to construct an application. A display interface may include one or more views. For example, a display interface including an SMS message notification icon may include a text display view and an image display view.

The phone manager is configured to provide a communication function of the electronic device 100, for example, management of a call status (including answering, declining, or the like).

The resource manager provides, for an application, various resources such as a localized character string, an icon, an image, a layout file, and a video file.

The notification manager enables an application to display notification information in the status bar, and may be configured to transmit a notification-type message. The displayed information may automatically disappear after a short pause without user interaction. For example, the notification manager is configured to notify download completion, give a message notification, and the like. The notification manager may alternatively be a notification that appears in a status bar on top of the system in a form of a graph or a scroll bar text, for example, a notification of an application running on the background, or a notification that appears on the screen in a form of a dialog interface. For example, text information is prompted in the status bar, a prompt tone is produced, the electronic device vibrates, or an indicator light blinks.

The LPA is configured to provide an operation function of the electronic device 100 for a profile stored in the eSIM 196.

The Android runtime (Android Runtime) includes a kernel library and a virtual machine. The Android runtime is responsible for scheduling and management of the Android system.

The kernel library includes two parts: One part is a performance function that needs to be invoked by Java language, and the other part is an Android kernel library.

The application layer and the application framework layer run in the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a two-dimensional graphics engine (for example, SGL).

The surface manager is configured to manage a display subsystem and provide fusion of two-dimensional (2-Dimensional, 2D) and three-dimensional (3-Dimensional, 3D) image layers for a plurality of applications.

The media library supports playback and recording in a plurality of commonly used audio and video formats, static image files, and the like. The media library may support a plurality of audio and video coding formats, such as MPEG-4, H.264, MP3, AAC, AMR, JPG, and PNG.

The three-dimensional graphics processing library is configured to implement 3D graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, a sensor driver, and a virtual card driver.

The following describes examples of working procedures of software and hardware of the electronic device 100 with reference to a photographing capture scenario.

When the touch sensor 180K receives a touch operation, a corresponding hardware interruption is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. For example, the touch operation is a single-tap operation and a control corresponding to the single-tap operation is a control of a camera application icon. A camera application invokes an interface at the application framework layer, so that the camera application is started. Then, the camera driver is started by invoking the kernel layer, and a static image or a video is captured by using the camera 193.

In the conventional technology, if an electronic device supports dual standby and has an eSIM that stores a plurality of profiles and a SIM card slot into which one SIM card is inserted, and one profile in the eSIM has been enabled, when a user needs to perform an operation of enabling another profile, for an operation process of the user on the electronic device, refer to FIG. 12*a*, FIG. 12*b*, FIG. 12*c*, FIG. 12*d*, FIG. 12*e*, and FIG. 12*f*.

Figure 12A:
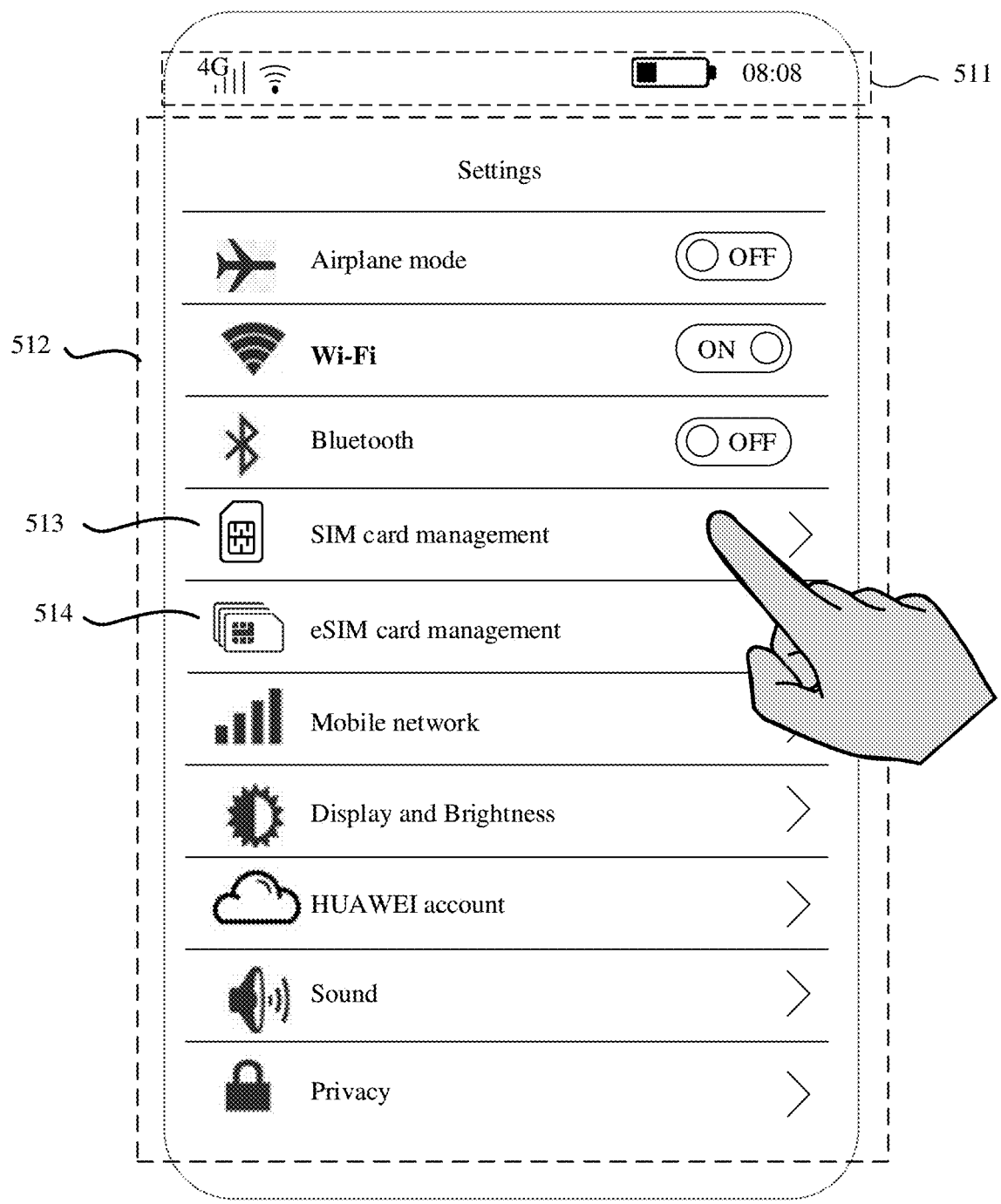
FIG. 12a to FIG. 12f are schematic diagrams of a group of interfaces in the conventional technology according to an embodiment of this application.

As shown in FIG. 12*a*, the electronic device displays a user interface 51. The user interface 51 includes a status bar 511 and a setting area 512. The setting area 512 includes a plurality of setting options, and the plurality of setting options include SIM card management 513 and eSIM management 514.

Figure 12B:
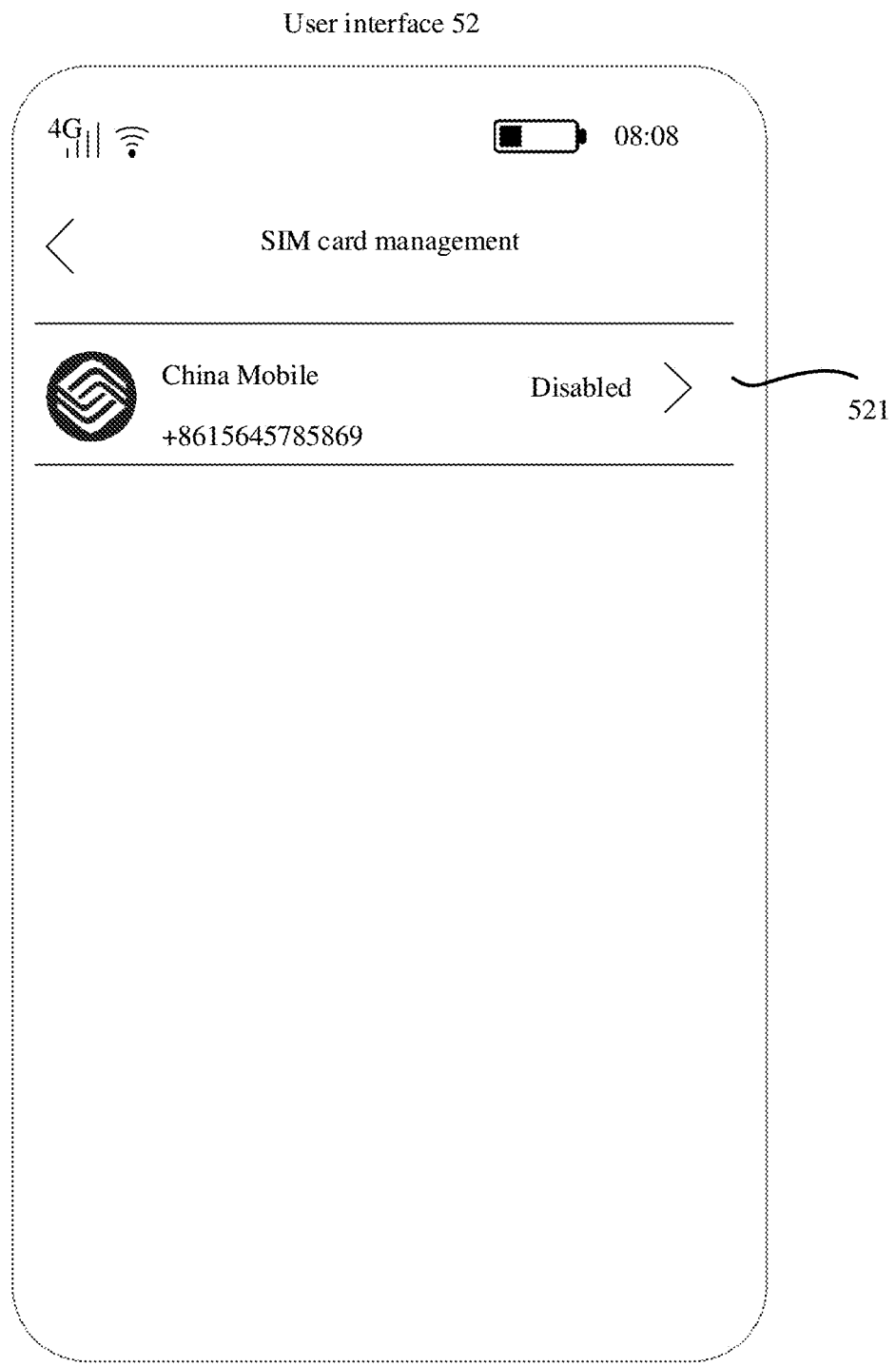

When a tap operation on the SIM card management 513 in the user interface 51 shown in FIG. 12*a* is detected, the electronic device displays, in response to the operation, a user interface 52 shown in FIG. 12*b*. A SIM card option 521 is displayed in a SIM card management area of the user interface 52, and the SIM card option displays a current state of the SIM card as disabled.

Figure 12C:
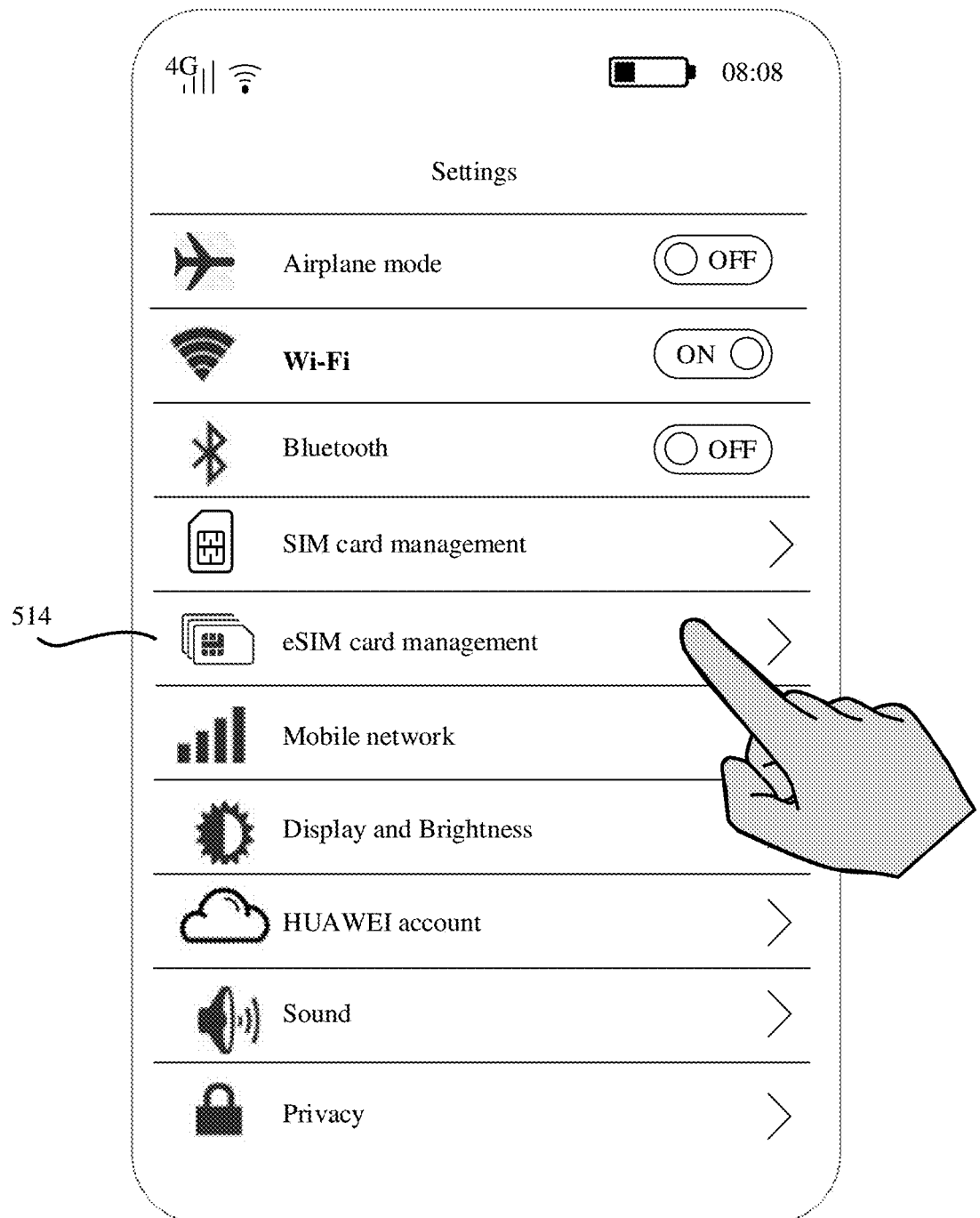
Figure 12D:
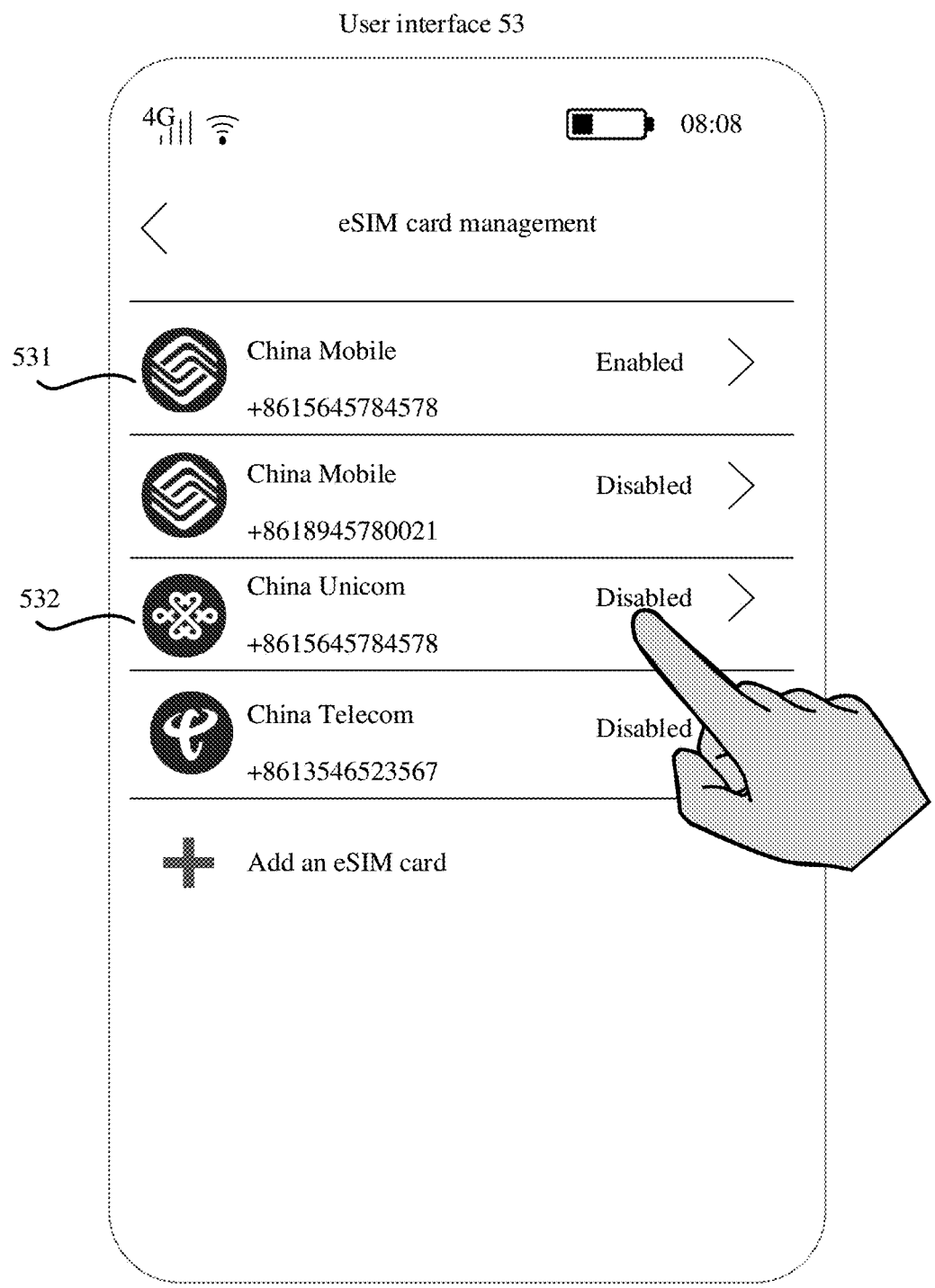

When a tap operation on the eSIM management 514 in the user interface 51 shown in FIG. 12*c* is detected, the electronic device displays, in response to the operation, a user interface 53 shown in FIG. 12*d*. Four eSIM options are displayed in an eSIM management area of the user interface 53, and the four eSIM options respectively correspond to four profiles downloaded in the eSIM of the electronic device. The profile corresponding to the eSIM option 531 is in an enabled state, and the profiles corresponding to the remaining three eSIM options are in a disabled state.

Figure 12E:
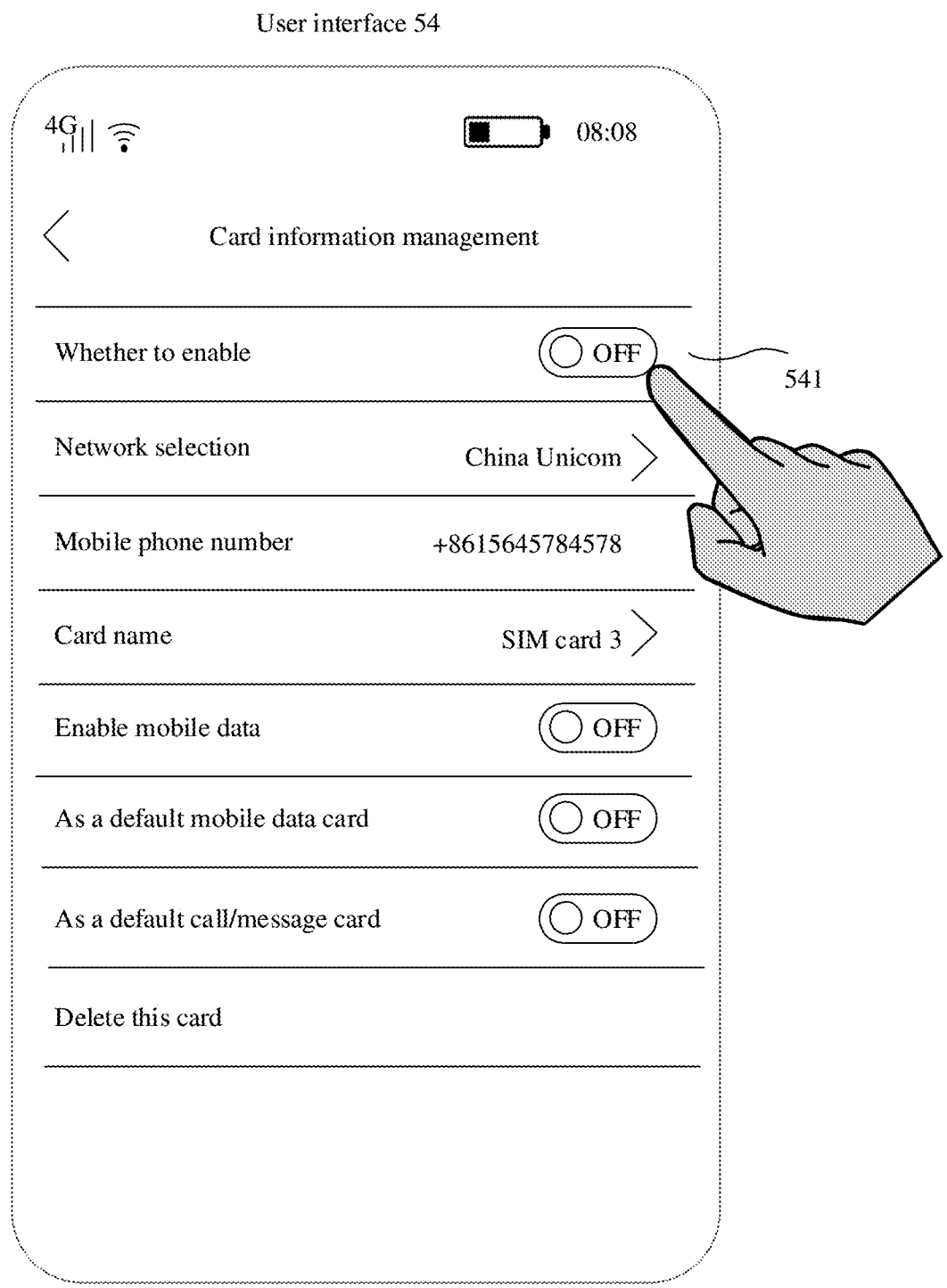

When a tap operation on an eSIM option 532 in the user interface 53 shown in FIG. 12*d* is detected, the electronic device displays, in response to the operation, a user interface 54 shown in FIG. 12*e*. The user interface 54 includes a plurality of operation controls for a profile corresponding to the eSIM option 532, and the operation controls include a "whether to enable" control 541. The "whether to enable" control 541 is currently in an off state.

Figure 12F:
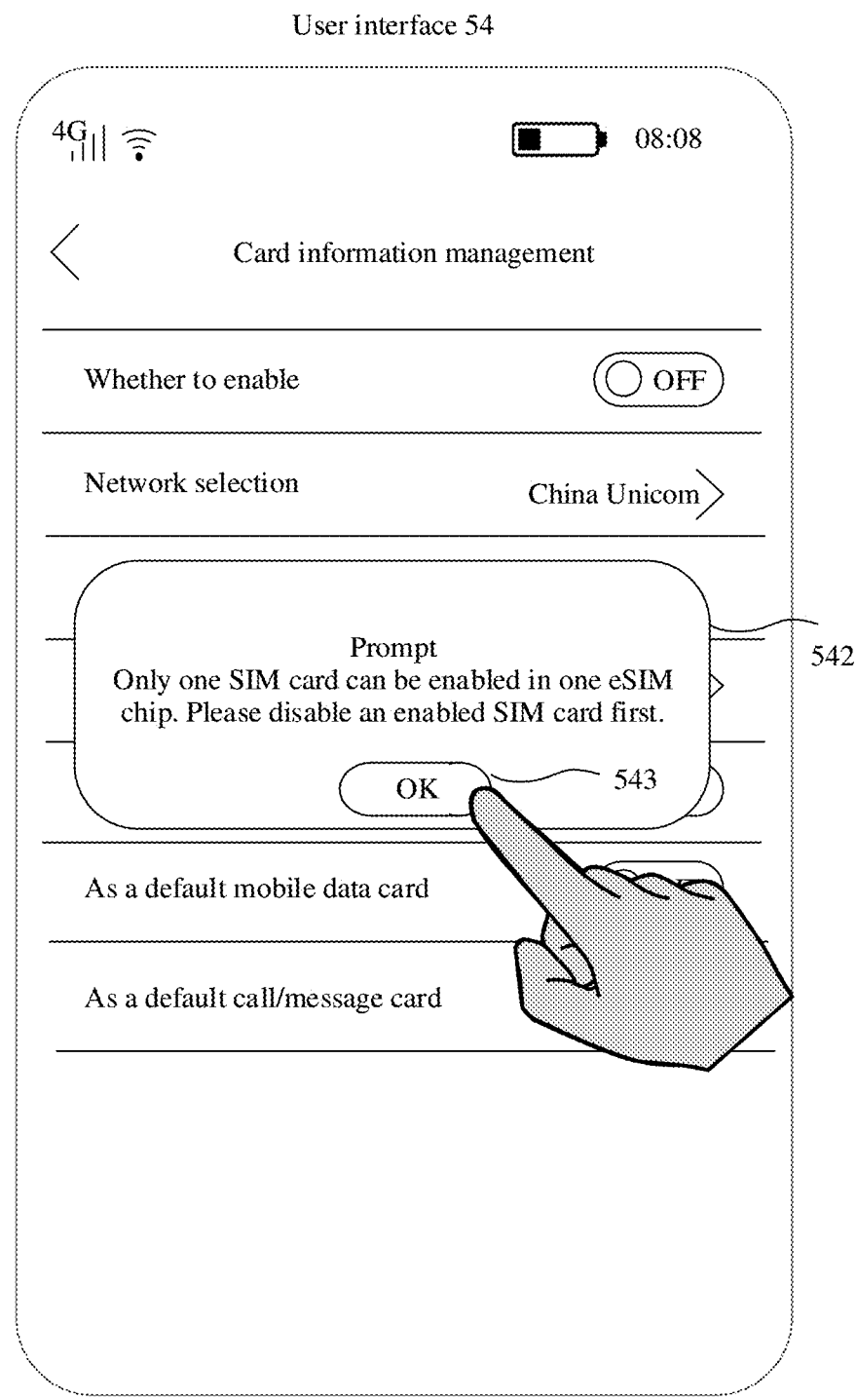

When a tap operation on the "whether to enable" control 541 in the user interface 54 shown in FIG. 12*e* is detected, the electronic device pops up, in response to the operation, a prompt box 542 on the user interface 54 as shown in FIG. 12*f*. The prompt box 542 displays an OK control 543 and text information: "Only one SIM card can be enabled in one eSIM. Please disable an enabled SIM card first.".

When a tap operation on the OK control 543 in the prompt box 542 shown in FIG. 12*f* is detected, the electronic device returns, in response to the operation, to display the user interface 53 shown in FIG. 12*d*. The profile corresponding to the eSIM option 532 cannot be enabled and is still in a disabled state.

It can be learned from the conventional technology shown in FIG. 12*a*, FIG. 12*b*, FIG. 12*c*, FIG. 12*d*, FIG. 12*e*, and FIG. 12*f* that when one profile in the eSIM is enabled, even if the electronic device supports dual standby and a SIM card in the SIM card slot is not enabled, the electronic device does not support activation of another profile in the eSIM. In this way, if multi-SIM multi-standby is required, at least a plurality of SIM card slots and/or eSIMs need to be installed in the electronic device. This not only causes relatively high costs, but also occupies very large space of the electronic device, thereby increasing a weight and a thickness of the electronic device. According to a communication connection method provided in embodiments of this application, when a first communication connection is established based on a first profile in one eSIM, and the first communication connection is not terminated, an electronic device may further receive an operation performed by a user to establish a communication connection based on a second profile in the eSIM, and establish a second communication connection based on the second profile, so that the electronic device enters a standby state on both the first profile and the second profile in the eSIM. In this way, the electronic device can support simultaneous activation of a plurality of profiles in one eSIM for use, and only one eSIM needs to be installed to implement multi-SIM multi-standby. This saves costs and reduces occupation on space of the electronic device.

Application scenario 1: For the foregoing problem, an embodiment of this application provides a communication connection method shown in FIG. 13A to FIG. 13C. A second profile in a first eSIM may be activated when a first profile in the first eSIM is activated, so that an electronic device simultaneously establishes a plurality of communication connections based on a plurality of profiles in one eSIM, and enters a standby state on the plurality of communication connections.

Figure 13A:
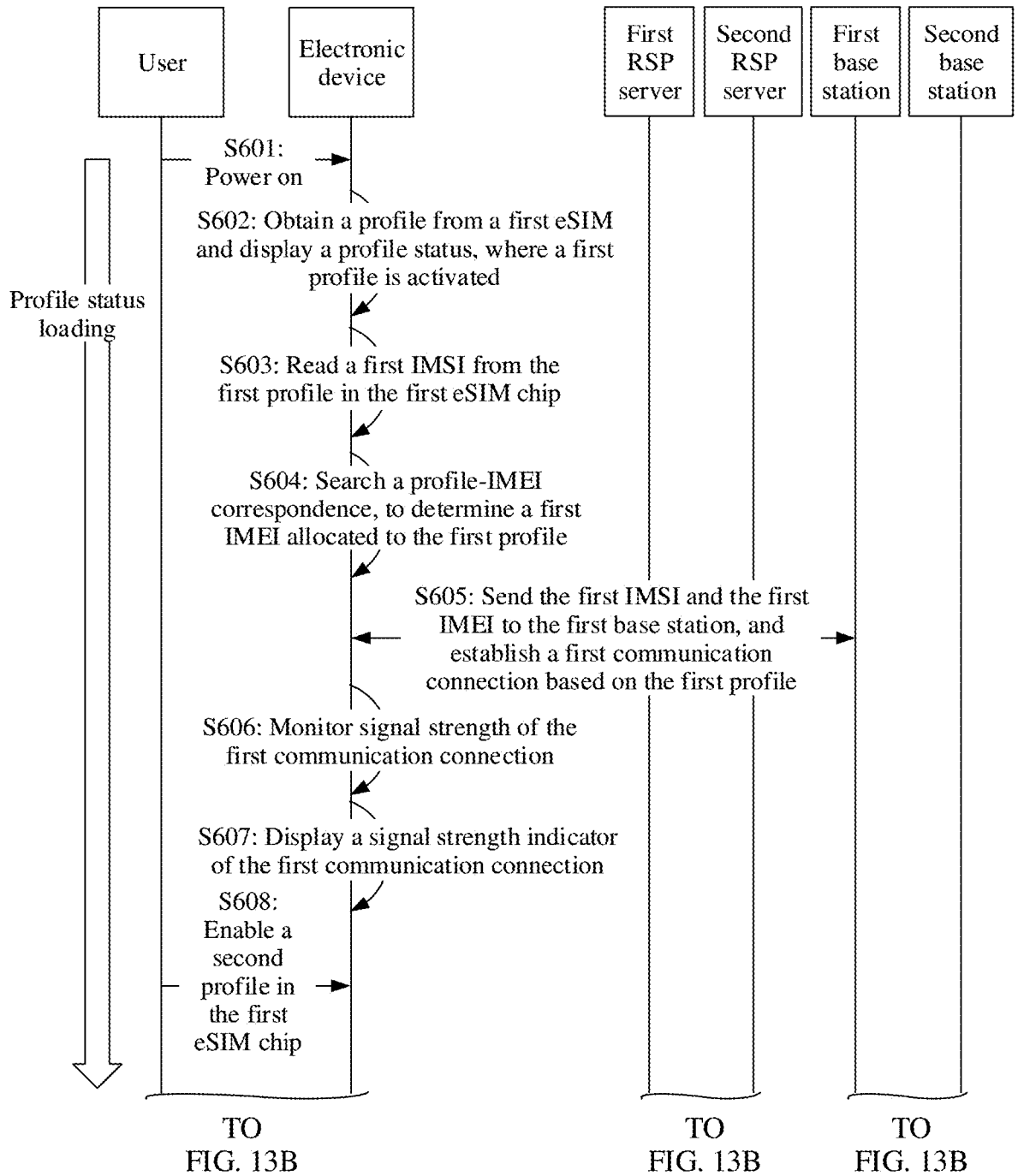
FIG. 13A to FIG. 13C are a schematic flowchart of a communication connection method according to an embodiment of this application.
Figure 13B:
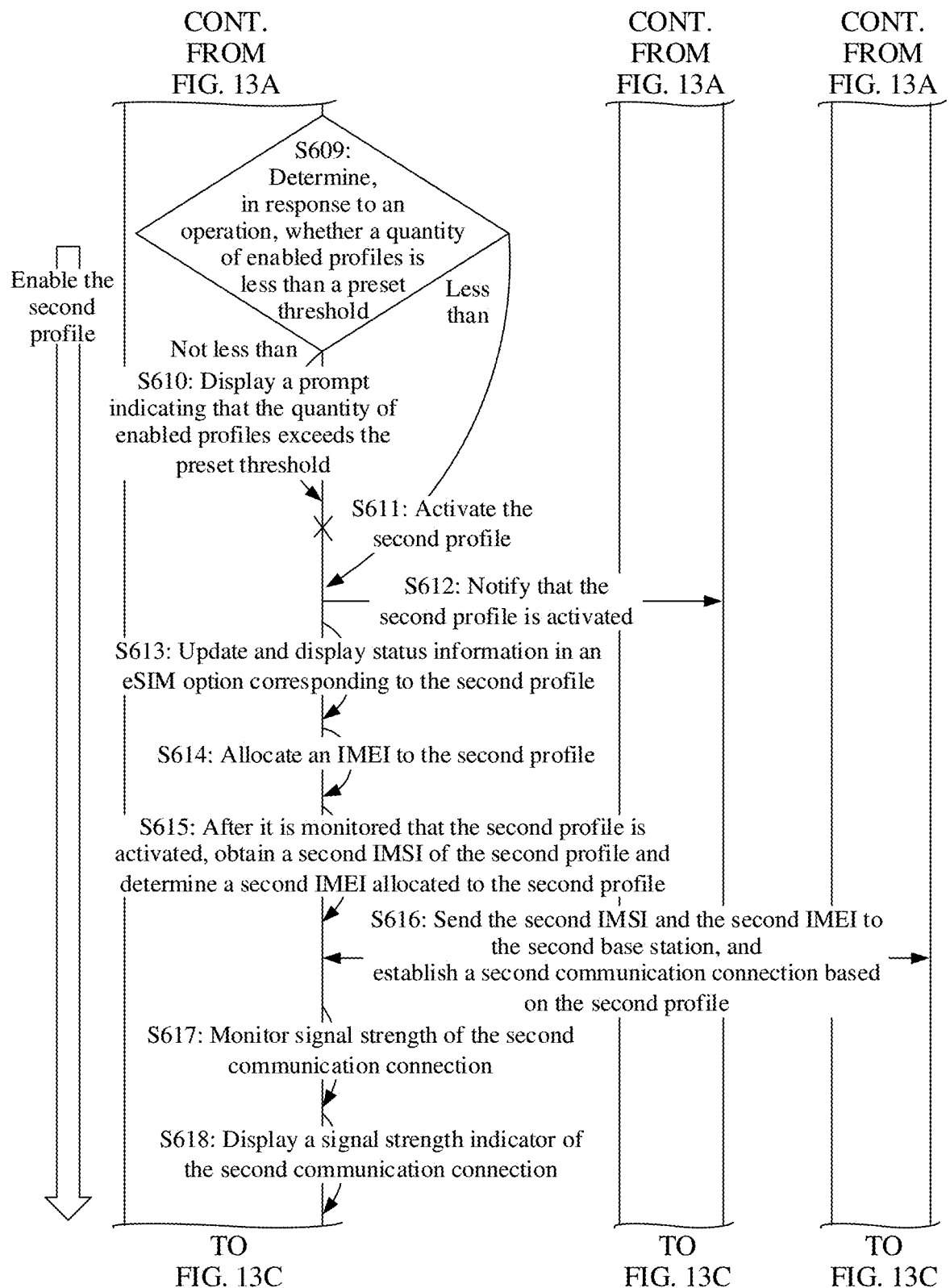
Figure 13C:
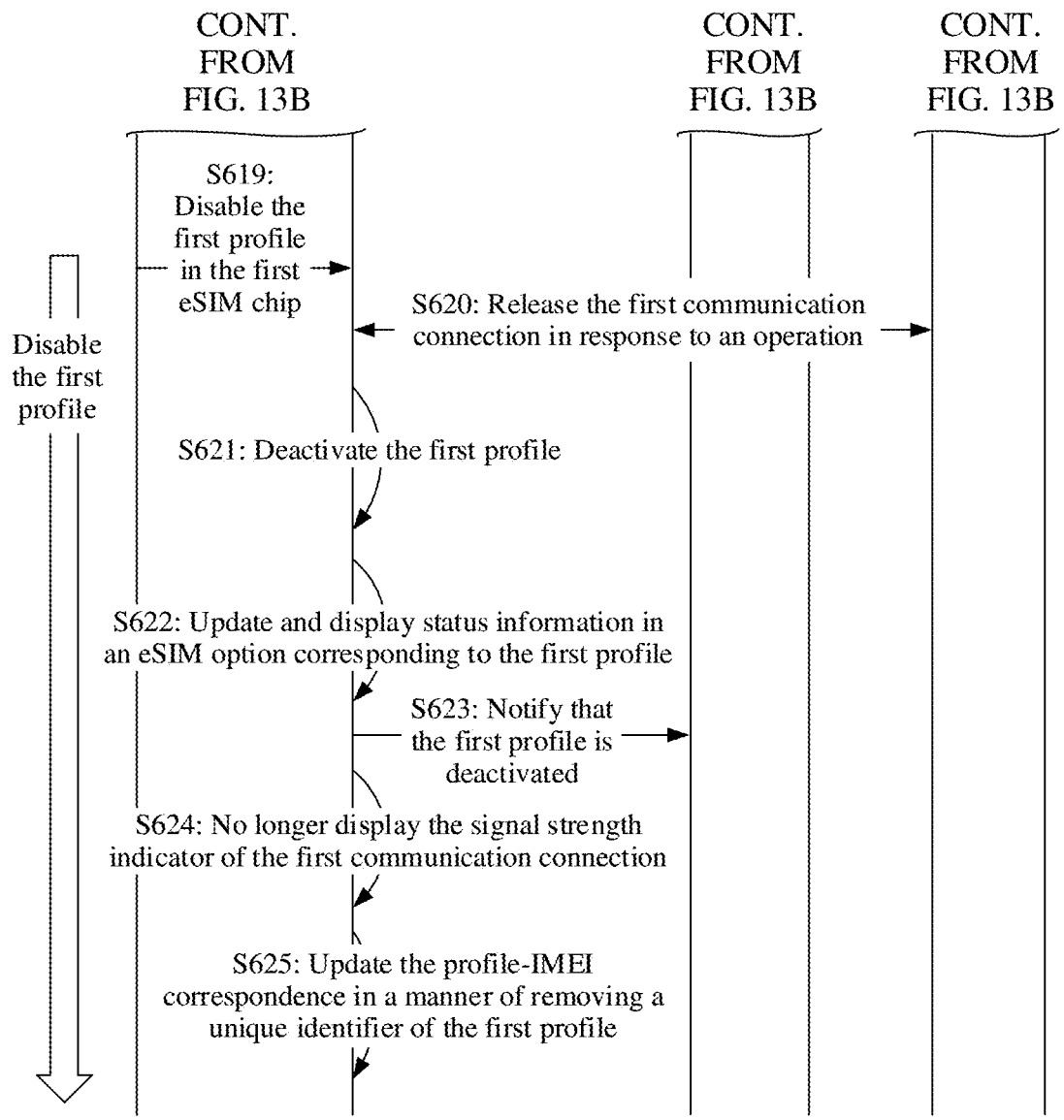

As shown in FIG. 13A to FIG. 13C, the communication connection method includes steps S601 to S625. A profile status loading process is described in S601 to S607. A processing process of enabling the new second profile is described in S608 to S618. A processing process of disabling the first profile is described in S619 to S625. The following provides descriptions separately.

(1) Steps S601 to S607: Profile Status Loading Process

S601: The electronic device responds to a user operation, and is powered on.

S602: After being powered on, the electronic device obtains a profile from the first eSIM and displays a profile status. The first profile in the first eSIM is activated.

The first eSIM may be a unique eSIM in the electronic device, or may be one of a plurality of eSIMs in the electronic device. This is not limited herein.

It may be understood that profiles in the first eSIM may be pre-installed in the eSIM, or may be downloaded from a remote management platform. This is not limited herein.

In an implementation, the electronic device may usually display, by using a status indicator on an eSIM option in an eSIM management area in a user interface, status information of a profile corresponding to the eSIM option. A displayed profile status usually may be one of the following two states: enabled and disabled. The enabled state indicates that the profile is activated. The disabled state indicates that the profile is deactivated, or is downloaded and installed but is not activated. In addition to the status indicator used to indicate the current status of the profile, the eSIM option corresponding to the profile may further display other related information of the profile, for example, an operator to which the profile belongs and a mobile phone number corresponding to the profile. This is not limited herein. The electronic device may read, by using an LPA, information about a downloaded and installed profile in the eSIM, and determine a current activation status of each profile by using a status field (for example, a profile state field) in each profile file.

For example, if the electronic device determines, by using the LPA, that four profiles, namely, a profile 1, a profile 2, a profile 3, and a profile 4, are downloaded and installed in the first eSIM, and separately reads values of profile state fields of the four profiles and learns that a value of a profile state field of the profile 1 is enabled (1), and values of profile state fields of the profile 2, the profile 3, and the profile 4 each are disabled (0), the electronic device determines that the profile 1 is activated, and none of the profile 2, the profile 3, and the profile 4 is activated. In this way, on status indicators of eSIM options corresponding to the profiles, a status of the profile 1 is displayed as enabled, and statuses of the profile 2, the profile 3, and the profile 4 are displayed as disabled. Therefore, it is determined that the profile 1 is activated.

S603: The electronic device reads a first IMSI from the first profile in the first eSIM.

The first profile in the first eSIM includes identification information such as an IMSI and a Ki that are distributed by an operator. After it is determined that the first profile is activated, the electronic device may read the first IMSI of the first profile in the first eSIM by using the LPA. The first IMSI is used by a mobile network to uniquely identify the first profile in a communication process.

S604: The electronic device searches a profile-IMEI correspondence, to obtain a first IMEI allocated to the first profile.

When a profile in the electronic device is activated, the electronic device allocates an IMEI to the activated profile, records a correspondence between the allocated IMEI and the activated profile in the profile-IMEI correspondence, and stores the correspondence in an internal memory. For specific descriptions of allocation and storage of the profile-IMEI correspondence, refer to the foregoing descriptions shown in FIG. 8 to FIG. 10. Details are not described herein again.

In the profile-IMEI correspondence, a profile is represented by using a unique identifier of the profile. A unique identifier used to uniquely determine a profile is determined by a remote service provider, a mobile network operator, an eSIM manufacturer, and an electronic device manufacturer of the profile. Optionally, an integrated circuit card identifier (Integrate circuit card identity, ICCID) may be used as the unique identifier of the profile, or an ISD-P number may be used as the unique identifier of the profile, or an identifier calculated by using an IMSI in the profile according to a specific encryption algorithm may be used as the unique identifier of the profile, or another type of unique identifier negotiated by service providers may be used as the unique identifier of the profile. This is not limited herein.

In the profile-IMEI correspondence, a correspondence between an IMEI and a unique identifier of a profile may be represented in a form of a data table, or may be represented in a form of an array, or may be represented by using another type of correspondence, provided that a correspondence between a unique identifier of a profile and an IMEI allocated to the profile can be recorded, so that the electronic device can find, based on the unique identifier of the profile, the IMEI allocated to the profile. This is not limited herein.

For example, in an implementation, it is assumed that an ICCID is used as a unique identifier of a profile, and an IMEI corresponding to a profile whose ICCID is 89860318748763304205 needs to be searched for currently. If the electronic device searches the profile-IMEI correspondence and learns of [011472001975695, 89860318748763304205], the electronic device determines that the IMEI allocated to the profile is 011472001975695.

S605: The electronic device sends the first IMSI and the first IMEI to a first base station, and establishes a first communication connection based on the first profile.

The electronic device sends the first IMSI obtained through reading and the found first IMEI to the first base station to perform network access authentication, and establishes the first communication connection based on the first profile. For a specific network access authentication process, refer to the foregoing network access authentication process in which the SIM card is used. Details are not described herein again.

It should be noted that the first base station is a base station belonging to an operator of the first profile. If the electronic device has a plurality of profiles, and the plurality of profiles belong to different operators, the electronic device may need to communicate with base stations belonging to the different operators. The base stations belonging to the different operators may not be a same base station. In some cases, if related operators agree on sharing a base station, the base station may be a base station that belongs to different operators. This is not limited herein.

S606: The electronic device monitors signal strength of the first communication connection.

After establishing the first communication connection based on the first profile, the electronic device monitors the signal strength of the first communication connection. If data needs to be received and sent on the first communication connection, the electronic device performs data receiving and sending; or if no data needs to be received and sent on the first communication connection for a period of time, the electronic device enters a standby state on the first communication connection. The standby state indicates that the electronic device monitors, by using low power consumption, whether there is data that needs to be received and sent on the first communication connection.

S607: The electronic device displays a signal strength indicator of the first communication connection.

After detecting the signal strength of the first communication connection, the electronic device displays, on a display in real time, corresponding first indication information that is used to indicate the signal strength. A representation form of the first indication information may be a signal strength indicator.

It may be understood that, if another profile in the electronic device is activated when the electronic device is powered on, the electronic device may also perform status loading according to the foregoing process.

The following describes an example user interface (user interface, UI) related to the profile status loading process. The term "user interface" in the specification, claims, and accompanying drawings of this application is a medium interface for interaction and information exchange between an application or an operating system and a user, and implements conversion between an internal form of information and a form that can be accepted by the user. The user interface is usually in a representation form of a graphical user interface (graphic user interface, GUI), which is a user interface that is related to a computer operation and that is displayed in a graphical manner. An interface element may be an icon, a window, a control, or the like displayed on a display of the electronic device. The control may include visible interface elements such as an icon, a button, a menu, a tab, a text box, a dialog box, a status bar, a navigation bar, or a widget.

Figure 14A:
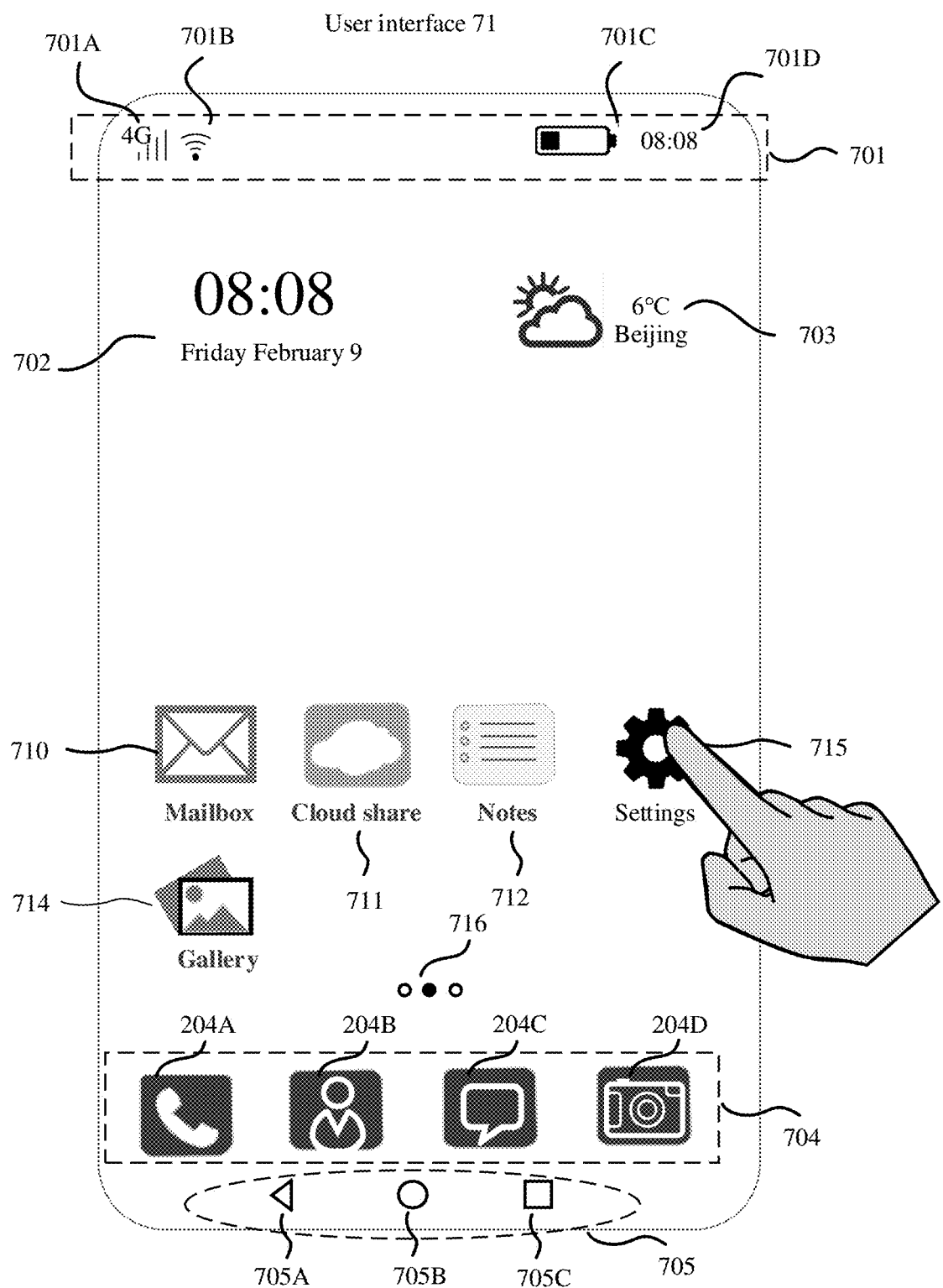
FIG. 14a to FIG. 14c are schematic diagrams of a group of interfaces according to an embodiment of this application.

FIG. 14a shows an example user interface 71 that is for displaying an application installed in an electronic device 100 and that is on the electronic device 100.

The user interface 71 may include a status bar 701, a calendar indicator 702, a weather indicator 703, a tray 704 including commonly used application icons, a navigation bar 705, and other application icons.

The status bar 701 may include one or more signal strength indicators 701A of a mobile communication signal (which may also be referred to as a cellular signal), one or more signal strength indicators 701B of a wireless fidelity (wireless fidelity, Wi-Fi) signal, a battery status indicator 701C, and a time indicator 701D.

The calendar indicator 702 may be used to indicate current time, for example, a date, a day of a week, and hour-minute information.

The weather indicator 703 may be used to indicate a weather type such as cloudy to clear or light rain, and may be further used to indicate information such as a temperature.

The tray 704 including commonly used application icons may display a "phone" icon 704A, a "contacts" icon 704B, a "messages" icon 704C, and a "camera" icon 704D.

The navigation bar 705 may include system navigation buttons such as a back button 705A, a home button 705B, and a multitask button 705C. When detecting that the user taps the back button 705A, the electronic device 100 may display a previous page of a current page. When detecting that the user taps the home button 705B, the electronic device 100 may display a home screen. When detecting that the user taps the multitask button 705C, the electronic device 100 may display a task recently started by the user. Names of the navigation buttons may alternatively be other names. This is not limited in this application. In addition to a virtual button, each navigation button in the navigation bar 705 may alternatively be implemented as a physical button.

For example, the other application icons may be a "WeChat (Wechat)" icon, a "QQ" icon, a "Twitter (Twitter)" icon, a "Facebook (Facebook)" icon, a "mailbox" icon 710, a "cloud share" icon 711, a "notes" icon 712, an "Alipay" icon, a "gallery" icon 714, and a "settings" icon 715. The user interface 71 may further include a page indicator 716. The other application icons may be distributed on a plurality of pages, and the page indicator 716 may be used to indicate a specific page on which an application is currently browsed by the user. The user may slide leftward or rightward in an area including the other application icons, to browse an application icon on another page.

In some embodiments, for example, the user interface 71 shown in FIG. 14a may be a home screen (Home screen).

In some other embodiments, the electronic device 100 may further include a physical home button. The home button may be used to receive an instruction of the user, to return from a currently displayed UI to the home screen, so that the user can view the home screen at any time. The instruction may be specifically an operation instruction of pressing the home button once by the user, may be an operation instruction of consecutively pressing the home button twice within a short time period by the user, or may be an operation instruction of pressing and holding the home button within a predetermined time period by the user. In some other embodiments of this application, a fingerprint sensor may be further integrated in the home button, so that a fingerprint is collected and recognized when the home button is pressed.

It may be understood that FIG. 14a merely shows an example user interface on the electronic device 100, and should not constitute a limitation on this embodiment of this application.

Figure 14B:
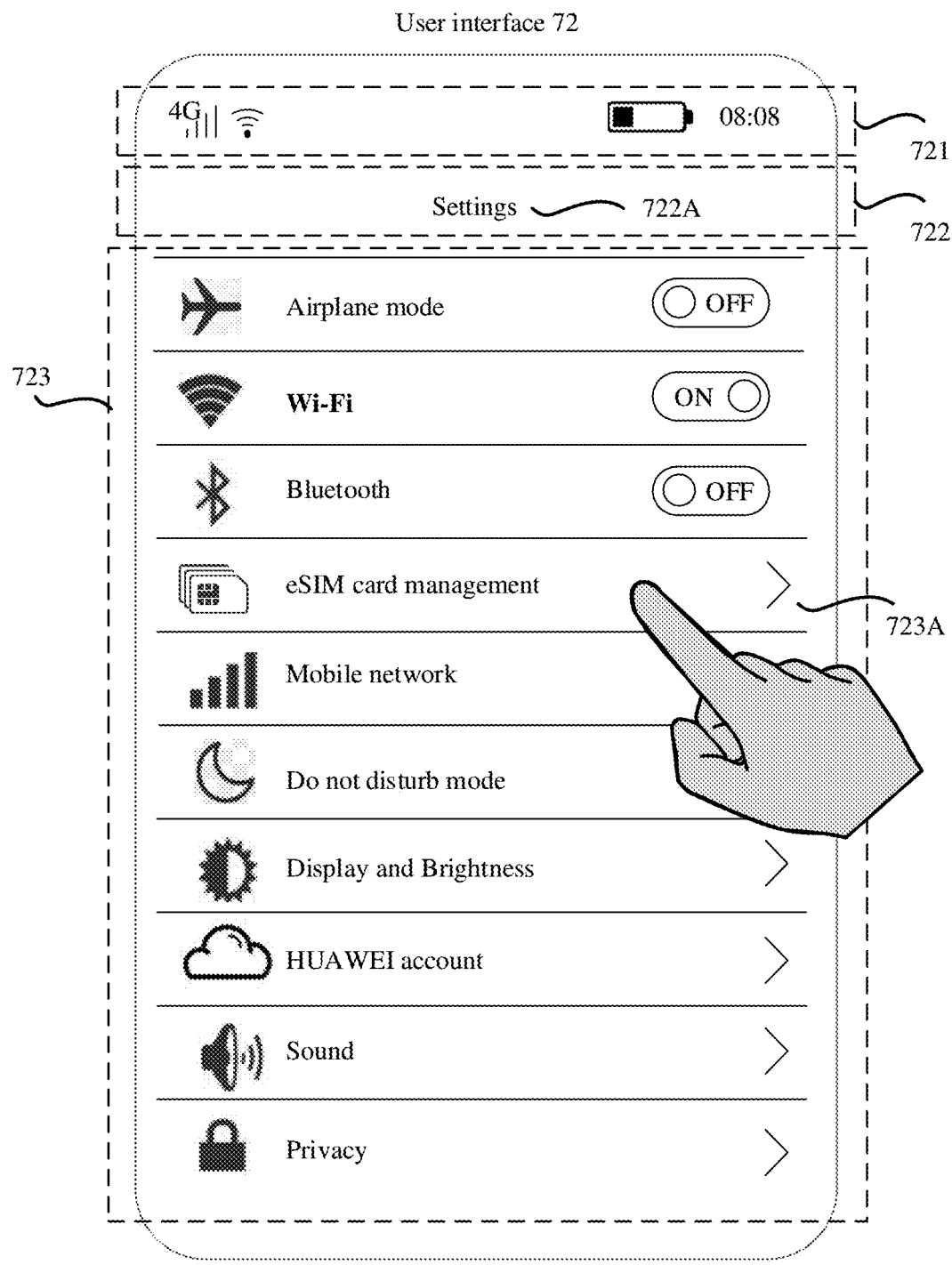

An example user interface 72 shown in FIG. 14b may be an implementation of a "settings" interface. The user interface 72 may be provided by a "settings" application. The "settings" application is an application that is installed on an electronic device such as a smartphone or a tablet computer and that is used to set various functions of the electronic device. A name of the application is not limited in this embodiment of this application. The user interface 72 may be a user interface opened when the user taps the "settings" icon 715 in the user interface 71 shown in FIG. 14a.

As shown in FIG. 14b, the user interface 72 may include a status bar 721, a title bar 722, and an area 723 including one or more setting options.

For the status bar 721, refer to the status bar 701 in the user interface 71 shown in FIG. 14a. Details are not described herein again.

The title bar 722 may include a current page indicator 722A, and the current page indicator 722A may be used to indicate a current page. For example, text information "settings" may be used to indicate that the current page is used to display one or more setting options. Not limited to the text information, the current page indicator 722A may alternatively be an icon.

The area 723 includes one or more setting options. The one or more setting options may include an airplane mode setting option, a Wi-Fi setting option, a Bluetooth setting option, an eSIM management setting option 723A, a mobile network setting option, a Do Not Disturb mode setting option, a display and brightness setting option, a Huawei account setting option, a sound setting option, a privacy setting option, and the like. Each setting option may be represented as an icon and/or a text. This is not limited in this application. Each setting option may be used to monitor an operation (for example, a touch operation) of triggering display of setting content of a corresponding setting option. The electronic device may open, in response to the operation, a user interface used to display the setting content of the corresponding setting option.

Figure 14C:
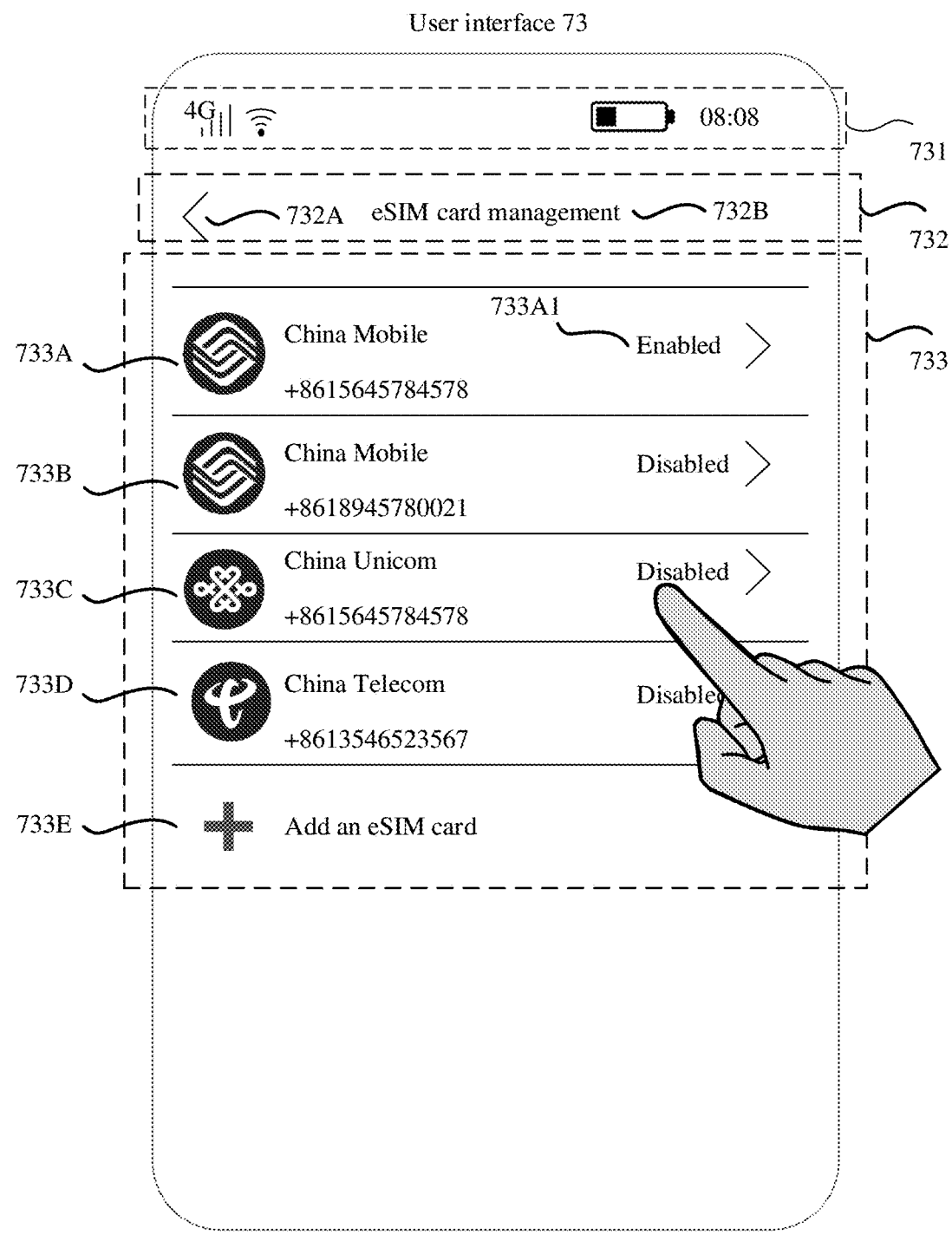

In some embodiments, when detecting an operation (for example, a touch operation) on the eSIM management setting option 723A in the user interface 72 shown in FIG. 14b, the electronic device may display a user interface 73 shown in FIG. 14c.

As shown in FIG. 14c, the user interface 73 is configured to display corresponding content of the eSIM management setting option. The user interface 73 may include a status bar 731, a title bar 732, and an eSIM management area 733.

For the status bar 731, refer to the status bar 701 in the user interface 71 shown in FIG. 14a. Details are not described herein again.

The title bar 732 may include a back button 732A and a current page indicator 732B. The back button 732A is an app-level back button, and may be used to return to an upper-level page of the user interface 73 may be the user interface 72 shown in FIG. 14*b*. The current page indicator 732B may be used to indicate a current page. For example, text information "eSIM management" may be used to indicate that the current page is used to display corresponding content of the eSIM management setting option. Not limited to the text information, the current page indicator 732B may alternatively be an icon.

The eSIM management area 733 may display an eSIM option corresponding to a downloaded and installed profile in the eSIM and an eSIM addition control 733E.

The eSIM addition control 733E may be configured to communicate with a remote RSP server when a user operation (for example, a touch operation) is received, and can download a profile.

For example, in step S602, if the electronic device determines that the four profiles, namely, the profile 1, the profile 2, the profile 3, and the profile 4, are downloaded and installed in the eSIM, four eSIM options, namely, an eSIM option 733A, an eSIM option 733B, an eSIM option 733C, and an eSIM option 733D, are correspondingly displayed in the eSIM management area 733 in the user interface 73 shown in FIG. 14*c*. Each eSIM option may include an icon and a name of a network operator to which a corresponding profile belongs, a mobile phone number, a profile status indicator, and an option setting control. When it is determined that the profile 1 is activated, and none of the profile 2, the profile 3, and the profile 4 is activated, the electronic device may update a profile status indicator 733A1 in the eSIM option 733A corresponding to the profile 1 to display the profile status indicator as enabled, and profile status indicators in the eSIM options 733B, 733C, and 733D corresponding to the other inactivated profiles 1 are displayed as disabled. In step S607, if the communication connection is established based on the profile 1, after a signal is detected, the signal strength indicator 701A of the communication connection may be displayed in the status bar 701 in FIG. 14*a*.

(2) Steps S608 to S618: Processing Process of Enabling a New Second Profile

S608: The electronic device receives an operation of enabling the second profile in the first eSIM by the user.

In this embodiment of this application, when the first profile in the first eSIM is enabled, and the first communication connection established based on the first profile is not terminated, the electronic device may further receive the operation of enabling the second profile in the first eSIM by the user. The second profile is a profile different from the first profile in the first eSIM. It may be understood that an objective essence of this operation is to enable the electronic device to establish a communication connection based on the second profile.

Specifically, the operation of enabling the second profile by the user may be: tapping an option setting control on an eSIM option corresponding to the second profile in an eSIM management area to enter a card information management interface, and performing an operation (for example, a touch operation or a tap operation) on a "whether to enable" control in a card information management area on the card information management interface, to enable the second profile that is not enabled. In another implementation, the user swipes rightward an eSIM option corresponding to the second profile in the eSIM management area, and taps an enable option on a displayed enable/cancel selection control, to enable the second profile that is not enabled. It may be understood that, according to a setting of the electronic device, the operation of enabling the second profile by the user may alternatively be received in another manner. This is not limited herein.

S609: The electronic device determines, in response to the operation, whether a quantity of enabled profiles is less than a preset threshold.

In this embodiment of this application, when the first profile in the first eSIM is enabled, and the first communication connection established based on the first profile is not terminated, if the electronic device receives the operation of enabling the second profile in the first eSIM, namely, an operation of establishing a communication connection based on the second profile, the electronic device does not directly reject the operation because there is an activated profile in the first eSIM. Instead, the electronic device determines whether the quantity of currently enabled profiles in the electronic device is less than the preset threshold. The preset threshold is a maximum quantity of profiles that can be simultaneously enabled and standby in the electronic device. For details, refer to the foregoing description. Details are not described herein again. It may be understood that the quantity of enabled profiles is not limited to an enabled profile in the first eSIM, but is a quantity of all currently enabled profiles in the electronic device.

Specifically, it is assumed that the preset threshold is N, and N is a positive integer greater than or equal to 2. The quantity of currently enabled profiles in the electronic device is M, and M is a positive integer. When receiving the operation of enabling the new second profile by the user, the electronic device determines whether N is less than M. If M is less than N, step S611 is performed. If M is not less than N, step S610 is performed.

For example, it is assumed that the electronic device supports simultaneous enabling of a maximum of three profiles. A profile in one SIM card inserted into a SIM card slot and one profile in an eSIM are enabled currently in the electronic device, that is, two profiles are enabled. In this case, if receiving an operation of enabling another profile in the eSIM by the user, the electronic device determines that 2 is less than 3, and then step S611 is performed.

S610: If it is determined that the quantity of enabled profiles is not less than the preset threshold, the electronic device displays a prompt indicating that the quantity of enabled profiles exceeds the preset threshold.

In this embodiment of this application, when the electronic device determines, in step S609, that the quantity of enabled profiles is not less than the preset threshold, if a new profile is to be enabled, the maximum quantity of profiles that can be simultaneously enabled and standby in the electronic device is exceeded, and the electronic device may pop up a prompt box to prompt the user to disable an enabled profile and then enable the new profile.

In an implementation, the electronic device may pop up a disable option box, and the disable option box may include options corresponding to all enabled profiles in the electronic device. Step S609 is performed after the user chooses, in the disable option box, to disable a profile corresponding to one of the options.

S611: If it is determined that the quantity of enabled profiles is less than the preset threshold, the electronic device activates the second profile.

In this embodiment of this application, when the electronic device determines, in step S609, that the quantity of enabled profiles is less than the preset threshold, it indicates that the electronic device can further support enabling of a new profile, and the electronic device activates the second profile.

Specifically, the electronic device may modify a status field (for example, a profile state field) in the second profile by using an LPA, to set the second profile to an activated state.

For example, in step S602, if the electronic device determines, by using the LPA, that the four profiles, namely, the profile 1, the profile 2, the profile 3, and the profile 4, are downloaded and installed in the first eSIM, and separately reads values of profile state fields of the four profiles and learns that a value of a profile state field of the profile 1 is enabled (1), and values of profile state fields of the profile 2, the profile 3, and the profile 4 each are disabled (0), according to steps S603 to S607, the electronic device establishes a communication connection based on the profile 1. In step S608, an operation of enabling the profile 3 by the user is received. If it is determined that the quantity 1 of currently enabled profiles is less than the threshold 2 in step S609, the electronic device modifies the value of the profile state field of the profile 3 to enabled (1) by using the LPA, and sets the profile 3 to an activated state in step S611.

S612: The electronic device may notify a second RSP server that the second profile is activated.

After the second profile is activated, the electronic device may send a notification message to the second RSP server, to notify the second RSP server that the second profile is activated. The second RSP server is a server through which the electronic device communicates with a remote management platform of the second profile. The second RSP server may synchronously record a status of the second profile.

It should be noted that, according to an agreement between an operator to which a profile belongs and a remote service provider, this step may be performed, or may not be performed. This is not limited herein.

S613: The electronic device updates and displays status information in the eSIM option corresponding to the second profile.

The electronic device may display, in the eSIM option corresponding to the second profile in the eSIM management area, related information of the second profile, for example, an operator to which the second profile belongs and a mobile phone number corresponding to the second profile. In addition, current status information of the second profile is further displayed. When the second profile is not activated, the electronic device may display, in the eSIM option corresponding to the second profile in the eSIM management area, a status indicator of the second profile as disabled. After the second profile is activated, the electronic device may update the status indicator to enabled. It may be understood that, in this case, a status indicator of the first profile displayed in an eSIM option corresponding to the first profile is also enabled.

S614: The electronic device allocates an IMEI to the second profile, and adds a correspondence between a unique identifier of the second profile and the allocated second IMEI to the profile-IMEI correspondence.

In this embodiment of this application, after the second profile is activated, the electronic device selects one IMEI from to-be-allocated IMEIs, allocates the selected IMEI to the second profile, establishes the correspondence between the unique identifier of the second profile and the allocated second IMEI, and stores the correspondence in the profile-IMEI correspondence in the internal memory. For a process of allocating an IMEI to a profile and a storage form of a correspondence between the profile and the IMEI, refer to the foregoing description of the profile-IMEI correspondence. Details are not described herein again. S615: After it is monitored that the second profile is activated, the electronic device obtains a second IMSI of the second profile and determines the second IMEI allocated to the second profile.

After monitoring that the second profile is activated, the electronic device may obtain, from the eSIM by using the LPA, the second IMSI stored in the second profile. The electronic device searches, based on the unique identifier of the second profile, the profile-IMEI correspondence stored in the internal memory of the electronic device, to determine the second IMEI allocated to the second profile.

It may be understood that if a correspondence between the unique identifier of the second profile and the second IMSI is also stored in the profile-IMEI correspondence, the second IMSI may not need to be read from the eSIM again, but the second IMSI may be directly obtained from the profile-IMEI correspondence.

S616: The electronic device sends the second IMSI and the second IMEI to a second base station, and establishes a second communication connection based on the second profile.

For a specific network access authentication process, refer to the network access authentication process in which the SIM card is used. Details are not described herein.

The second base station is a base station belonging to an operator of the second profile. The first base station and the second base station may be a same base station, or may not be a same base station, depending on whether the first profile and the second profile belong to a same operator and whether there is a related agreement between the operators. This is not limited herein.

S617: The electronic device monitors signal strength of the second communication connection.

After establishing the second communication connection based on the second profile, the electronic device monitors the signal strength of the second communication connection. If data needs to be received and sent on the first communication connection, the electronic device performs data receiving and sending; or if no data needs to be received and sent on the second communication connection for a period of time, the electronic device enters a standby state on the second communication connection. The standby state indicates that the electronic device monitors, by using low power consumption, whether there is data that needs to be received and sent on the second communication connection.

S618: The electronic device displays a signal strength indicator of the second communication connection.

After detecting the signal strength of the second communication connection, the electronic device displays, on a display in real time, corresponding second indication information that is used to indicate the signal strength. A representation form of the second indication information may be a signal strength indicator.

The following describes an example user interface used in the processing process of enabling the new second profile.

An example in which the second profile to be enabled by the user is a profile corresponding to the eSIM option 733C in the user interface 73 shown in FIG. 14c is used for description.

Figure 15A:
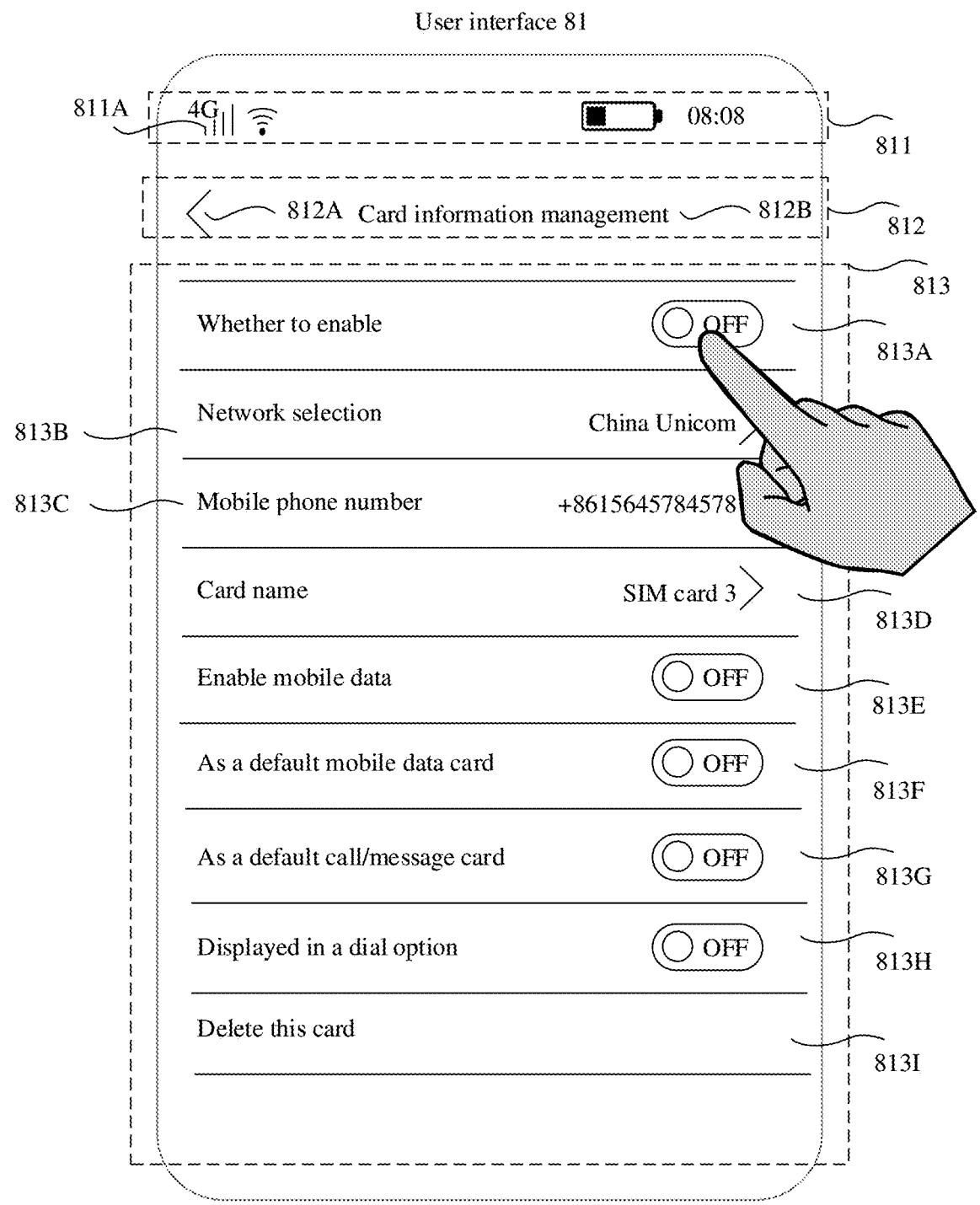
FIG. 15a to FIG. 15c are schematic diagrams of another group of interfaces according to an embodiment of this application.

In some embodiments, when an operation (for example, a touch operation) on the eSIM option 733C in the user interface 73 shown in FIG. 14c is detected, the electronic device may display a user interface 81 shown in FIG. 15a.

The user interface 81 may include a status bar 811, a title bar 812, and an area 813 including one or more management controls.

The status bar 811 may include a signal strength indicator 811A that indicates a communication connection established after a profile corresponding to the eSIM option 733A in the user interface 73 shown in FIG. 14c is activated, a Wi-Fi signal strength indicator, a battery status indicator, and a time indicator.

The title bar 812 may include a back button 812A and a current page indicator 812B. The back button 812A is an app-level back button, and may be used to return to an upper-level menu. An upper-level page of the user interface 81 may be the user interface 73 shown in FIG. 14c. The current page indicator 812B may be used to indicate a current page. For example, text information "card information management" may be used to indicate that the current page is used to display corresponding content of eSIM information management, and is not limited to the text information. The current page indicator 812B may alternatively be an icon.

The area 813 includes one or more card information management control options, and the one or more card information management control options may include the following options.

A "whether to enable" control 813A is used to receive an operation (a tap, a touch, or the like) of a user, and change an enabled/universal state of the profile. If an on/off state of the control 813A is off, it indicates that the profile is disabled. If an on/off state of the control 813A is on, it indicates that the profile is enabled.

A "network selection" control 813B is used to indicate a network selection of the profile. Usually, the network selection of the profile is a default selection based on information about the profile when the profile is downloaded and installed.

A "mobile phone number" control 813C is used to indicate a mobile phone number corresponding to the profile. Usually, the mobile phone number corresponding to the profile is displayed by default based on the information about the profile when the profile is downloaded and installed.

A "card name" control 813D is used to identify a name of the profile on a local device to help user identification. The user can tap this control and enter, in a popped-up text box, a card name that is named by the user.

An "enable a mobile data" control 813E is used to receive an operation (a tap, a touch, or the like) of the user, and determine whether to enable mobile data after the profile is enabled. If an on/off state of the control 813E is off, it indicates that the mobile data of the profile is not enabled, and all applications in the electronic device cannot use the mobile data of the profile. If an on/off state of the control 813E is on, it indicates that the mobile data of the profile is enabled, and applications in the electronic device may select to use the mobile data of the profile.

An "as a default mobile data card" control 813F is used to receive an operation (a tap, a touch, or the like) of the user, and determine whether to use the profile as a default mobile data card when the on/off state of the "as a default mobile data card" control 813E is on. If an on/off state of the control 813F is on, it indicates that the profile is used as the default mobile data card, and when the user does not actively perform selection, all applications in a mobile device preferentially use the mobile data of the profile by default. If an on/off state of the control 813F is off, it indicates that the profile is not used as the default mobile data card, and unless the user actively selects some applications to use the mobile data of the profile, the applications use mobile data of a current default mobile data card by default. It may be understood that, in the electronic device, an on/off state of a control 813F of only one profile can be on, and on/off states of controls 813F of other profiles are off. For example, if the on/off state of the "as a default mobile data card" control 813F of the profile is set to on, an on/off state of an "as a default mobile data card" control 813F of a profile that is previously used as the default mobile data card in the electronic device is automatically changed from on to off.

An "as a default call/message card" control 813G is used to receive an operation (a tap, a touch, or the like) of the user, and determine whether to use the profile as a default call/message card after the profile is enabled. If an on/off state of the control 813G is on, it indicates that the profile is used as the default call/message card. When the user makes a call or sends a message, if the user taps a dial button or a send button without actively perform selection, the profile is used by default to make a call or send a message. If an on/off state of the control 813G is off, it indicates that the profile is not used as the default call/message card. When the user makes a call or sends a message, a current default call/message card is used by default to make a call or send a message. It may be understood that, in the electronic device, an on/off state of a control 813G of only one profile can be on, and on/off states of controls 813G of other profiles are off. For example, if the on/off state of the "as a default call/message card" control 813G of the profile is set to on, an on/off state of an "as a default call/message card" control 813G of a profile that is previously used as the default call/message card in the electronic device is automatically changed from on to off.

A "displayed in a dial option" control 813H is used to receive an operation (a tap, a touch, or the like) of the user, and control whether a dial control corresponding to the profile is displayed in a dial option when the on/off state of the "as a default call/message card" control 813G is off. If an on/off state of the control 813H is on, when the user makes a call, if the user presses and holds a dial button, the dial option is displayed, and the dial control corresponding to the profile is displayed in the dial option. If the user taps the dial control corresponding to the profile, the profile is used to dial the call, and a default profile is no longer used to dial the call. If an on/off state of the control 813H is off, when the user makes a call, if the user presses and holds a dial button, and if an on/off state of a "displayed in a dial option" control of another profile is set to on, a dial control corresponding to the another profile is displayed in the dial option. If on/off states of "displayed in a dial option" controls of all profiles each are off, no dial option is displayed when the user presses and holds a dial button, and only the default call/message card can be used to make a call.

A "delete this card" control 813I is used to receive an operation (a tap, a touch, or the like) of the user and delete the profile. Only when the on/off state of the "whether to enable" control 813A is off, the "delete this card" control 813I can be triggered; otherwise, the control 813I is in a non-triggerable state.

Figure 15B:
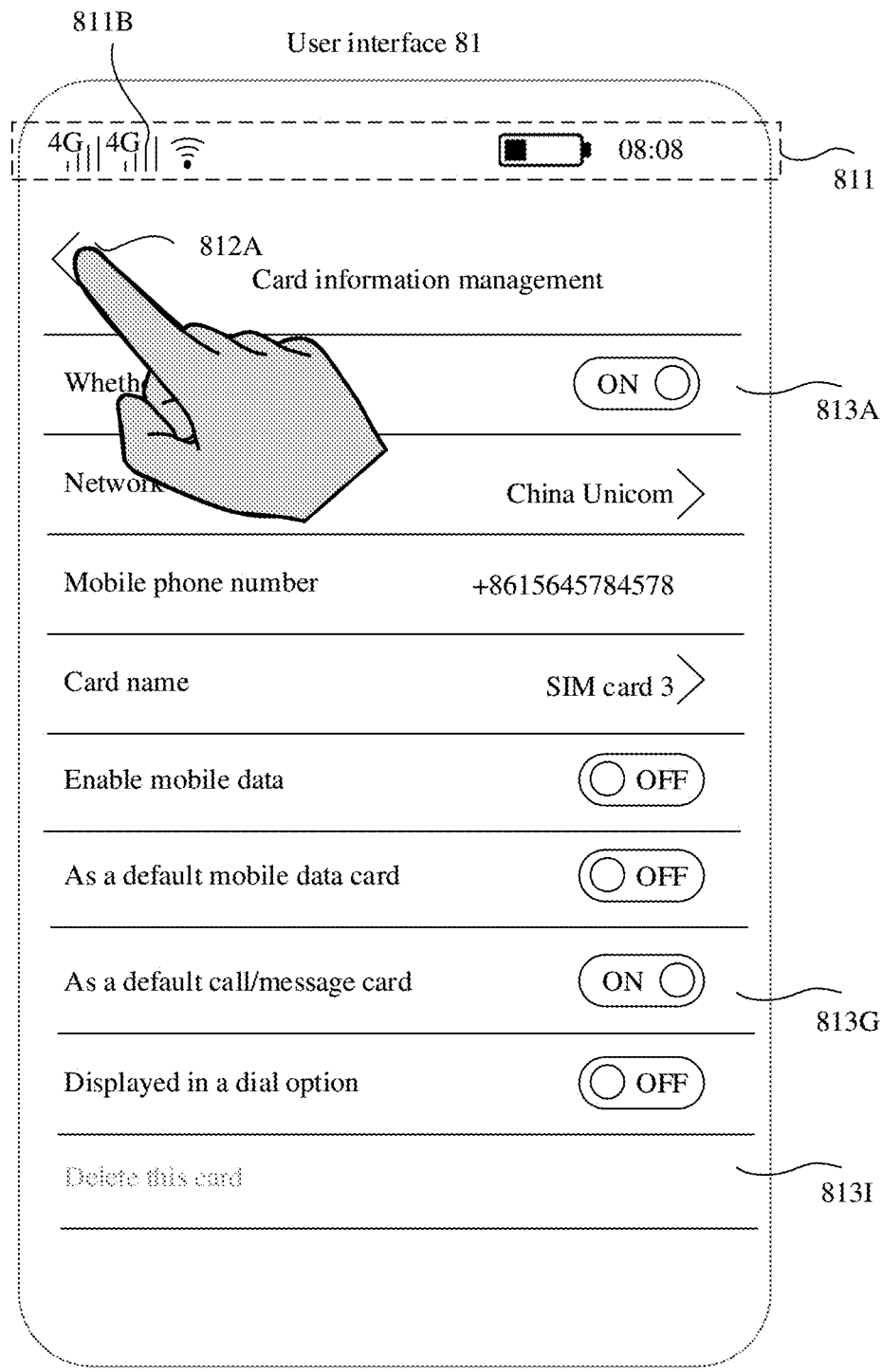

In some embodiments, when detecting an operation (for example, a touch operation) on the "whether to enable" control 813A and the "as a default call/message card" control 813G on the user interface 81 shown in FIG. 15a, the electronic device may display the user interface 81 shown in FIG. 15b. In this case, because the user taps the "whether to enable" control 813A to set the "whether to enable" control

813A to on, the electronic device performs the foregoing steps S608 to S618, to establish the communication connection based on the profile corresponding to the eSIM option 733C in the user interface 73 shown in FIG. 14c. As shown in FIG. 15b, a signal strength indicator 811B of the communication connection established after the profile corresponding to the newly enabled eSIM option 733C is activated is displayed in the status bar 811 of the user interface 81. The on/off state of the "whether to enable" control 813A and the on/off state of the "as a default call/message card" control 813G each are updated to an on state, and the on/off state of the "delete this card" control 813I is updated to a non-triggerable state.

Figure 15C:
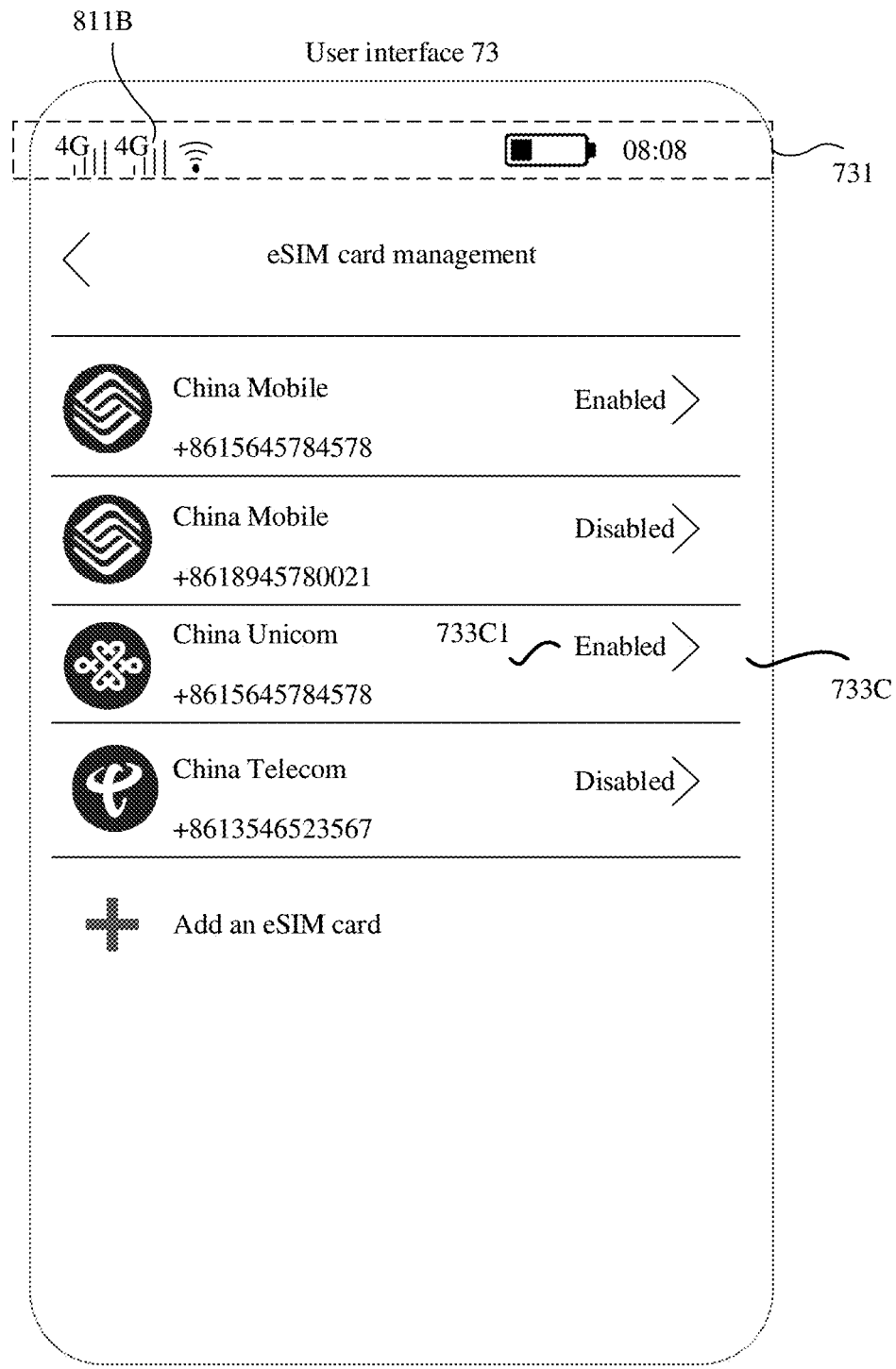

In some embodiments, when detecting an operation (for example, a touch operation) on the back button 812A in the user interface 81 shown in FIG. 15b, the electronic device may display a user interface 73 shown in FIG. 15c.

Compared with that in the user interface 73 shown in FIG. 14c, a signal strength indicator 811B of the communication connection established based on the profile corresponding to the eSIM option 733C is updated and displayed in the status bar 731, and a profile status indicator 733C1 in the eSIM option 733C is updated to be displayed as enabled.

In some embodiments, when the user enables the new second profile, in step S609, the electronic device may determine that the quantity of enabled profiles is not less than the preset threshold, so that subsequent steps S611 to S618 cannot be performed, but step S610 is performed. By using an example in which the preset threshold is 2, the following shows an example user interface used when the electronic device performs step S610 in a case in which the user wants to enable a new profile when there are two enabled profiles in the user interface 73 shown in FIG. 15c.

Figure 16A:
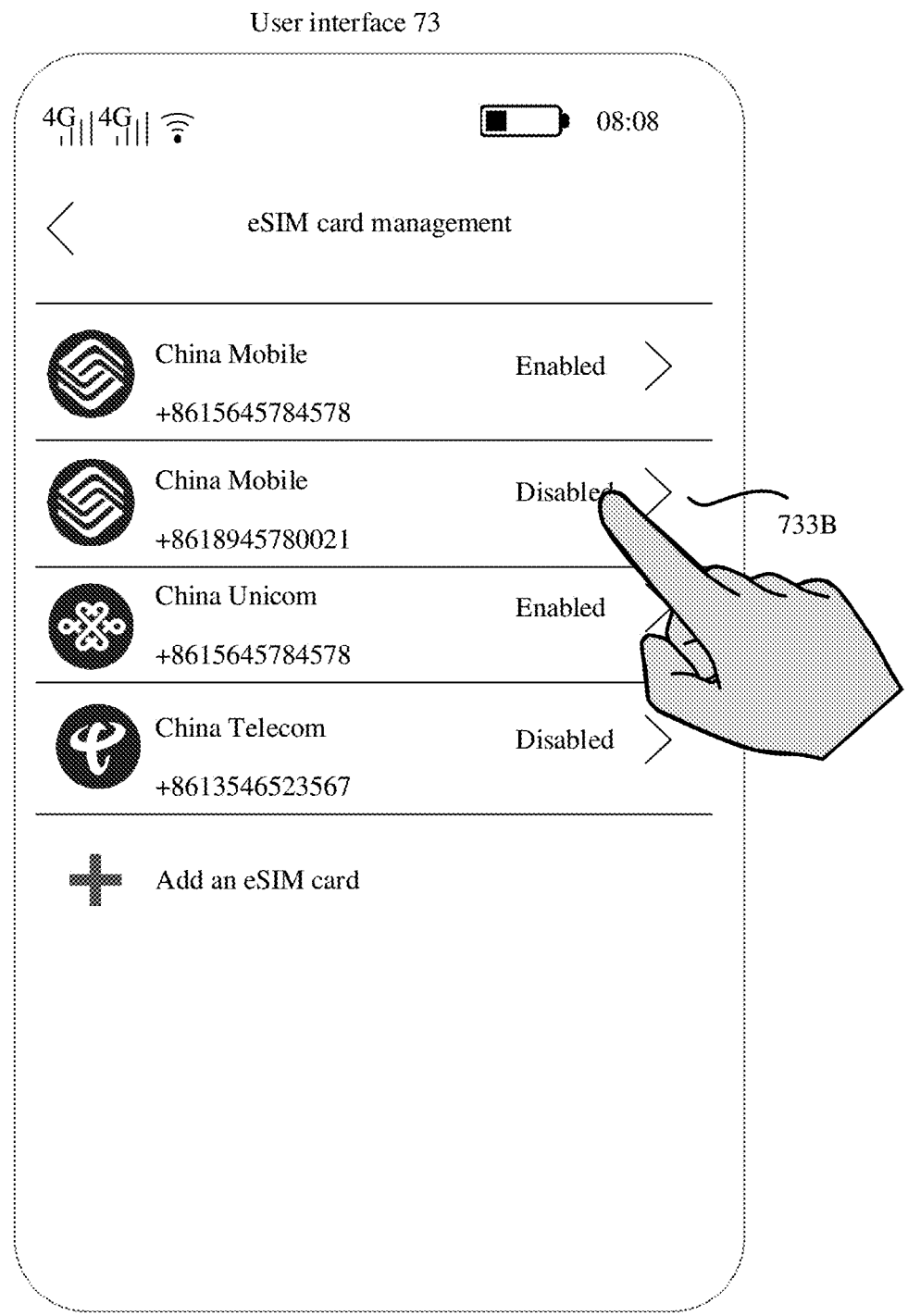
FIG. 16a to FIG. 16c are schematic diagrams of another group of interfaces according to an embodiment of this application.
Figure 16B:
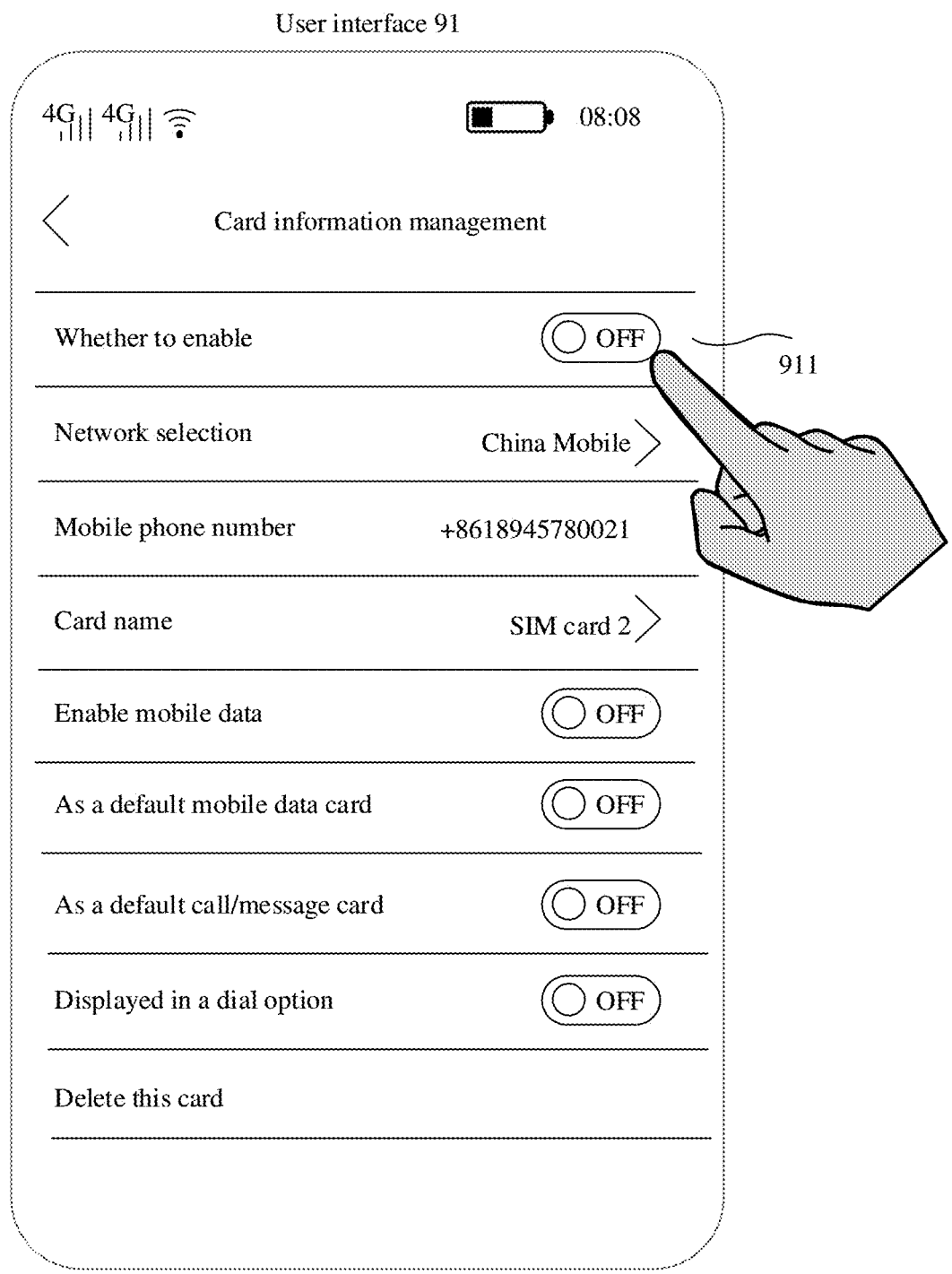

When an operation (for example, a touch operation) performed by the user on an eSIM option 733B in a user interface 73 shown in FIG. 16a is detected, the electronic device may display a user interface 91 shown in FIG. 16b.

For specific descriptions of controls in the user interface 91, refer to the user interface 81 shown in FIG. 15a. Details are not described herein again.

After an operation (for example, a tap operation) performed by the user on an "whether to enable" control 911 in the user interface 91 shown in FIG. 16b is detected, and step S609 is performed, the electronic device determines that a quantity of currently enabled profiles is 2, and this value is not less than the threshold 2. Therefore, the electronic device may display the user interface 91 shown in FIG. 16c, and a prompt box 912 pops up on the user interface 91. The prompt box 912 displays text information: "Prompt: The maximum quantity of enabled SIM cards supported by the terminal is 2. The quantity of enabled SIM cards reaches the upper limit. Please disable an enabled SIM card and then enable this SIM card." and an OK control 912A.

Figure 16C:
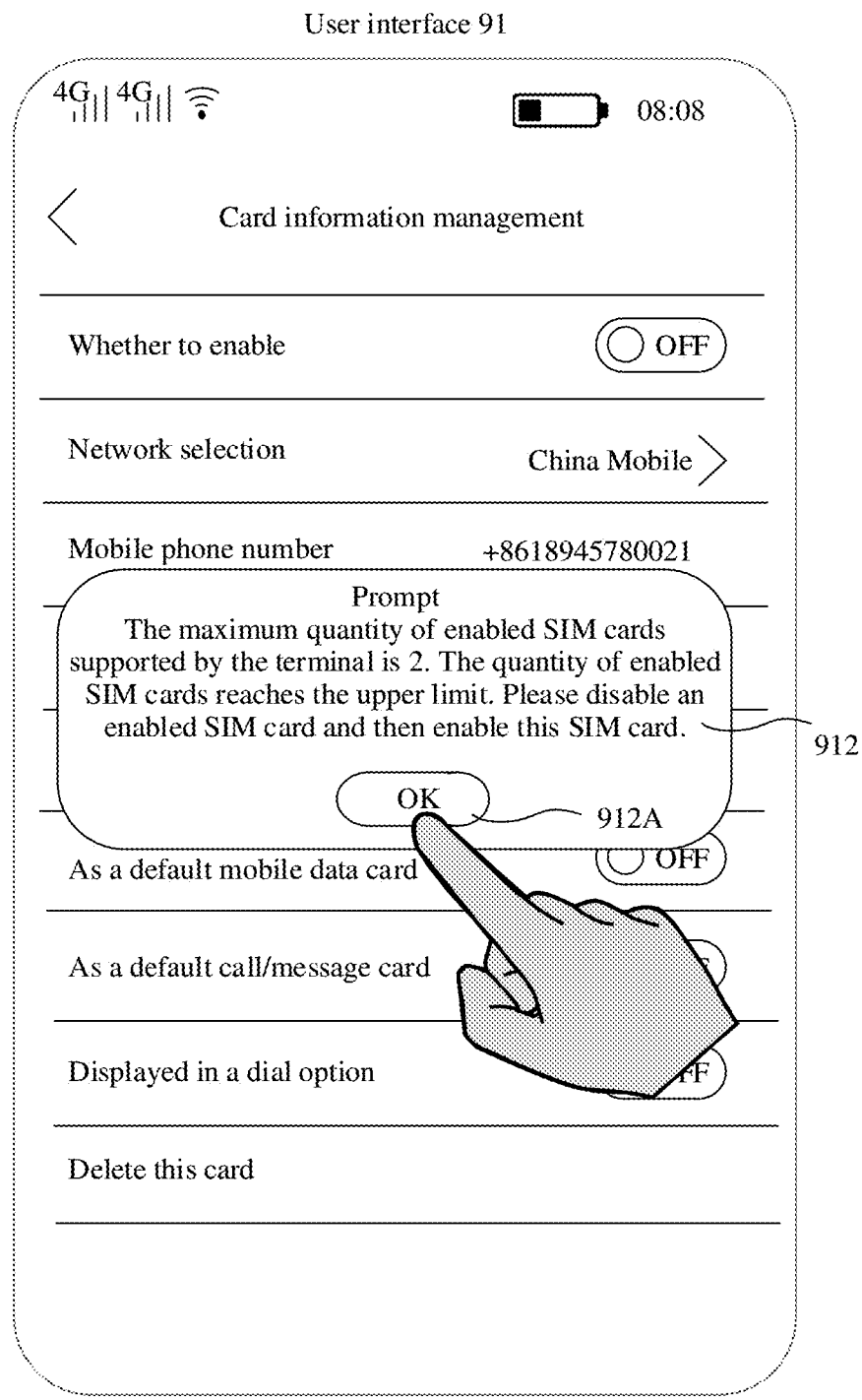

When a tap operation on the OK control 912A in the prompt box 912 shown in FIG. 16c is detected, in response to the operation, the electronic device returns to display the user interface 73 shown in FIG. 16a. In this case, the profile corresponding to the eSIM option 733B cannot be enabled and is still in a disabled state.

(3) Steps S619 to S625: Processing Process of Disabling the First Profile

S619: The electronic device receives an operation of disabling the first profile in the first eSIM by the user.

S620: The electronic device releases the first communication connection in response to the operation.

S621: The electronic device deactivates the first profile.

Specifically, the electronic device may deactivate the second profile by modifying a status field (for example, a profile state field) in the first profile by using the LPA.

For example, if the first profile is a profile 1, a value of a profile state field in the profile 1 is enabled (1). In step S621, the electronic device changes the value of the profile state field in the profile 1 to disabled (0) by using the LPA.

S622: The electronic device updates and displays status information in the eSIM option corresponding to the first profile.

Specifically, after deactivating the first profile, the electronic device may update a status indicator in the eSIM option corresponding to the first profile in the eSIM management area to be disabled.

S623: The electronic device may notify a first RSP server that the first profile is deactivated.

It should be noted that, according to an agreement between an operator to which a profile belongs and a remote service provider, this step may be performed, or may not be performed. This is not limited herein.

Specifically, after deactivating the first profile, the electronic device may send a notification message to the first RSP server, to notify the first RSP server that the first profile is activated. The first RSP server is a server through which the electronic device communicates with a remote management platform of the first profile. The first RSP server may synchronously record a status of the second profile.

It may be understood that, depending on whether service providers of the remote management platforms of the first profile and the second profile are the same and whether an agreement is signed between the service providers, the first RSP server and the second RSP server may be a same RSP server, or the first RSP server and the second RSP server may be different servers. This is not limited herein.

S624: The electronic device no longer displays the signal strength indicator of the first communication connection.

S625: The electronic device updates the profile-IMEI correspondence in a manner of removing the unique identifier of the first profile.

Specifically, after the first profile is deactivated, the electronic device may remove the unique identifier of the first profile from the profile-IMEI correspondence, and recycle the IMEI allocated to the first profile to unallocated IMEI storage space.

In some implementations, only the unique identifier of the first profile in the profile-IMEI correspondence may be removed, the IMEI allocated to the first profile is not recycled, and a unique identifier part of a profile corresponding to the IMEI is set to null. When a new profile is activated and an IMEI needs to be allocated, the unique identifier of the profile to which the IMEI needs to be allocated is directly filled in the null part, to establish a correspondence. For details, refer to the foregoing description of the profile-IMEI correspondence. Details are not described herein again.

The following describes an example user interface used in the processing process of disabling the first profile.

Figure 17A:
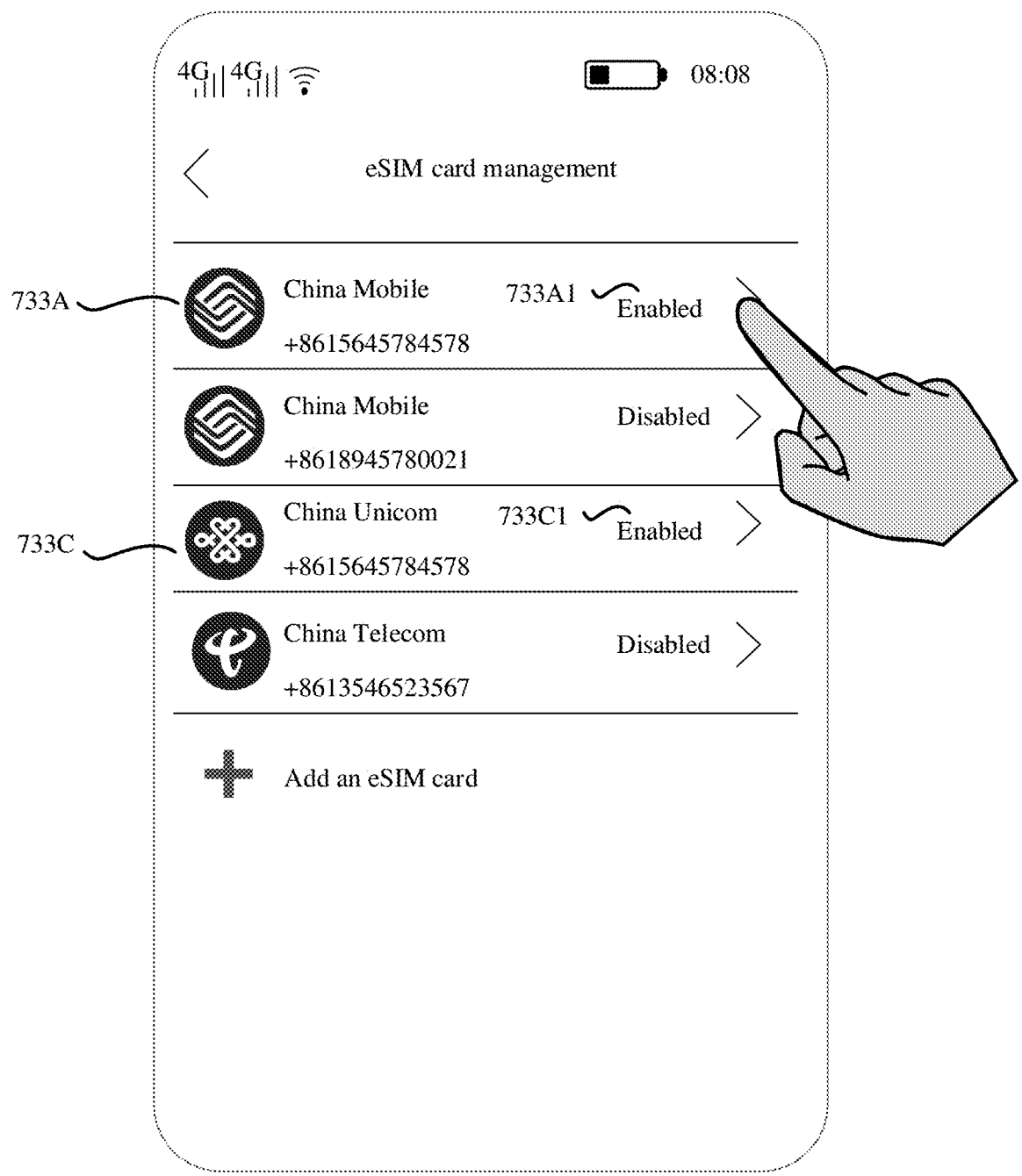
FIG. 17a to FIG. 17d are schematic diagrams of another group of interfaces according to an embodiment of this application.

As shown in FIG. 17a, an example in which the first profile that the user needs to disable is a profile corresponding to an eSIM option 733A in a user interface 73 shown in FIG. 17a is used for description.

In this case, in the user interface 73 shown in FIG. 17a, a profile status indicator 733A1 of an eSIM option 733A is displayed as enabled, a profile status indicator 733C1 of an eSIM option 733C is displayed as enabled, and there are two signal strength indicators corresponding to the two profiles in a status bar.

Figure 17B:
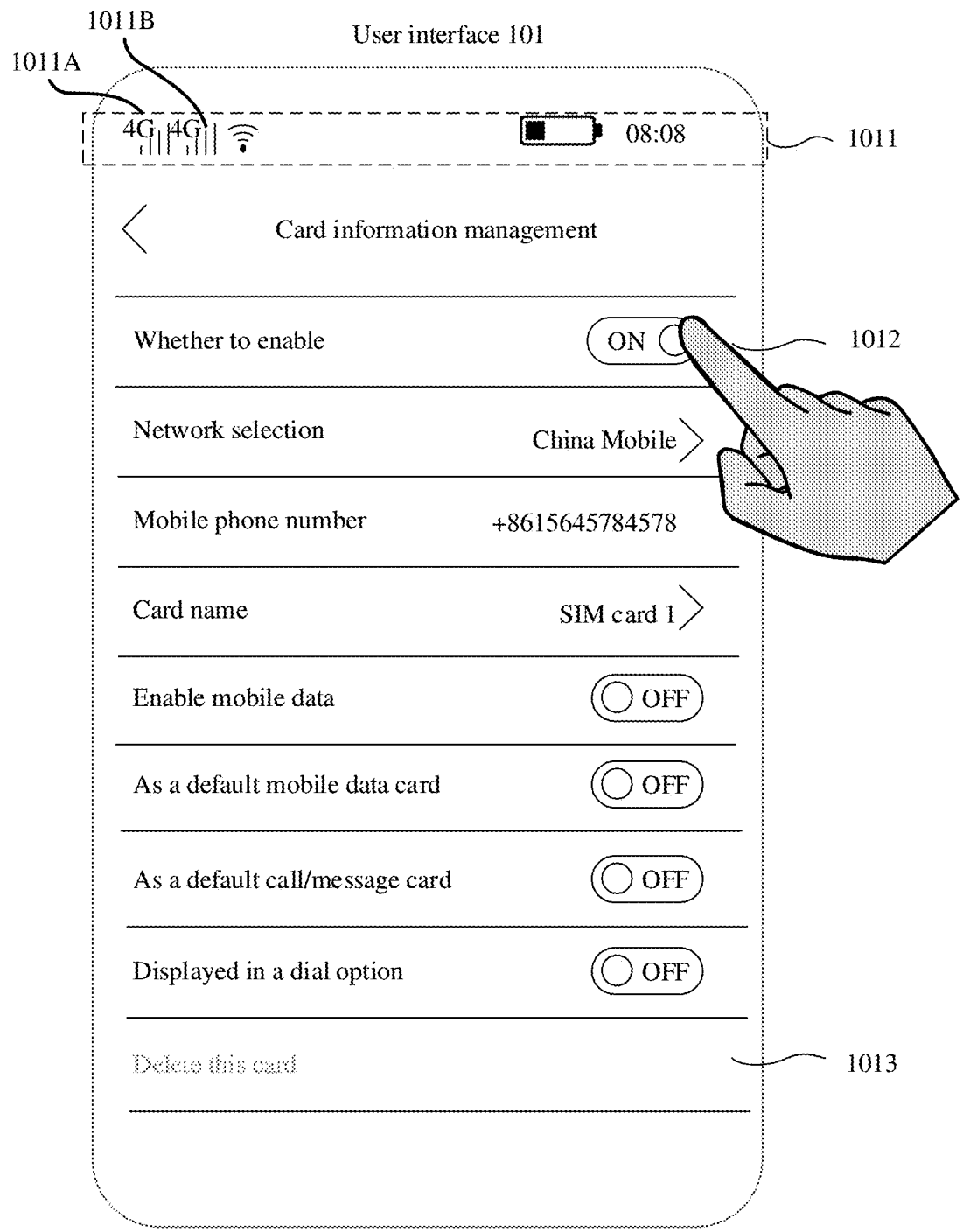

In some embodiments, when an operation (for example, a touch operation) on the eSIM option 733A in the user interface 73 shown in FIG. 17a is detected, the electronic device may display a user interface 101 shown in FIG. 17b.

As shown in FIG. 17b, a status bar 101 of a user interface 101 includes a signal strength indicator 1011A of a profile corresponding to the eSIM option 733A and a signal strength indicator 1011B of a profile corresponding to the eSIM option 733C. The user interface 101 further includes a "whether to enable" control 1012 and a "delete this card" control 1013. Because the profile is currently in an enabled state, the "delete this card" control 1013 is currently in an unactivatable state. For specific descriptions of other controls in the user interface 101, refer to the user interface 81 shown in FIG. 15a. Details are not described herein again.

Figure 17C:
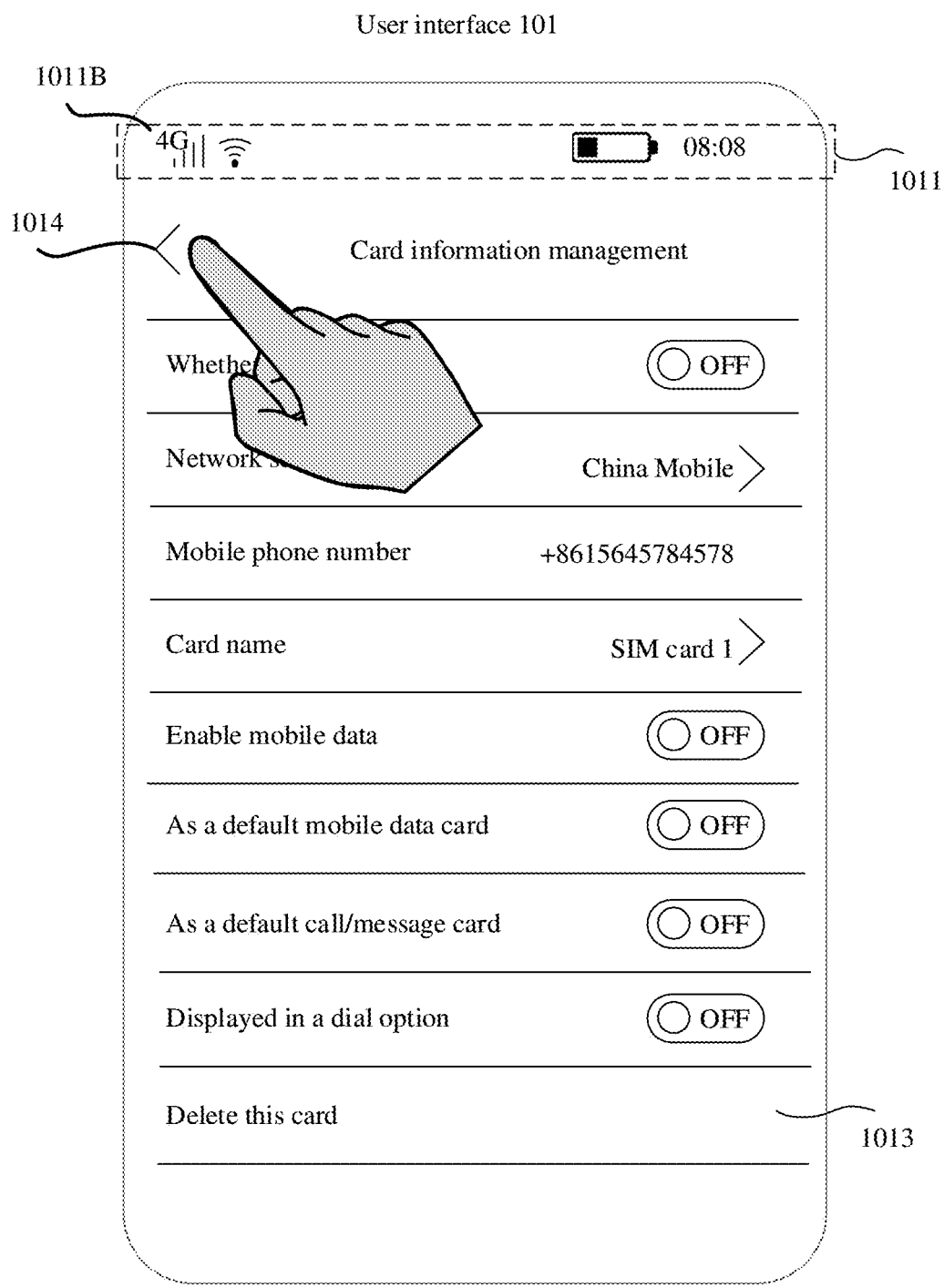

When an operation (for example, a touch operation) performed by the user on the "whether to enable" control 1012 in the user interface 101 shown in FIG. 17b is detected, the electronic device may display a user interface 101 shown in FIG. 17c.

In response to the operation of the user, in the user interface 101 shown in FIG. 17c, an on/off state of the control 1012 is set to off, and the electronic device performs the foregoing steps S619 to S625. The signal strength indicator 1011A of the profile corresponding to the eSIM option 733A is hidden, and the status bar 1011 displays only the signal strength indicator 1011B of the profile corresponding to the eSIM option 733C. Because the profile is disabled, the "delete this card" control 1013 is updated to an activatable state.

Figure 17D:
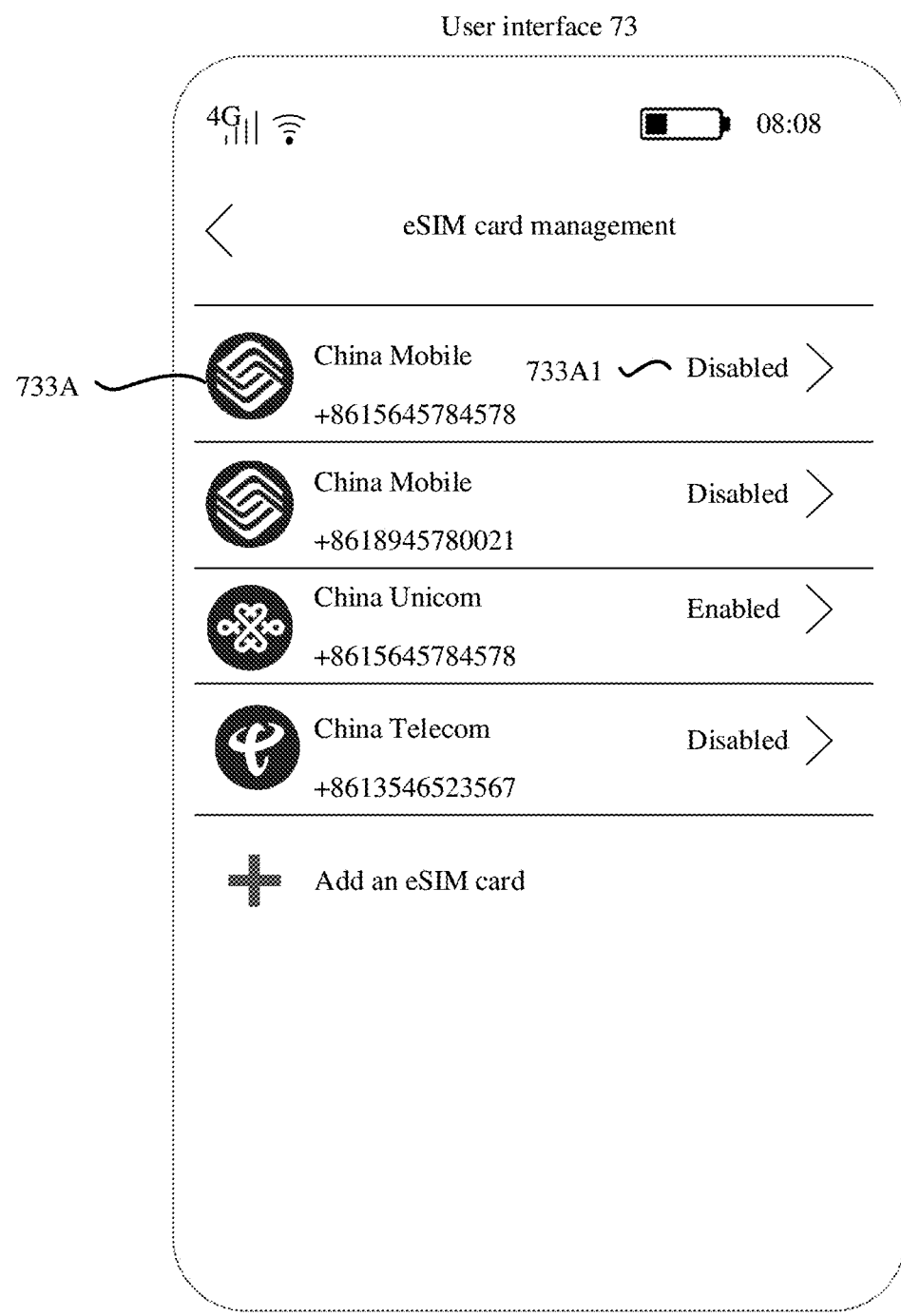

When an operation (for example, a tap operation) performed by the user on a back button 1014 in the user interface 101 shown in FIG. 17c is detected, the electronic device may display a user interface 73 shown in FIG. 17d.

In this case, in the user interface 73 shown in FIG. 17d, the profile status indicator 733A1 on the eSIM option 733A is updated to be disabled.

In some embodiments of this application, the user may delete a disabled profile. An example in which the user needs to delete a profile corresponding to an eSIM option 733C in a user interface 73 shown in FIG. 18a is used below for description.

Figure 18A:
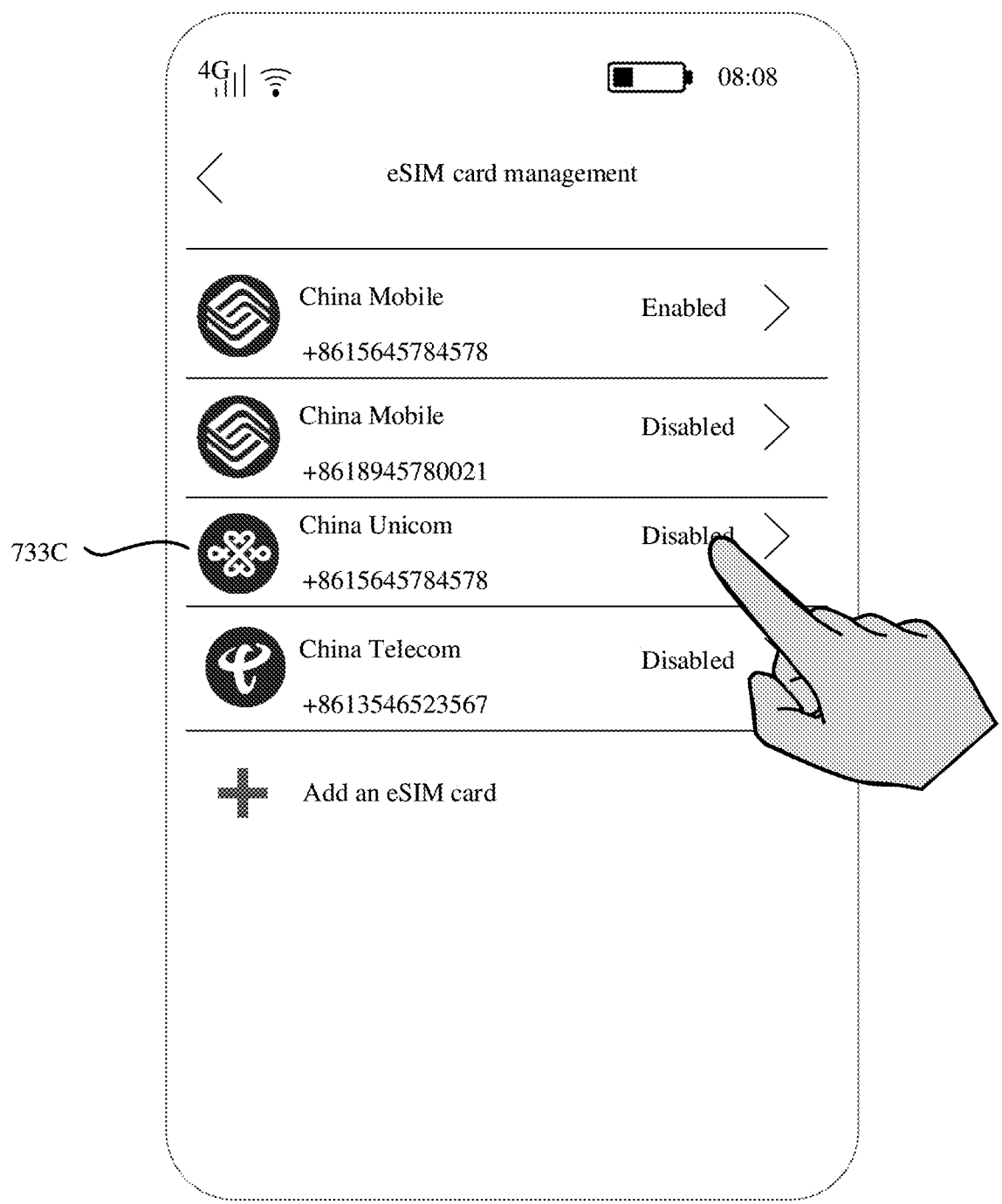
FIG. 18a to FIG. 18e are schematic diagrams of another group of interfaces according to an embodiment of this application.
Figure 18B:
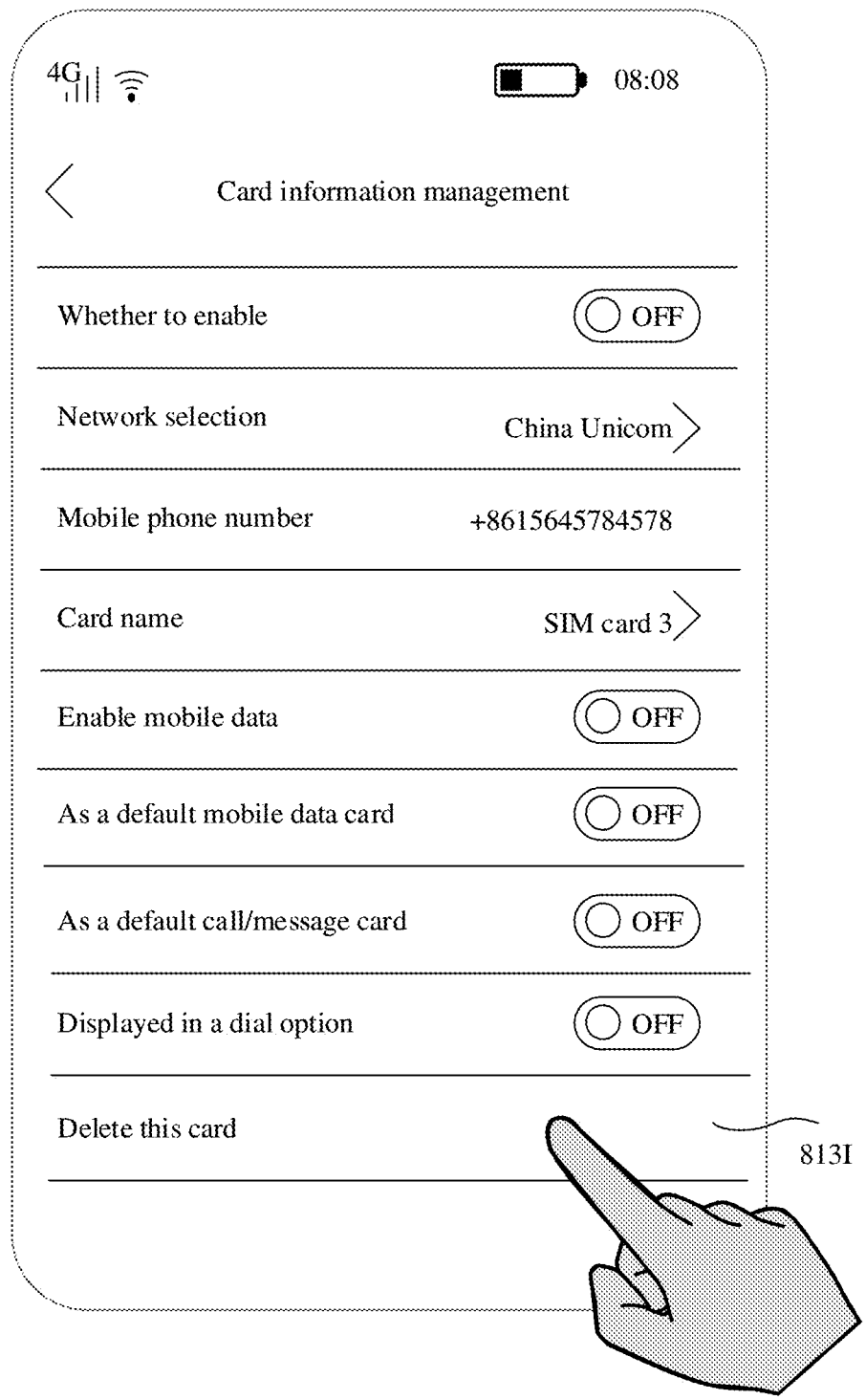

When an operation (for example, a touch operation) performed by the user on the eSIM option 733C in the user interface 73 shown in FIG. 18a is detected, the electronic device may display a user interface 81 shown in FIG. 18b. Because the profile corresponding to the eSIM option 733C is in a disabled state, a "delete this card" control 813I is in a triggerable state.

Figure 18C:
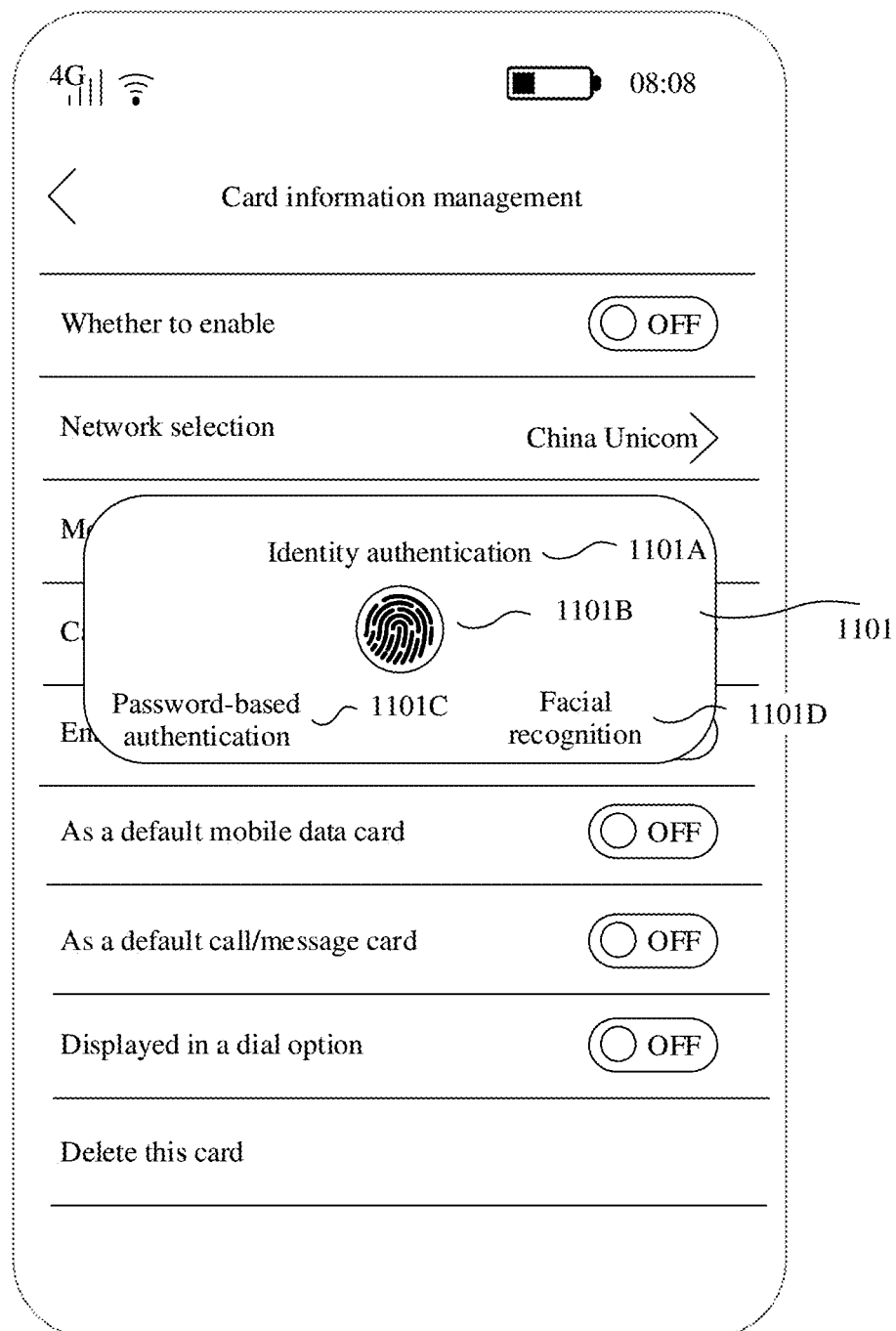

When an operation (for example, a tap operation) performed by the user on the "delete this card" control 813I on the user interface 81 shown in FIG. 18b is detected, the electronic device may display a user interface 81 shown in FIG. 18c. An identity authentication prompt box 1101 pops up in the user interface 81 shown in FIG. 18c. The identity authentication prompt box 1101 may include the following.

An identity authentication indicator 1101A is used to prompt the user that the identity authentication prompt box 1101 is used to perform identity authentication.

A fingerprint recognition indicator 1101B is used to prompt the user that an identity authentication manner that is currently triggered is fingerprint recognition. A fingerprint icon of the fingerprint recognition indicator 1101B may change correspondingly according to a fingerprint recognition progress of the user.

A password-based authentication control 110C is used to pop up a password input box after an operation of the user is received.

A facial recognition control 110D is used to trigger a facial recognition verification mode after an operation of the user is received.

Figure 18D:
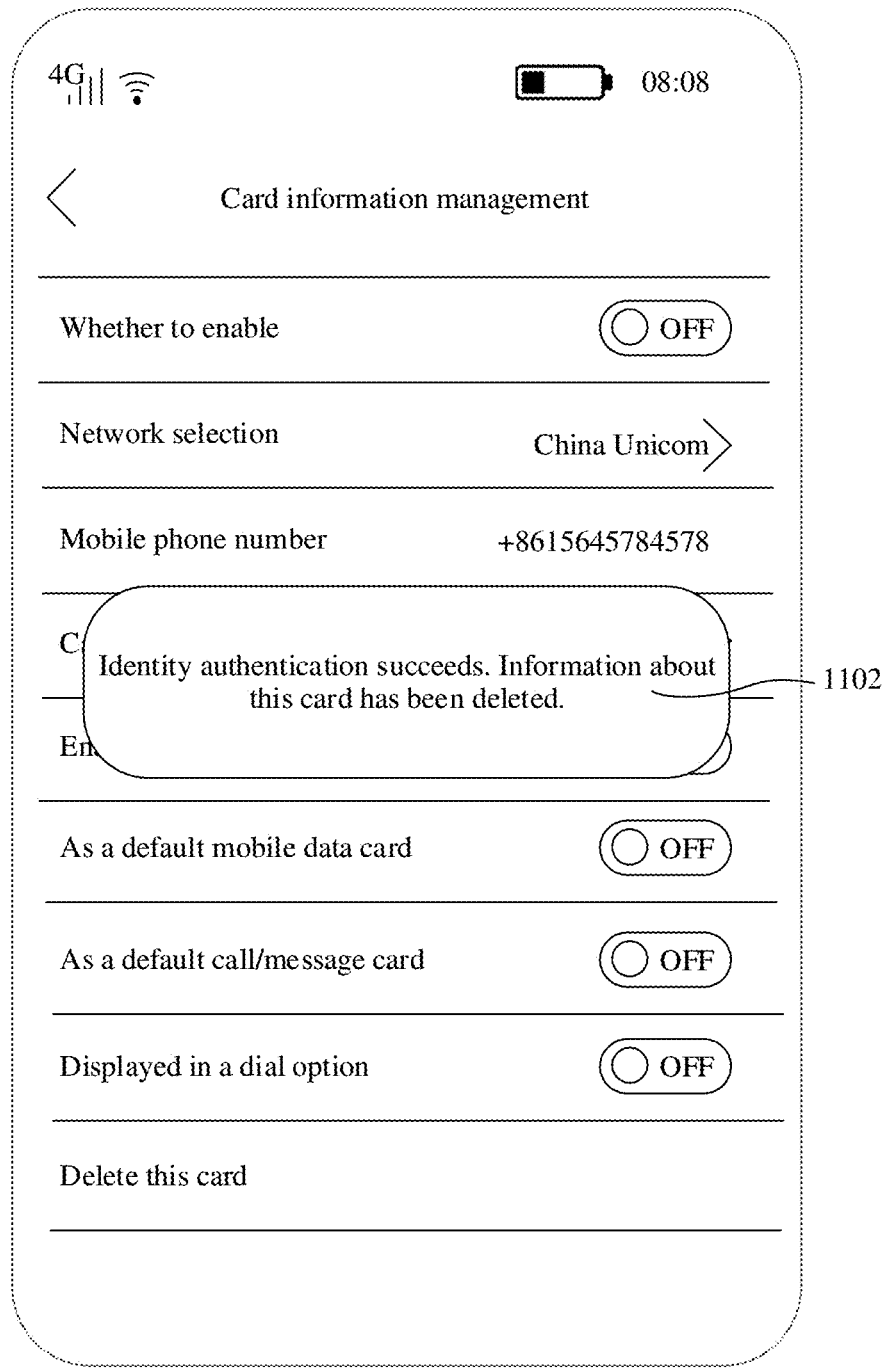

After it is detected that user identity authentication succeeds, the electronic device displays a user interface 81 shown in FIG. 18d. An authentication success prompt box 1102 pops up in the user interface 81 shown in FIG. 18d. The authentication success prompt box 1102 includes text information: Identity authentication succeeds. Information about this card has been deleted.

Figure 18E:
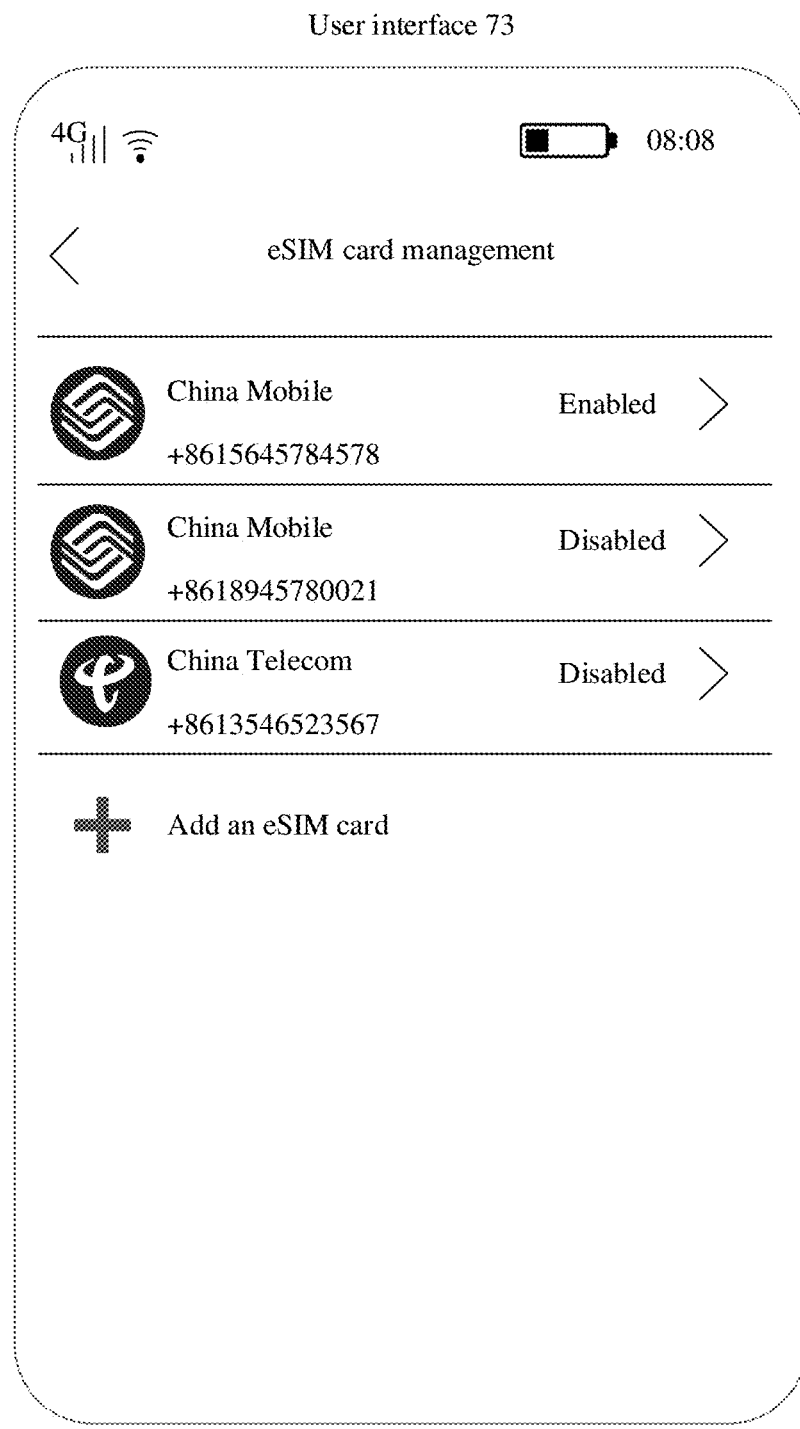

Then, the electronic device automatically jumps to a user interface 73 shown in FIG. 18e. In the user interface 73 shown in FIG. 18e, the eSIM option 733C has been deleted and is no longer displayed.

Application scenario 2: In some embodiments of this application, at least one eSIM may be installed in the electronic device, and a card slot may also be installed in the electronic device.

The following uses an example in which the electronic device has two eSIMs and one SIM card slot into which a SIM card is inserted, and a maximum quantity of profiles that can be simultaneously enabled and standby in the electronic device is 5, to describe an example user interface that may be used when the communication connection method in this embodiment of this application is performed.

Figure 19A:
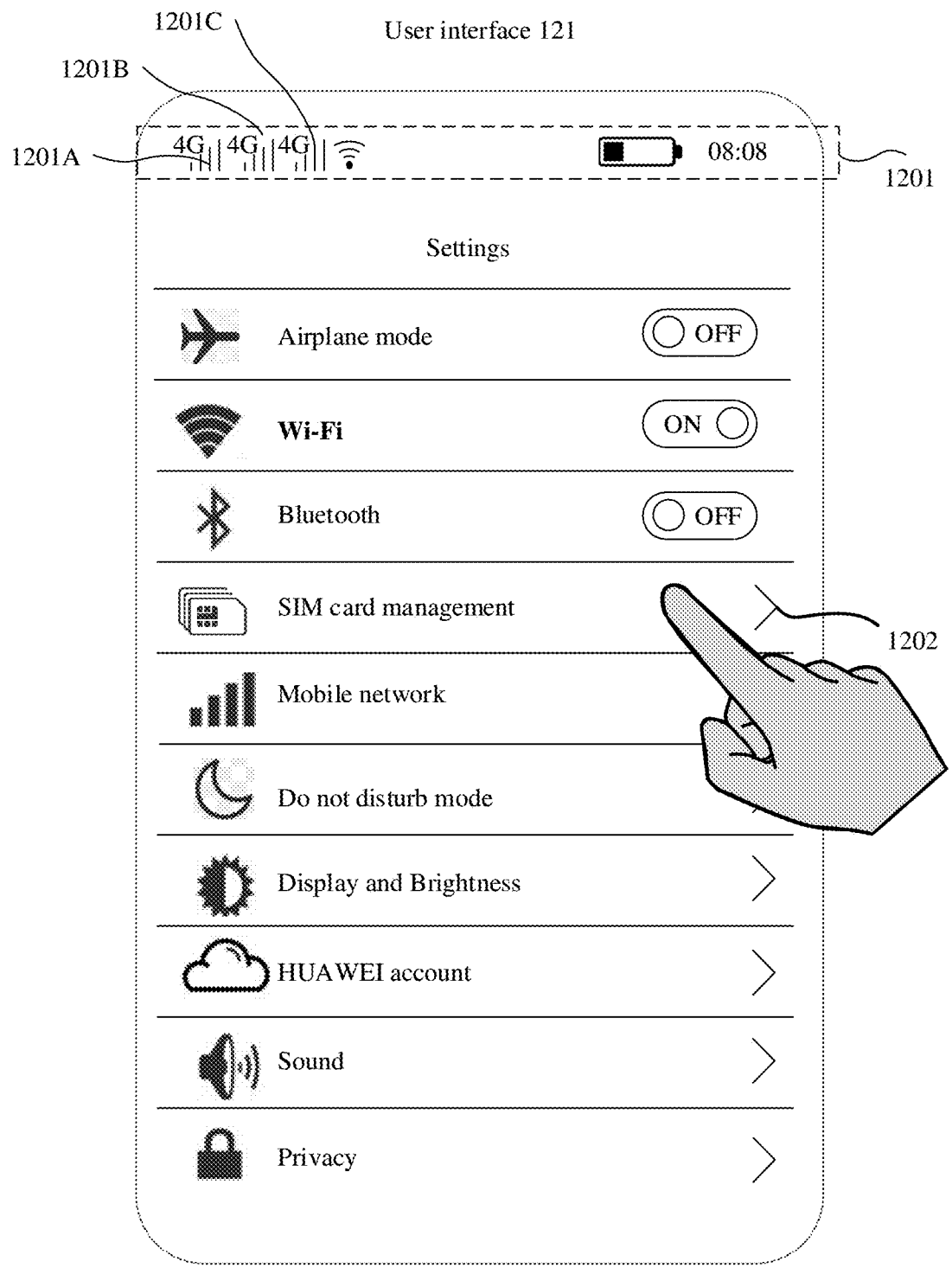
FIG. 19a to FIG. 19c are schematic diagrams of another group of interfaces according to an embodiment of this application.

A user interface 121 shown in FIG. 19a includes a status bar 1201, a title bar, and a setting option area.

The status bar 1201 includes a signal strength indicator 1201A, a signal strength indicator 1201B, and a signal strength indicator 1201C, indicating that three profiles in the electronic device are enabled and are in an activated state.

The setting option area includes a SIM card management setting option 1202. The SIM card management setting option is used to manage all eSIMs and SIM cards in the electronic device.

Figure 19B:
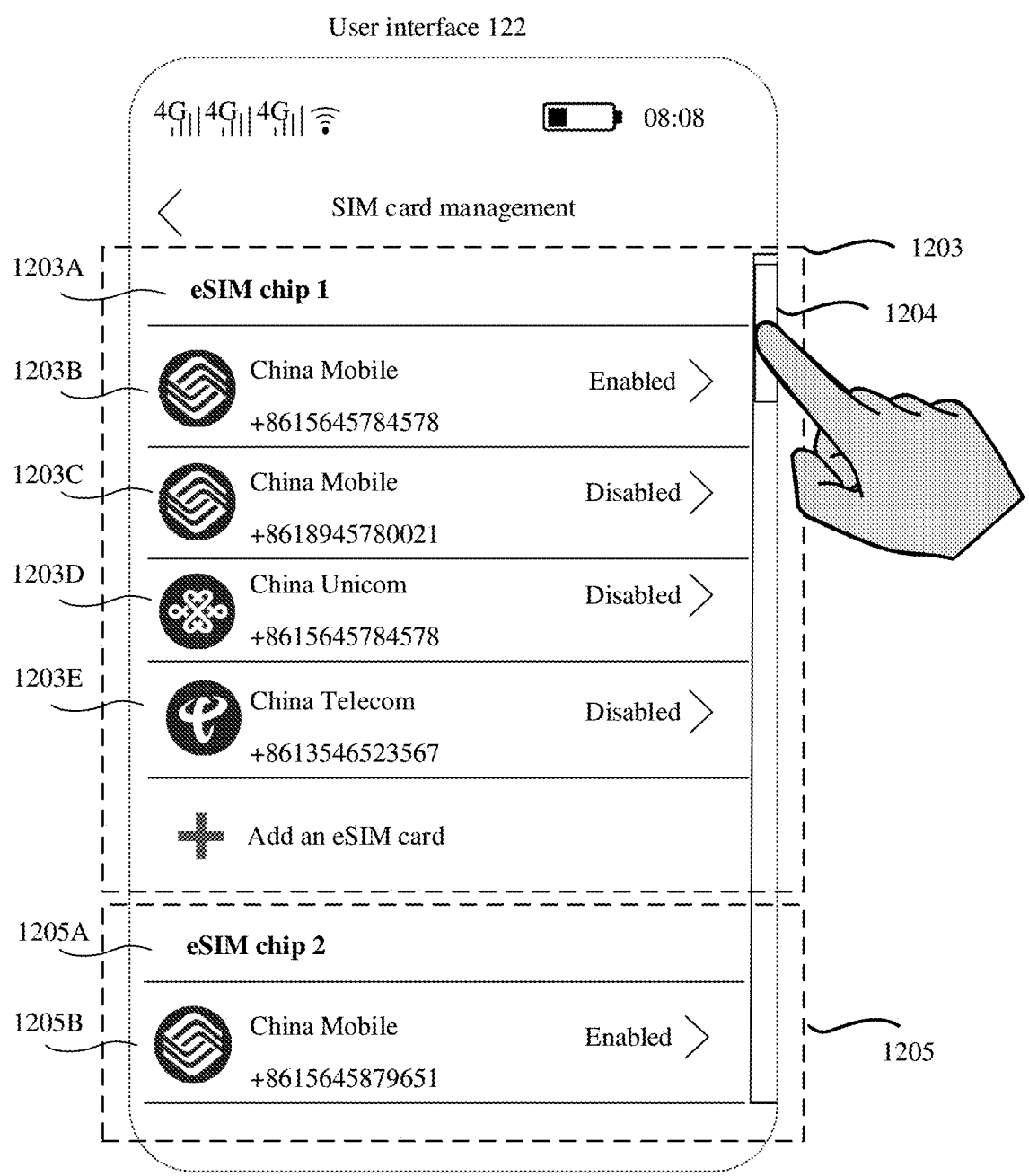

When an operation (for example, a touch operation) performed by the user on the SIM card management setting option in the user interface 121 shown in FIG. 19a is detected, the electronic device may display a user interface 122 shown in FIG. 19b.

The user interface 122 shown in FIG. 19b includes a status bar, a back button, a page indicator, a card management area 1203, a card management area 1205, and a slide control 1204.

The slide control 1204 is used to receive an operation of sliding up and down after being pressed by the user, to display more areas in the user interface 122.

Figure 19C:
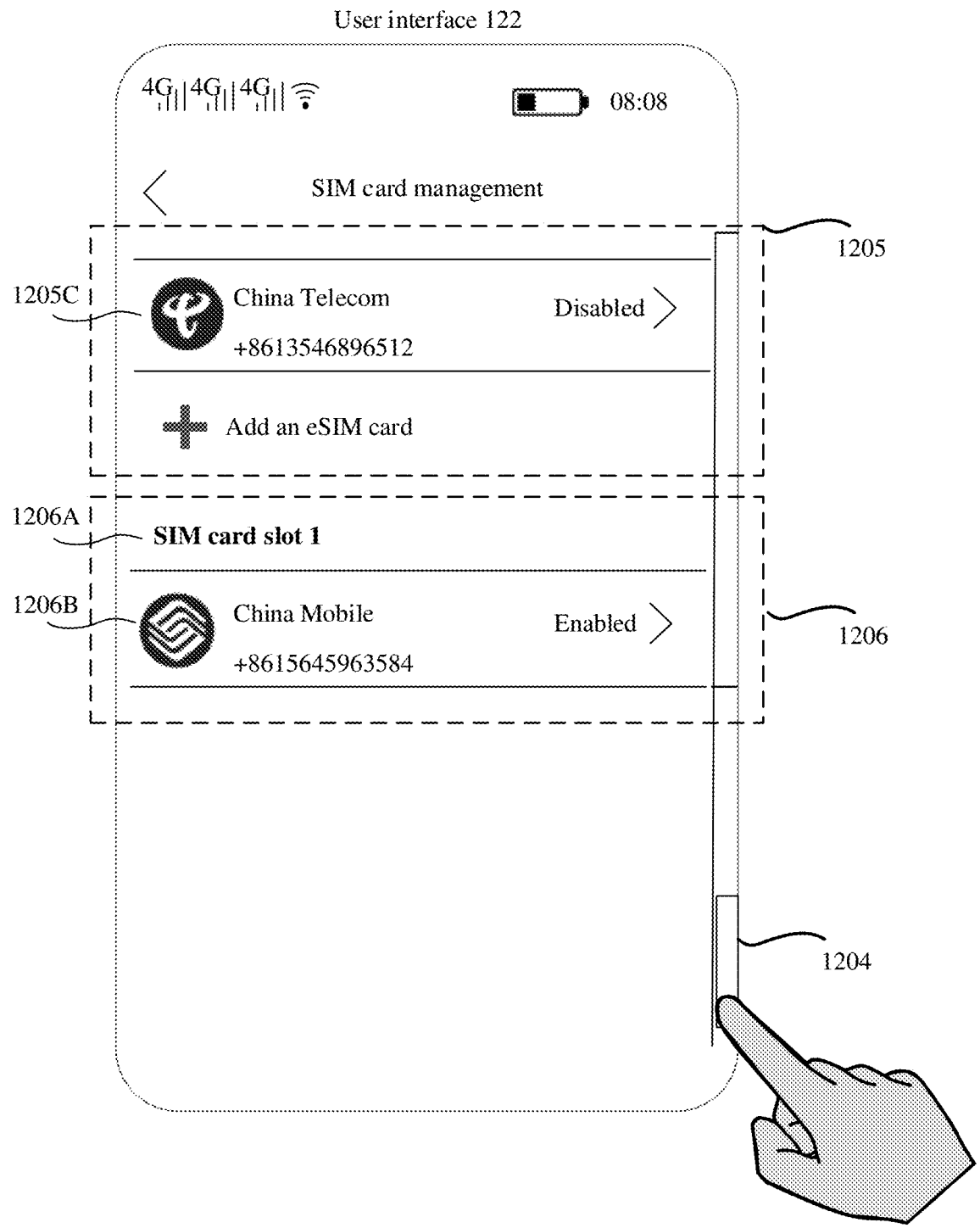

When an operation (for example, an operation of pressing and sliding down) performed by the user on the slide control 1204 in the user interface 122 shown in FIG. 19b is detected, the electronic device may display a user interface 122 shown in FIG. 19c.

The user interface 122 shown in FIG. 19c includes a remaining part of the card management area 1205 and the card management area 1206.

The card management area 1203 includes an area indicator 1203A, an eSIM option 1203B, an eSIM option 1203C, an eSIM option 1203D, an eSIM option 1203E, and an eSIM adding control.

The area indicator 1203A is used to indicate that an eSIM/card slot to which the SIM/eSIM option displayed in the area belongs is an eSIM 1. A profile status indicator in the eSIM option 1203B is displayed as enabled, indicating that a profile corresponding to the eSIM option 1203B is in an activated state. A signal strength indicator corresponding to the profile in the status bar is the signal strength indicator 1201A. Profile status indicators in the eSIM option 1203C, the eSIM option 1203D, and the eSIM option 1203E are all displayed as disabled.

The card management area 1205 includes an area indicator 1205A, an eSIM option 1205B, an eSIM option 1205C, and an eSIM add control.

The area indicator 1205A is used to indicate that an eSIM/card slot to which the SIM/eSIM option displayed in the area belongs is an eSIM 2. A profile status indicator in the eSIM option 1205B is displayed as enabled, indicating that a profile corresponding to the eSIM option 1205B is in an activated state. A signal strength indicator corresponding to the profile in the status bar is the signal strength indicator 1201B. A profile status indicator in the eSIM option 1205C is displayed as disabled.

The card management area 1206 includes an area indicator 1206A and a SIM card option 1206B.

The area indicator 1206A is used to indicate that an eSIM/card slot to which the SIM/eSIM option displayed in the area belongs is a SIM card slot 1. A profile status indicator in the SIM card option 1206B is displayed as enabled, indicating that a profile corresponding to the SIM card option 1206B is in an activated state.

Figure 20A:
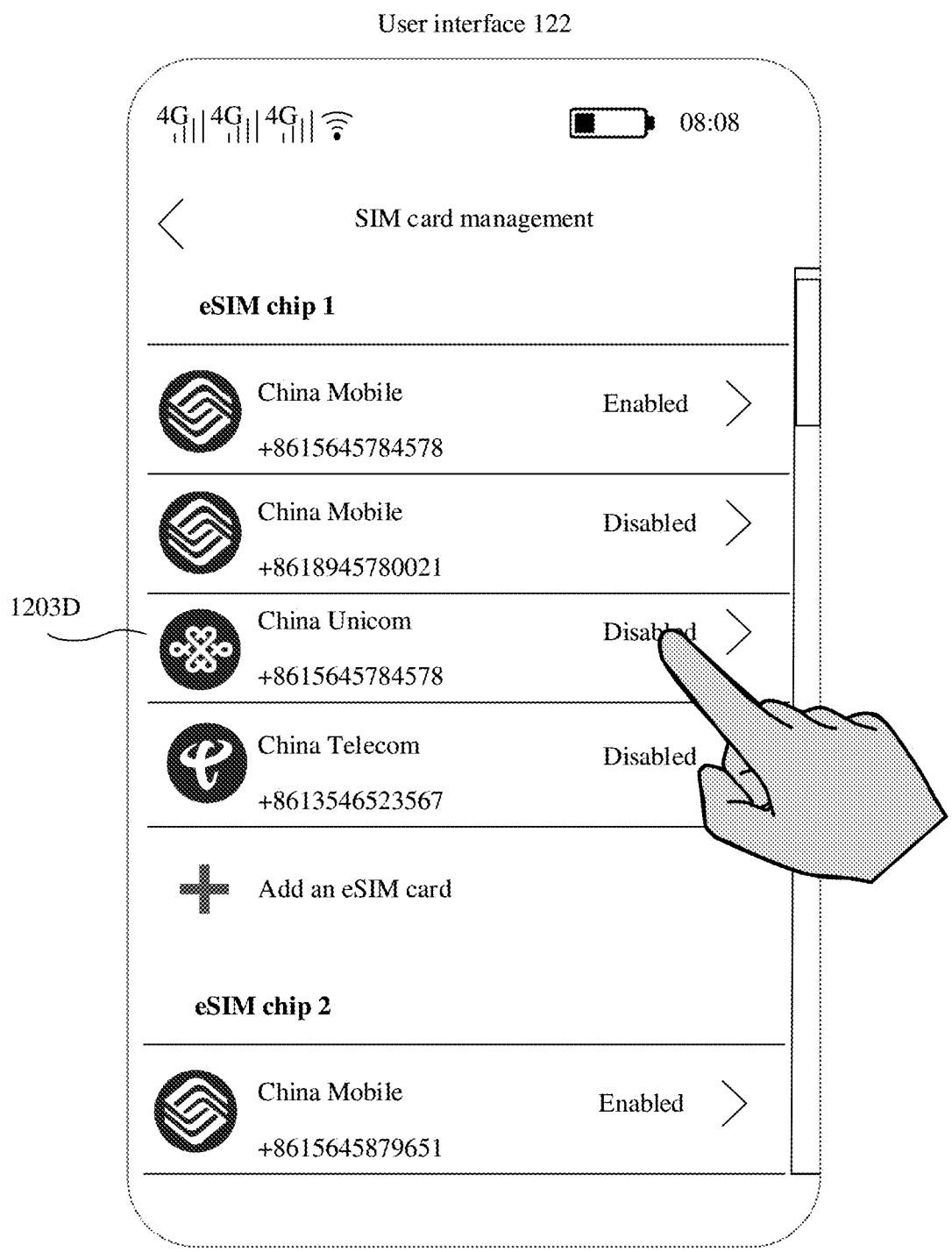
Figure 20B:
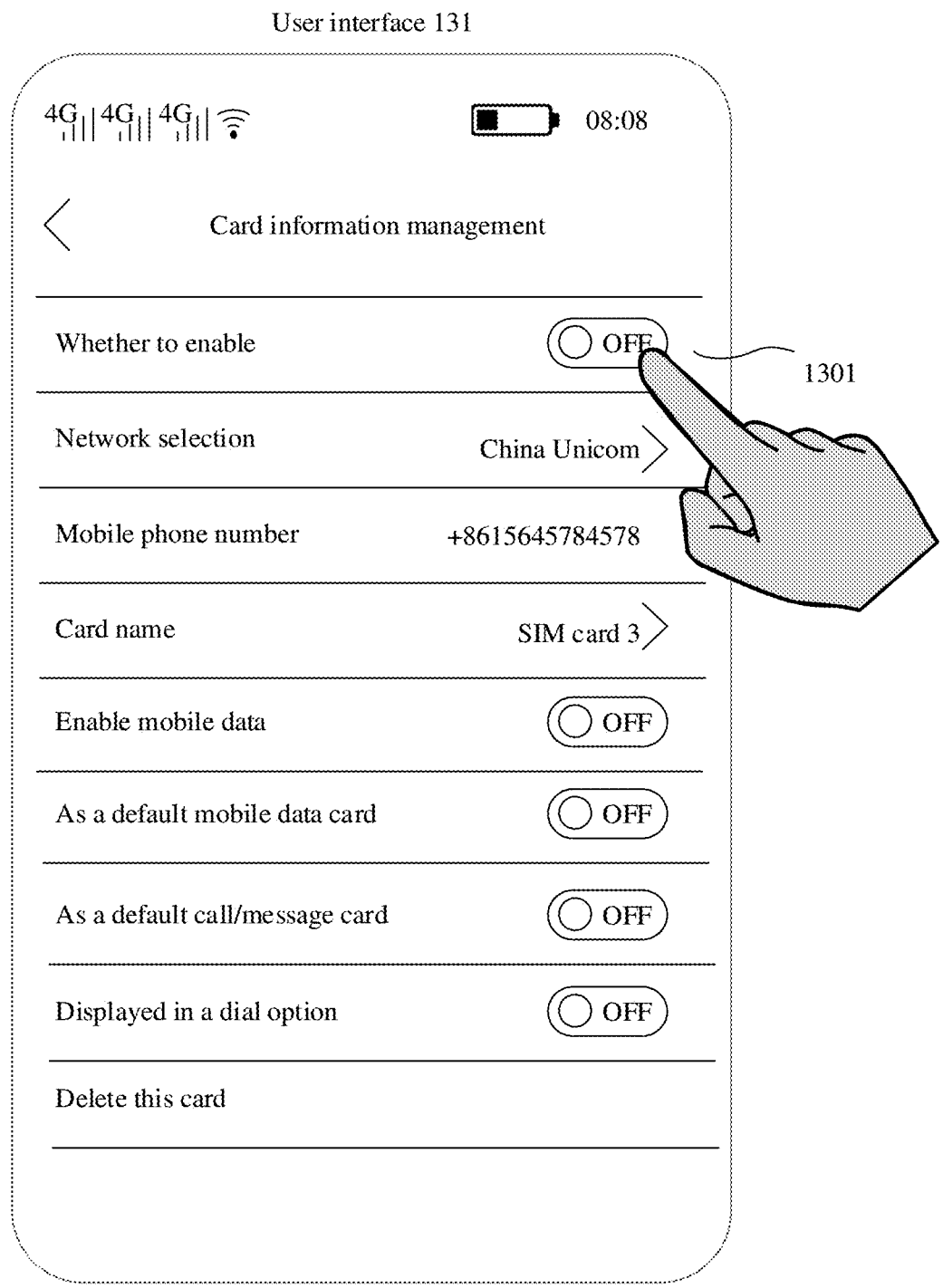

When an operation (for example, a touch operation) performed by the user on the eSIM option 1203D in the user interface 122 shown in FIG. 20a is detected, the electronic device may display a user interface 131 shown in FIG. 20b.

Figure 20C:
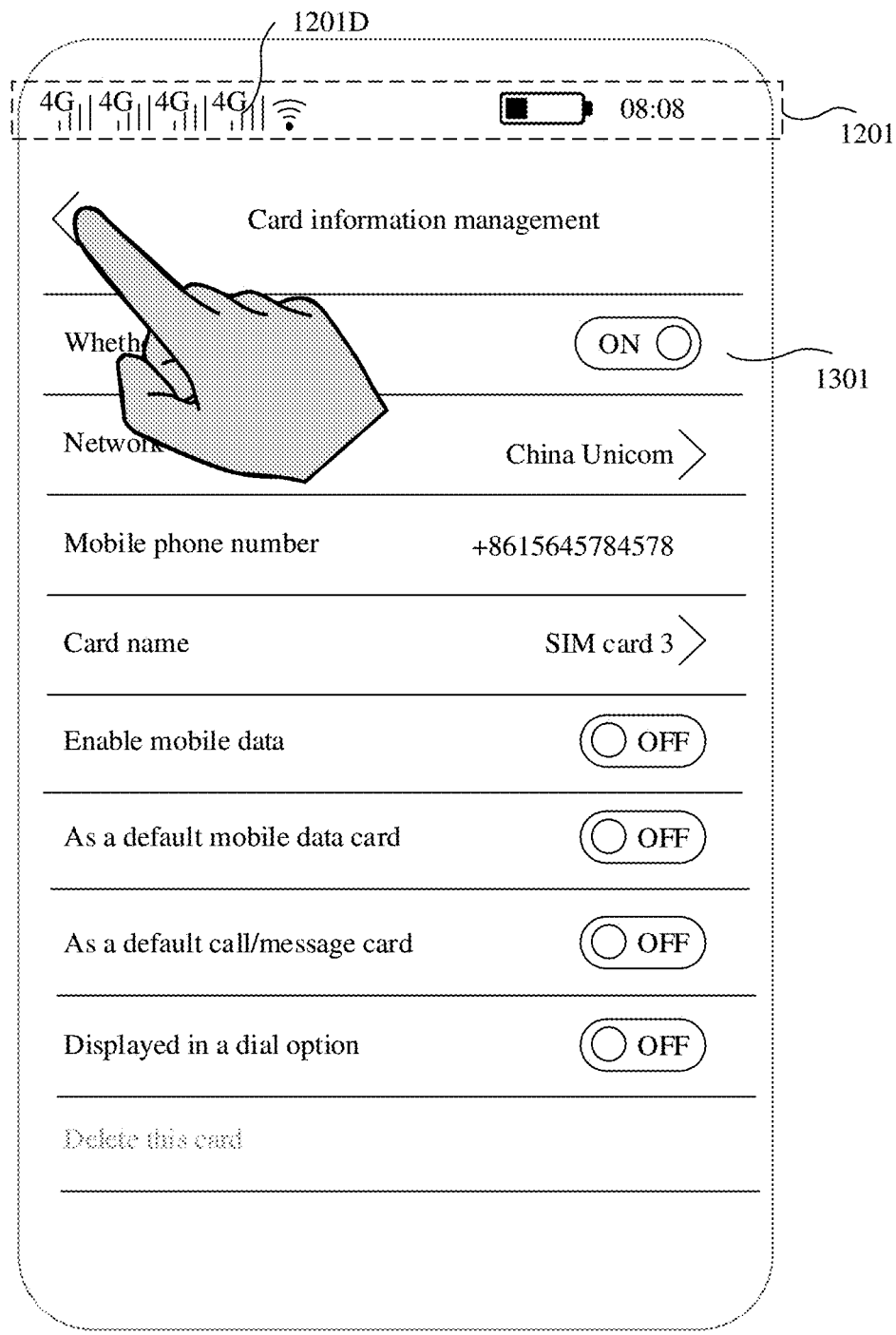

When an operation (for example, a touch operation) performed by the user on a "whether to enable" control 1301 in the user interface 131 shown in FIG. 20b is detected, the electronic device may perform steps S608 to S618, and display a user interface 131 shown in FIG. 20c. In this case, an on/off state of the "whether to enable" control 1301 in the user interface 131 is set to on, and a signal strength indicator 1201D of the communication connection established based on a profile corresponding to an eSIM option 1203D is updated and displayed in the status bar 1201.

Figure 20D:
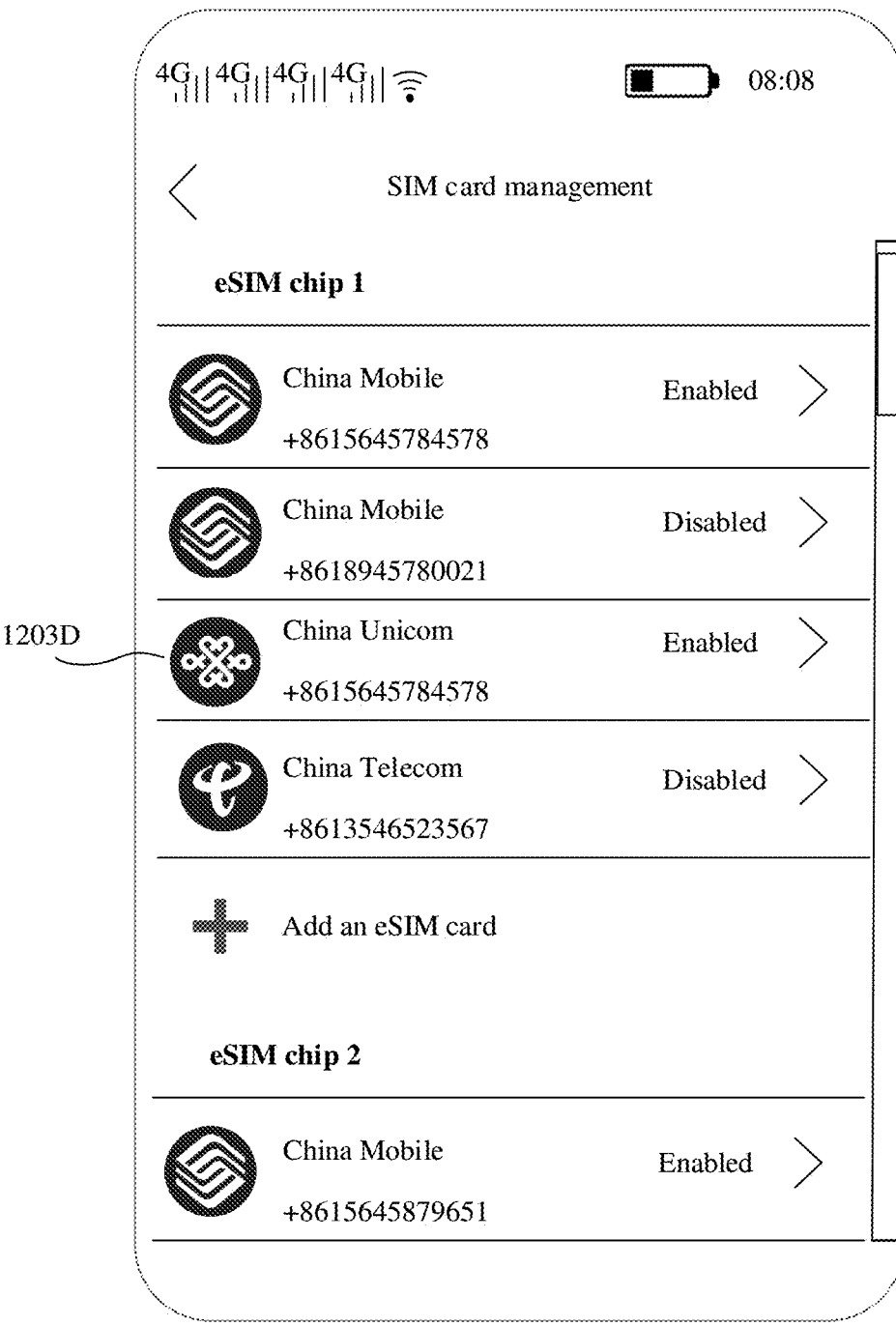

When an operation (for example, a tap operation) performed by the user on a back button in a user interface 131 shown in FIG. 20c is detected, the electronic device may display a user interface 122 shown in FIG. 20d. In this case, the profile status indicator of the eSIM option 1203D in the user interface 122 is updated and displayed as enabled.

Figure 21A:
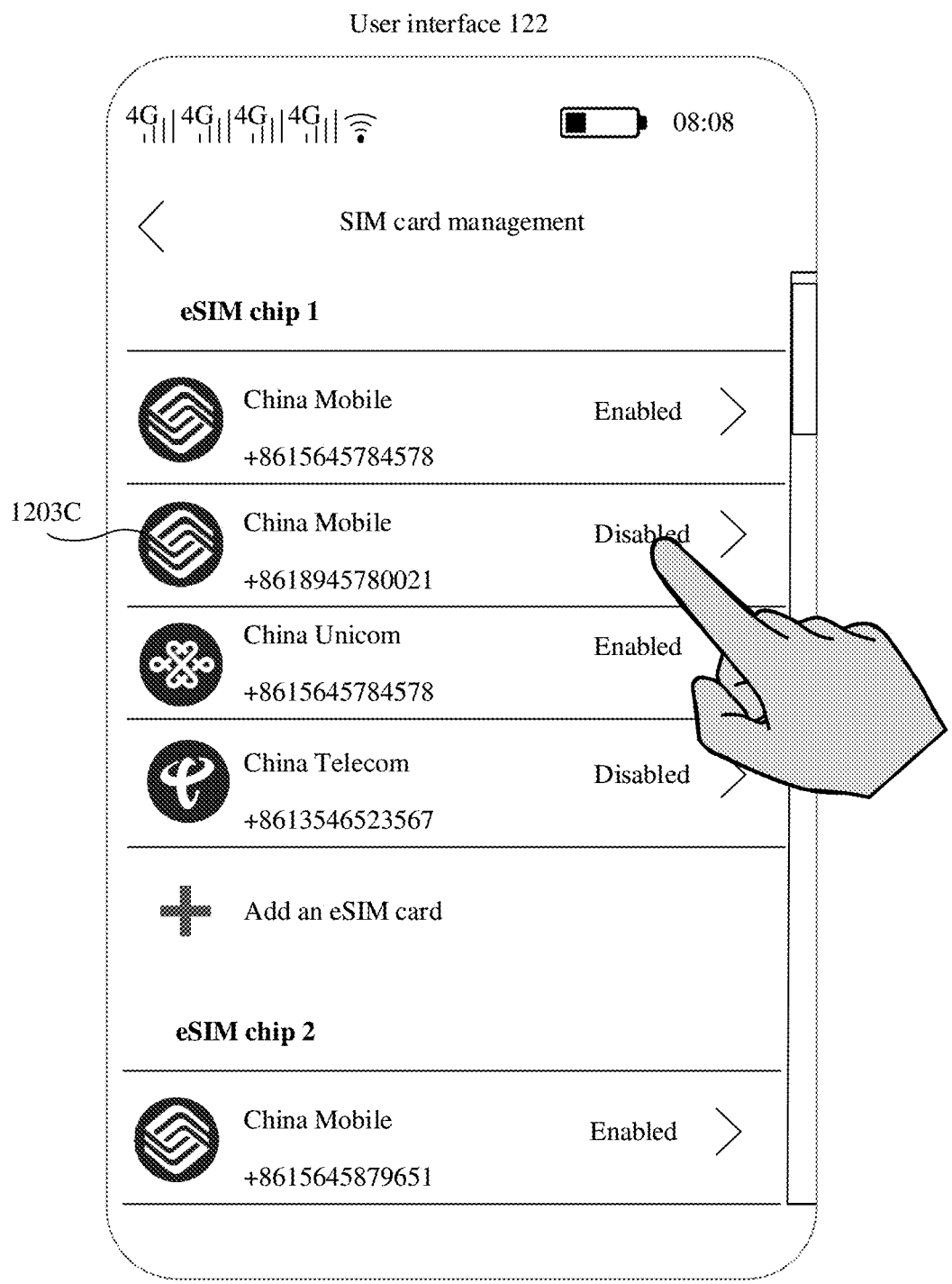
FIG. 21a to FIG. 21d are schematic diagrams of another group of interfaces according to an embodiment of this application.
Figure 21B:
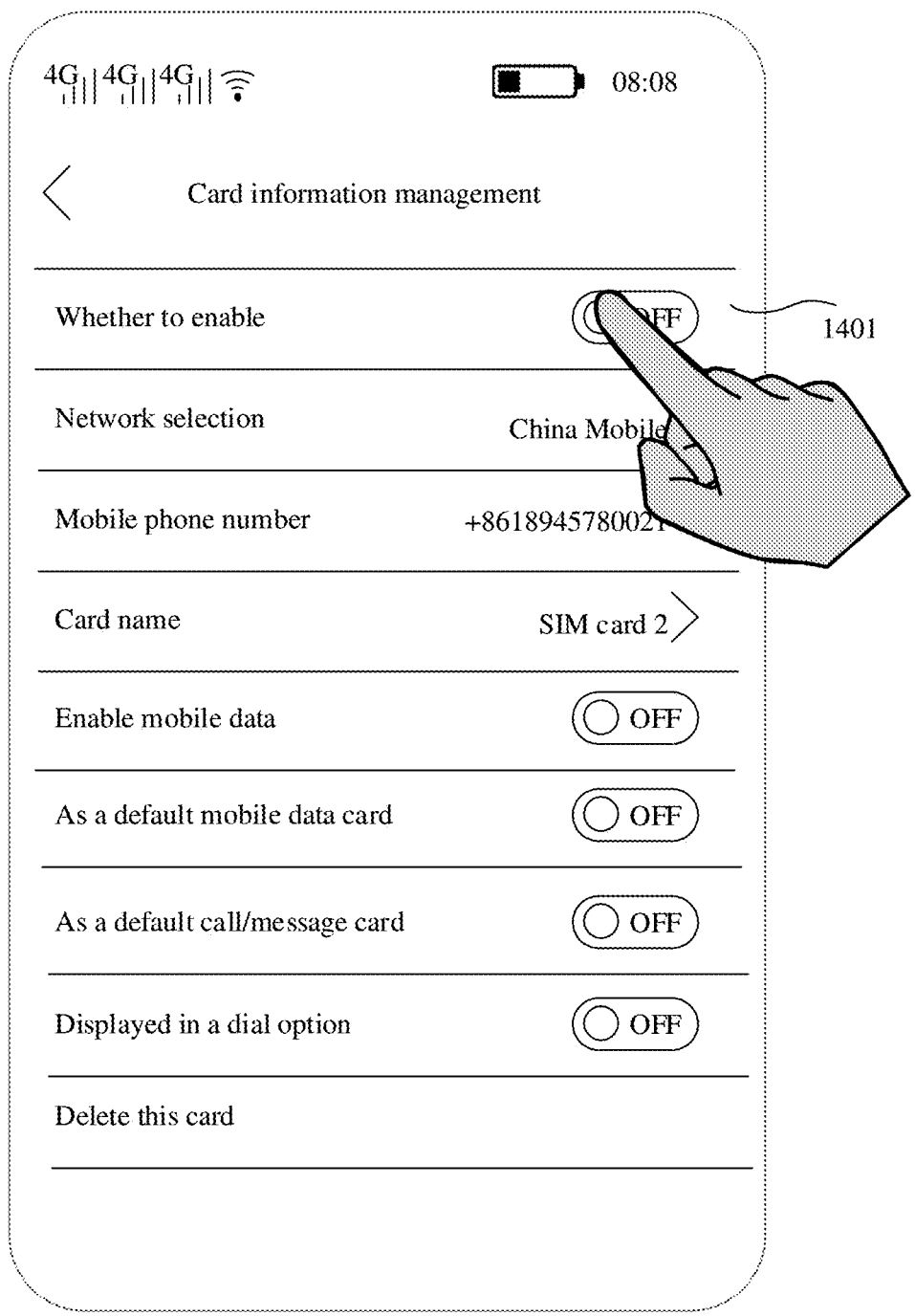

When an operation (for example, a touch operation) performed by the user on an eSIM option 1203C in a user interface 122 shown in FIG. 21a is detected, the electronic device may display a user interface 141 shown in FIG. 21b.

Figure 21C:
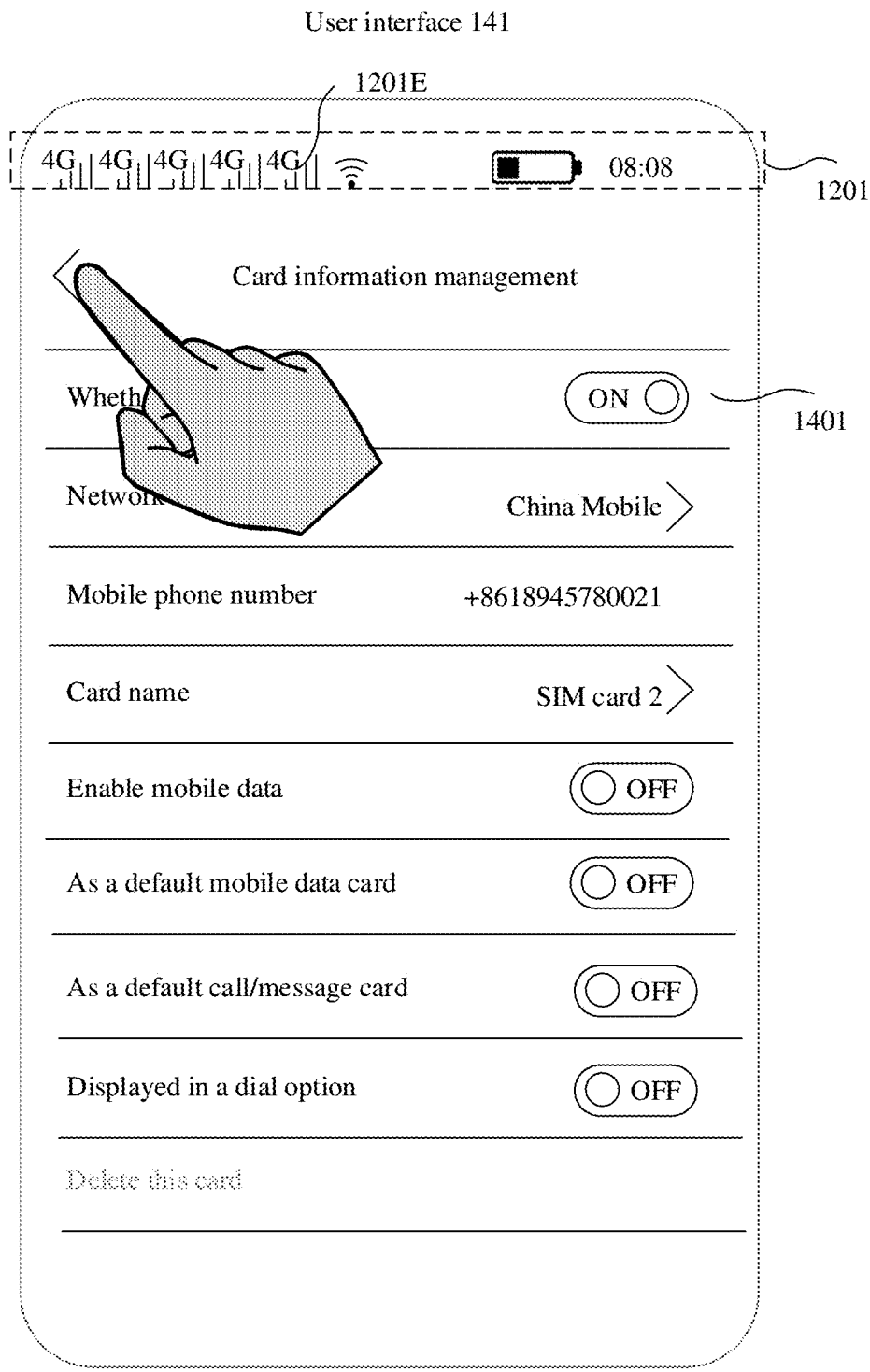

When an operation (for example, a tap operation) performed by the user on a "whether to enable" control 1401 in the user interface 141 shown in FIG. 21b is detected, the electronic device may perform steps S608 to S618, and display a user interface 141 shown in FIG. 21c. In this case, an on/off state of the "whether to enable" control 1401 in the user interface 141 is set to on, and a signal strength indicator 1201E of the communication connection established based on a profile corresponding to an eSIM option 1203C is updated and displayed in the status bar 1201.

Figure 21D:
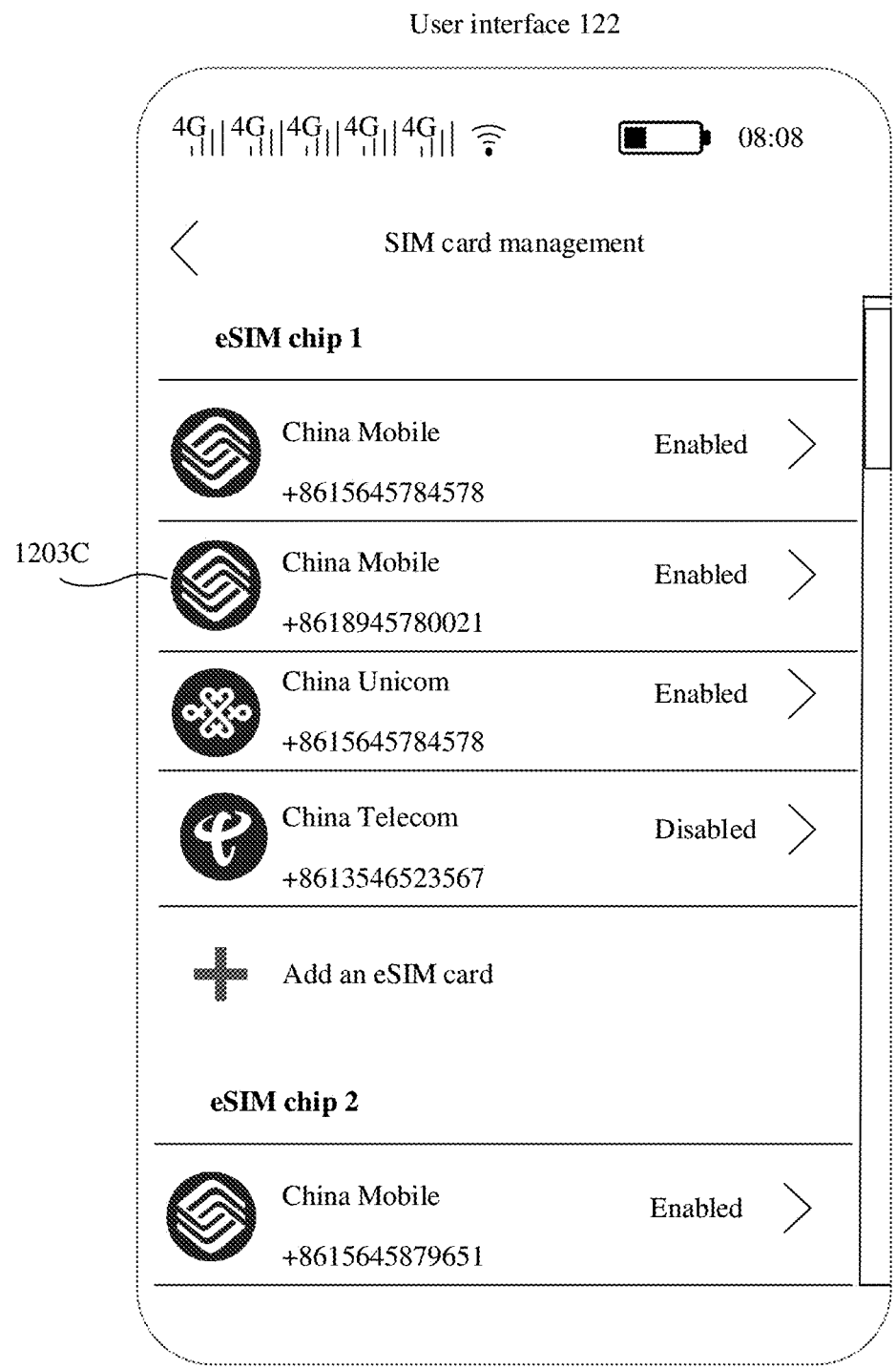

When an operation (for example, a tap operation) performed by the user on a back button in a user interface 141 shown in FIG. 21c is detected, the electronic device may display a user interface 122 shown in FIG. 21d. In this case, the profile status indicator of the eSIM option 1203C in the user interface 122 is updated and displayed as enabled.

Application scenario 3: In some embodiments, the electronic device enables and activates a plurality of profiles in one eSIM, and separately establishes communication connections based on the plurality of profiles. After the electronic device enters a standby state on the plurality of communication connections, when the electronic device performs service processing on a communication connection corresponding to one of the activated profiles, the electronic device may receive a request for performing service processing on a communication connection corresponding to another activated profile.

An example in which two profiles (a profile A and a profile B) are enabled and activated in the eSIM 196 of the electronic device 100 is used below to describe, with reference to the schematic diagram of the structure of the electronic device 100 shown in FIG. 7 and the block diagram of the software structure of the electronic device 100 shown in FIG. 11, an example process in which the electronic device 100 separately performs service processing on two communication connections corresponding to two activated profiles in one eSIM 196 at the same time.

When the profile A is activated, the CPU 110 reads an IMSI-A of the profile A from the eSIM 196 by using the LPA at the application framework layer in the electronic device 100, searches the profile-IMEI data table, and determines that an IMEI-A is allocated to the profile A. The electronic device 100 sends the IMSI-A and the IMEI-A to a base station A by using the mobile communications module 150. The base station A is a base station of a mobile network A. The mobile network A generates a random number (RADN-A) and sends the random number to the electronic device 100. After receiving the RADN-A by using the mobile communications module 150, the electronic device 100 sends the RADN-A to the eSIM 196 by using the LPA at the application framework layer through the CPU 110. The eSIM 196 calculates an authentication result (SENS-A) based on the RADN-A and an authentication key (Ki-A) stored in the profile A. At the same time, the eSIM 196 calculates a communication key (Kc-A) based on the RADN-A and the authentication key (Ki-A) stored in profile A. The eSIM 196 sends the SENS-A and the Kc-A to the CPU 110. The CPU 110 stores the Kc-A, and sends the SENS-A to the base station A by using the mobile communications module 150. The mobile network A determines that the SENS-A is the same as an authentication result calculated by the mobile network A, and allows establishment of a communication connection A based on the profile A. The electronic device 100 is in a standby state on the communication connection A.

A process of activating the profile B is similar to that of activating the profile A. Details are not described again. Similarly, the CPU 110 stores a communication key (Kc-B) calculated by the eSIM 196 based on a RADN-B and an authentication key (Ki-B) stored in the profile B, and sends a calculated authentication result (SENS-B) to a base station B. The base station B is a base station of a mobile network B. The mobile network B determines that the SENS-B is the same as an authentication result calculated by the mobile network B, and allows establishment of a communication connection B based on the profile B. The electronic device 100 is in a standby state on the communication connection B.

When a user starts an online music player APP in the electronic device 100 to play online music, and the online music player APP is preset to use data traffic of the profile A, the CPU 110 performs communication encryption on the data traffic by using the Kc-A, and performs data receiving and sending processing with the base station A on the communication connection A by using the mobile communications module 150.

Similarly, when the user opens a browser APP in the electronic device 100 to browse a web page, and the browser APP is preset to use data traffic of the profile B, the CPU 110 performs communication encryption on the data traffic by using a Kc-B, and performs data receiving and sending processing with the base station B on the communication connection B by using the mobile communications module 150.

It may be understood that the mobile communications module 150 may separately communicate with the base station A and the base station B by using a time division multiplexing technology. Specifically, for descriptions of allocating a hardware transceiver module to establish and maintain a communication connection by the mobile communications module 150 in a case in which quantities of hardware transceiver modules are different, refer to the foregoing descriptions of the IMEI-transceiver module correspondence shown in FIG. 8 to FIG. 10. Details are not described herein again.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

According to the context, the term "when" used in the foregoing embodiments may be interpreted as a meaning of "if", "after", "in response to determining", or "in response to detecting". Similarly, according to the context, the phrase "when it is determined that . . . " or "if (a stated condition or event) is detected" may be interpreted as a meaning of "if it is determined that . . . ", "in response to determining . . . ", "when (a stated condition or event) is detected", or "in response to detecting (a stated condition or event)".

All or a part of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

Persons of ordinary skill in the art may understand that all or some of the procedures of the methods in the embodiments may be implemented by a computer program instructing related hardware. The program may be stored in the computer-readable storage medium. When the program is executed, the procedures in the method embodiments may be included. The storage medium includes any medium that can store program code, such as a ROM or a random access memory RAM, a magnetic disk, or a compact disc.

What is claimed is:

1. A method, comprising:
    establishing, by an electronic device, a first communication connection based on a first profile, wherein an embedded-subscriber identification module (eSIM) of the electronic device comprises the first profile; and
    in response to an operation by a user of the electronic device of establishing a communication connection based on a second profile, determining, by the electronic device, whether a quantity of enabled profiles of the electronic device is less than a preset threshold, wherein the preset threshold is a maximum quantity of profiles that can be simultaneously enabled and standby in the electronic device, the preset threshold is a positive integer not less than 2, and a quantity of profiles stored in the electronic device is greater than the preset threshold;
    activating, by the electronic device, the second profile when it is determined that the quantity of enabled profiles is less than the preset threshold; and
    establishing, by the electronic device, a second communication connection based on the second profile without terminating the first communication connection, wherein the first profile and the second profile are comprised in the same eSIM, and the first profile is different from the second profile.

2. The method according to claim 1, further comprising:
    displaying, by the electronic device, status information of the second profile as enabled.

3. The method according to claim 1, further comprising:
    displaying, by the electronic device, first indication information, wherein the first indication information indicates signal strength of the first communication connection; and
    displaying, by the electronic device, second indication information, wherein the second indication information indicates signal strength of the second communication connection.

4. The method according to claim 1, wherein establishing, by the electronic device, the second communication connection based on the second profile comprises:
    allocating, by the electronic device, a second international mobile equipment identity (IMEI) to the second profile, and establishing a correspondence between a unique identifier of the second profile and the allocated second IMEI; and
    establishing, by the electronic device, the second communication connection based on at least the second IMEI.

5. The method according to claim 4, wherein establishing, by the electronic device, the first communication connection based on the first profile comprises:
    determining, by the electronic device, that the first profile is activated;
    determining, by the electronic device, a first IMEI corresponding to the first profile; and sending, by the electronic device, the first IMEI and a first international mobile subscriber identity (IMSI) in the first profile to a first base station, to establish the first communication connection.

6. The method according to claim 4, wherein establishing, by the electronic device, the first communication connection based on the first profile comprises:
activating, by the electronic device, the first profile;
allocating, by the electronic device, a first IMEI to the first profile, and establishing a correspondence between a unique identifier of the first profile and the allocated first IMEI; and
sending, by the electronic device, the first IMEI and a first international mobile subscriber identity (IMSI) in the first profile to a first base station, to establish the first communication connection.

7. The method according to claim 4, wherein a unique identifier of the first profile is an integrated circuit card identity (ICCID) number or an ISP-D number.

8. An electronic device, comprising:
an embedded-subscriber identification module (eSIM);
one or more processors; and
a memory, coupled to the one or more processors, wherein the memory is configured to store computer program code, the computer program code comprises computer instructions, and when the one or more processors invoke the computer instructions, the electronic device performs the following operations:
establishing a first communication connection based on a first profile, wherein the eSIM comprises the first profile; and
in response to an operation by a user of the electronic device of establishing a communication connection based on a second profile, determining whether a quantity of enabled profiles of the electronic device is less than a preset threshold, wherein the preset threshold is a maximum quantity of profiles that can be simultaneously enabled and standby in the electronic device, the preset threshold is a positive integer not less than 2, and a quantity of profiles stored in the electronic device is greater than the preset threshold;
activating, by the electronic device, the second profile when it is determined that the quantity of enabled profiles is less than the preset threshold; and
establishing a second communication connection based on the second profile without terminating the first communication connection, wherein the eSIM further comprises the second profile, and the first profile is different from the second profile.

9. The electronic device according to claim 8, further comprising:
a display; and
wherein when the one or more processors invoke the computer instructions, the electronic device further performs the following operations:
displaying, on the display, status information corresponding to the second profile as enabled.

10. The electronic device according to claim 8, wherein when the one or more processors invoke the computer instructions, the electronic device further performs the following operations:
displaying first indication information on the display, wherein the first indication information indicates signal strength of the first communication connection; and
displaying second indication information on the display, wherein the second indication information indicates signal strength of the second communication connection.

11. The electronic device according to claim 8, wherein when the one or more processors invoke the computer instructions, the electronic device further performs the following operations:
allocating a second international mobile equipment identity (IMEI) to the second profile, and establishing a correspondence between a unique identifier of the second profile and the allocated second IMEI; and
establishing the second communication connection based on at least the second IMEI.

12. The electronic device according to claim 11, wherein when the one or more processors invoke the computer instructions, the electronic device further performs the following operations:
determining that the first profile is activated;
determining a first IMEI corresponding to the first profile; and
sending the first IMEI and a first international mobile subscriber identity (IMSI) in the first profile to a first base station, to establish the first communication connection.

13. The electronic device according to claim 11, wherein when the one or more processors invoke the computer instructions, the electronic device further performs the following operations:
activating the first profile;
allocating a first IMEI to the first profile, and establishing a correspondence between a unique identifier of the first profile and the allocated first IMEI; and
sending the first IMEI and a first international mobile subscriber identity (IMSI) in the first profile to a first base station, to establish the first communication connection.

14. The electronic device according to claim 11, wherein a unique identifier of the first profile is an integrated circuit card identity (ICCID) or an ISP-D number.

15. A non-transitory computer readable storage medium storing one or more programs, the one or more programs including instructions, which, when executed by an electronic device, cause the electronic device to:
establish a first communication connection based on a first profile, wherein an embedded-subscriber identification module (eSIM) of the electronic device comprises the first profile; and
in response to an operation by a user of the electronic device of establishing a communication connection based on a second profile, establish a second communication connection based on the second profile without terminating the first communication connection, wherein the eSIM further comprises the second profile, and the first profile is different from the second profile; and
wherein a unique identifier of the first profile is a first integrated circuit card identity (ICCID) and a unique identifier of the second profile is a second ICCID.

16. The non-transitory computer readable storage medium according to claim 15, wherein the one or more programs further include instructions, which, when executed by the electronic device, cause the device to:
display, on a display of the electronic device, status information corresponding to the second profile as enabled.

17. The non-transitory computer readable storage medium according to claim 15, wherein the one or more programs further include instructions, which, when executed by the electronic device, cause the electronic device to:
 display a first indication information on the display, wherein the first indication information indicates signal strength of the first communication connection; and
 display a second indication information on the display, wherein the second indication information indicates signal strength of the second communication connection.

18. The non-transitory computer readable storage medium according to claim 15, wherein the one or more programs further include instructions, which, when executed by the electronic device, cause the device to:
 activate the second profile;
 allocate a second international mobile equipment identity (IMEI) to the second profile, and establish a correspondence between the unique identifier of the second profile and the allocated second IMEI; and
 establish the second communication connection based on at least the second IMEI.

\* \* \* \* \*